US010462517B2

(12) United States Patent
Iwami et al.

(10) Patent No.: US 10,462,517 B2
(45) Date of Patent: Oct. 29, 2019

(54) INFORMATION PROCESSING APPARATUS, COMMUNICATION SYSTEM, AND INFORMATION PROCESSING METHOD

(71) Applicant: SONY CORPORATION, Tokyo (JP)

(72) Inventors: Hideki Iwami, Saitama (JP); Tomoya Yamaura, Tokyo (JP); Yasushi Ihara, Tokyo (JP); Sho Amano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 62 days.

(21) Appl. No.: 15/521,991

(22) PCT Filed: Aug. 25, 2015

(86) PCT No.: PCT/JP2015/073775
§ 371 (c)(1),
(2) Date: Apr. 26, 2017

(87) PCT Pub. No.: WO2016/072128
PCT Pub. Date: May 12, 2016

(65) Prior Publication Data
US 2017/0332134 A1 Nov. 16, 2017

(30) Foreign Application Priority Data

Nov. 4, 2014 (JP) ................................. 2014-224506

(51) Int. Cl.
*H04N 21/4363* (2011.01)
*H04N 21/431* (2011.01)
(Continued)

(52) U.S. Cl.
CPC ....... *H04N 21/4363* (2013.01); *G06F 3/0346* (2013.01); *H04N 21/436* (2013.01);
(Continued)

(58) Field of Classification Search
CPC ............. H04N 21/4314; H04N 21/441; H04N 21/4415; H04N 21/44218;
(Continued)

(56) References Cited

U.S. PATENT DOCUMENTS 7,257,777 B1 * 8/2007 Kanevsky ............... G06F 9/451
715/794
9,560,409 B2 * 1/2017 Roberts .............. H04N 21/4312
(Continued)

FOREIGN PATENT DOCUMENTS

JP 2006086717 A * 3/2006
JP 2006094056 A * 4/2006
(Continued)

*Primary Examiner* — James R Sheleheda
(74) *Attorney, Agent, or Firm* — Chip Law Group

(57) ABSTRACT

An image that can be easily viewable for a user is provided. An information processing apparatus is an information processing apparatus including a control unit. The control unit included in this information processing apparatus controls performing displaying an image on the basis of image information transmitted from at least one first information processing apparatus by using radio communication in one area of a display unit for each first information processing apparatus. In addition, the control unit included in this information processing apparatus performs control of performing and determining a display form of the image corresponding to the first information processing apparatus in the display unit on the basis of a positional relation between a user associated with the first information processing apparatus and the display unit.

17 Claims, 53 Drawing Sheets

(51) Int. Cl.
*H04N 21/436* (2011.01)
*G06F 3/0346* (2013.01)
*H04N 21/442* (2011.01)
*H04N 21/41* (2011.01)

(52) U.S. Cl.
CPC ..... *H04N 21/4312* (2013.01); *H04N 21/4316* (2013.01); *H04N 21/44218* (2013.01); *H04N 21/4113* (2013.01); *H04N 21/4126* (2013.01)

(58) Field of Classification Search
CPC ......... H04N 21/44213; H04N 21/4753; H04N 21/4402; H04N 21/431; H04N 21/4312; H04N 21/4363; H04N 21/4316; H04N 21/4113; H04N 21/4126; H04N 21/436; G06F 3/0346
See application file for complete search history.

(56) References Cited

U.S. PATENT DOCUMENTS

| | | | | |
|---|---|---|---|---|
| 9,704,220 | B1* | 7/2017 | Bakar | G09G 3/20 |
| 9,949,590 | B2* | 4/2018 | Bartoli | A47J 31/0668 |
| 9,949,690 | B2* | 4/2018 | Hedin | A47B 21/02 |
| 2008/0307458 | A1* | 12/2008 | Kim | H04N 21/4316 |
| | | | | 725/38 |
| 2011/0148930 | A1* | 6/2011 | Lee | G06F 3/04897 |
| | | | | 345/660 |
| 2012/0075062 | A1* | 3/2012 | Osman | G07C 9/00087 |
| | | | | 340/5.61 |
| 2013/0093670 | A1* | 4/2013 | Iwai | G06F 3/017 |
| | | | | 345/156 |
| 2014/0096165 | A1* | 4/2014 | Bei | H04N 19/46 |
| | | | | 725/81 |
| 2015/0067758 | A1* | 3/2015 | Jeanne | H04N 21/4122 |
| | | | | 725/151 |
| 2015/0100324 | A1* | 4/2015 | Oswal | G06F 3/165 |
| | | | | 704/500 |
| 2015/0334344 | A1* | 11/2015 | Shoemake | G06F 3/011 |
| | | | | 348/14.16 |
| 2015/0356520 | A1* | 12/2015 | Mitti | G06Q 10/087 |
| | | | | 705/305 |
| 2015/0365620 | A1* | 12/2015 | Connelly | H04N 21/4316 |
| | | | | 348/564 |
| 2016/0105662 | A1* | 4/2016 | Kim | G02B 27/2264 |
| | | | | 348/53 |
| 2017/0085942 | A1* | 3/2017 | Parmar | H04N 21/4334 |
| 2017/0195705 | A1* | 7/2017 | Nishimura | H04N 21/26283 |
| 2017/0332134 | A1* | 11/2017 | Iwami | H04N 21/436 |

FOREIGN PATENT DOCUMENTS

| | | | |
|---|---|---|---|
| JP | 2008-278388 A | | 11/2008 |
| JP | 2009065292 A | * | 3/2009 |
| JP | 2009087026 A | * | 4/2009 |
| JP | 2009-164977 A | | 7/2009 |
| JP | 2013-179553 A | | 9/2013 |
| JP | 2014-075092 A | | 4/2014 |

* cited by examiner

FIG. 4

MANAGEMENT INFORMATION STORING UNIT
390

| TERMINAL IDENTIFICATION INFORMATION | FREQUENCY CHANNEL | RADIO WAVE PROPAGATION MEASUREMENT INFORMATION ||||| APPARATUS INFORMATION | BAND USAGE LEVEL | DISPLAY FORM | STANDBY/ WAKE-UP | MULTI-RECEIVING DIVERSITY SUPPORT |
|---|---|---|---|---|---|---|---|---|---|---|---|
| | | PER | BER | NUMBER OF TIMES OF RE-TRANSMISSION OF PACKET | THROUGHPUT | FRAME MISSING | SIR (RSSI) | | | | |
| 391 | 392 | 393 |||||| 394 | 395 | 396 | 397 | 398 |
| DSC200 | 60GHz | ... | ... | ... | ... | ... | ... | MOBILE | 20Mbps | SUB (PERIPHERAL CHANNEL) | STANDBY | NO PRESENCE |
| DR400 | 2.4GHz | ... | ... | ... | ... | ... | ... | STATIONARY | 20Mbps | MAIN (CENTER CHANNEL) | WAKE-UP | PRESENCE |

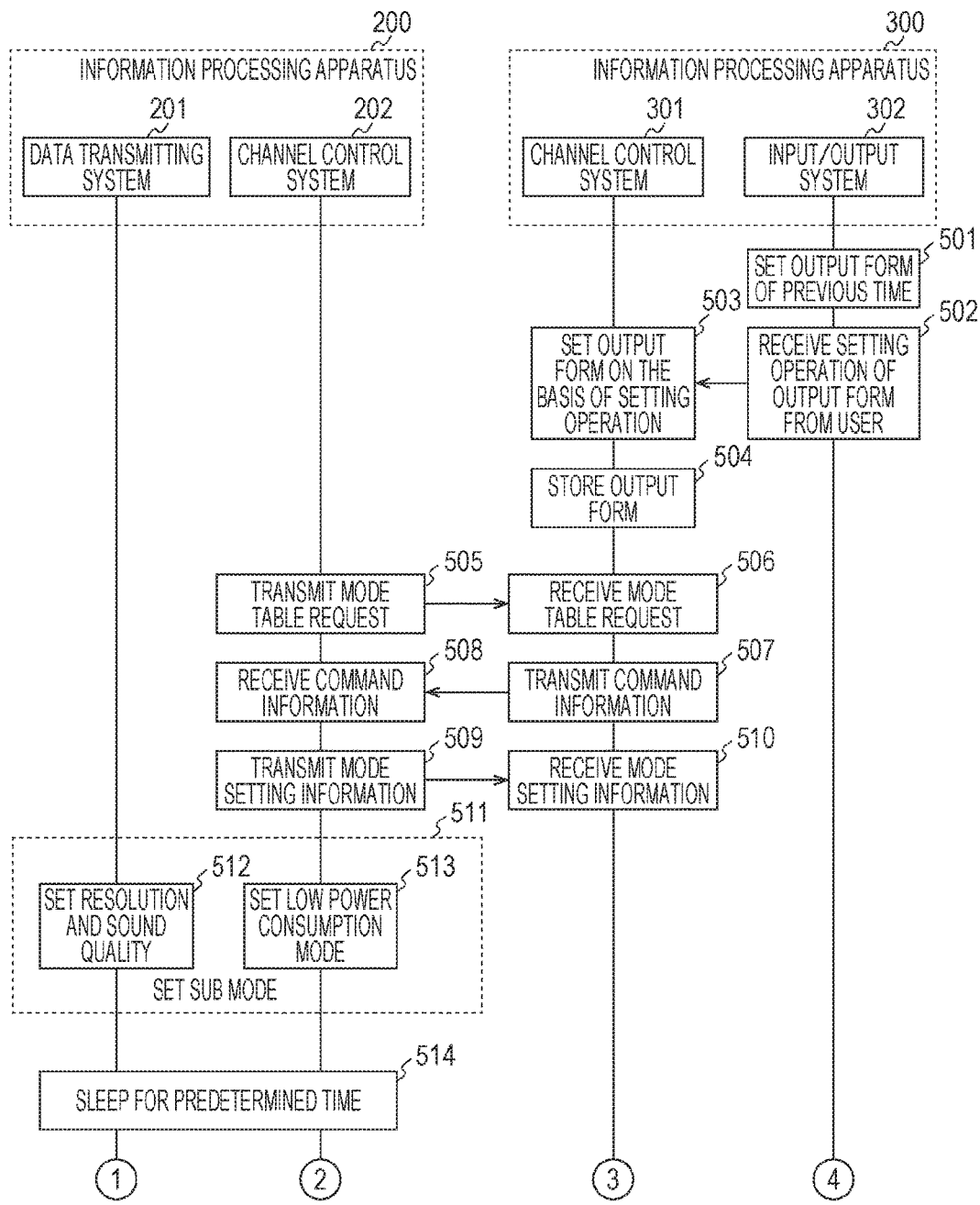

EXAMPLE OF SETTING MODE ON THE BASIS OF CONTROL OF SOURCE APPARATUS

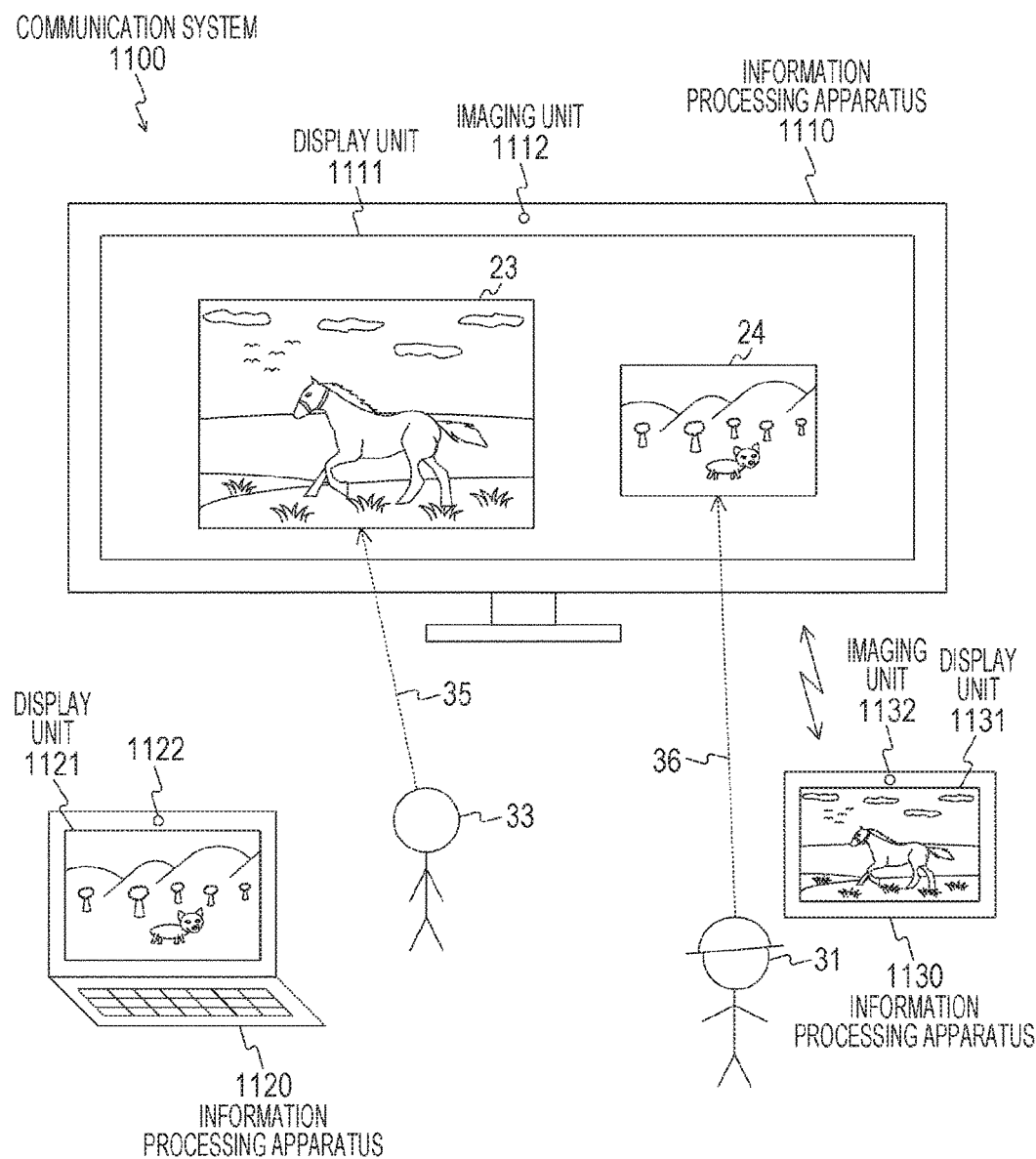

FIG. 24

| | | Source apparatus performs acquisition of user information and transmits user information to sink apparatus | | | | Source apparatus performs generation of personal information and transmits personal information to sink apparatus | | | | Source apparatus performs association between user information and source apparatus | | | | User information is received from sink apparatus, and source apparatus performs generation of personal information and performs association with source apparatus | | | | User information is received from sink apparatus, and source apparatus performs generation of personal information and association with source apparatus | | | | Sink apparatus performs generation of personal information and association with source apparatus | | | |
|---|---|---|---|---|---|---|---|---|---|---|---|---|---|---|---|---|---|---|---|---|---|---|---|---|
| | | Still image and moving image | Audio | Metadata | Table | Still image and moving image | Audio | Metadata | Table | Still image and moving image | Audio | Metadata | Table | Still image and moving image | Audio | Metadata | Table | Still image and moving image | Audio | Metadata | Table | Still image and moving image | Audio | Metadata | Table |
| Capability that can be exchanged by source apparatus | | O | | | | O | | | | O | | | | O | | | | O | | | | O | | | |
| User information that can be acquired by source apparatus | Face recognition | O | | | | | | O | | | | | O | O | | | O | | | | O | | | | O |
| | Direction of face and information of sight destination | O | | | | | | O | | | | | | O | | | O | | | | O | | | | O |
| | Display screen touched by user | O | | | | | | O | | | | | | O | | | O | | | | O | | | | O |
| | Recognize bracelet/ring/collar/watch at short distance | O | | | | | | O | | | | | | O | | | | | | | O | O | | | O |
| | Bracelet/ring/necklace/watch/touch pen | | | | | | | O | | | | | | | O | O | | | O | O | O | | O | O | O |
| | Clothing | O | | O | | | | O | | | | | O | O | | | O | O | | | O | O | | | O |
| | Tag/coin | O | | | | | | O | | | | | | | O | O | | | O | O | | | O | O | O |
| | Speech recognition | | O | | | | | O | | | | O | | | | O | O | | | O | O | | O | | O |
| | Voiceprint, fingerprint, and vein | O | O | O | | | | O | | | | O | O | | | O | O | | O | O | O | | | O | O |
| | Height and weight | O | | O | | | | O | | | | | O | O | | | O | O | | O | O | O | | O | O |
| | Select one in order of terminal capability | O | O | O | | | | O | | | | | O | O | | O | O | O | | | O | O | | O | O |

FIG. 25

APPARATUS INFORMATION STORING UNIT
1140

| TERMINAL IDENTIFICATION INFORMATION | DISPLAY POSITION | | MAC ADDRESS |
| --- | --- | --- | --- |
| | COORDINATES | SIZE | |
| DSC760 | (x1, y2) | (h1, w2) | ... |
| DR780 | (x3, y4) | (h3, w4) | ... |
| ⋮ | ⋮ | ⋮ | ⋮ |

USER INFORMATION STORING UNIT
1150

| USER IDENTIFICATION INFORMATION | COLLATION INFORMATION |
| --- | --- |
| YZ001 | ... |
| YZ002 | ... |
| ⋮ | ⋮ |

1151 — 1152

EXAMPLE OF LINK BETWEEN SOURCE APPARATUS
AND DISPLAY POSITION OF SINK APPARATUS

EXAMPLE OF LINK BETWEEN SOURCE APPARATUS AND DISPLAY POSITION OF SINK APPARATUS (EXAMPLE IN WHICH SOURCE APPARATUS ACQUIRES USER INFORMATION)

EXAMPLE IN WHICH Capability IS NOTIFIED FROM SOURCE APPARATUS

EXAMPLE IN WHICH Capability IS REQUESTED FROM SOURCE APPARATUS

EXAMPLE OF LINK BETWEEN SOURCE APPARATUS AND DISPLAY POSITION OF SINK APPARATUS (EXAMPLE IN WHICH SINK APPARATUS ACQUIRES USER INFORMATION)

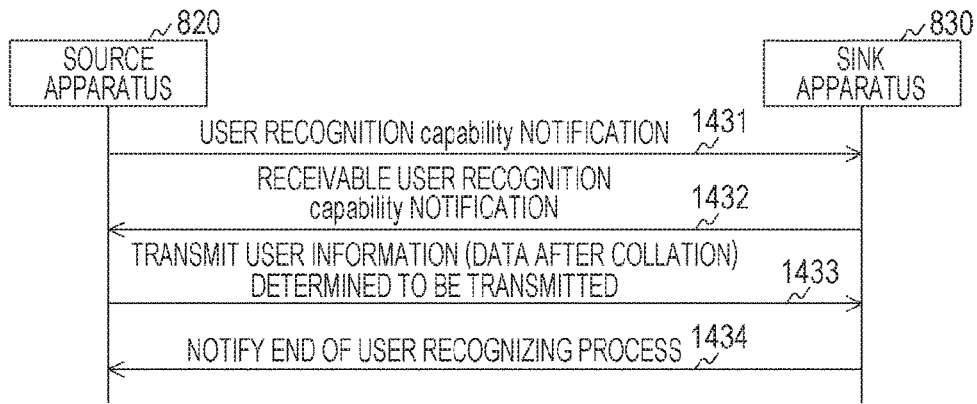
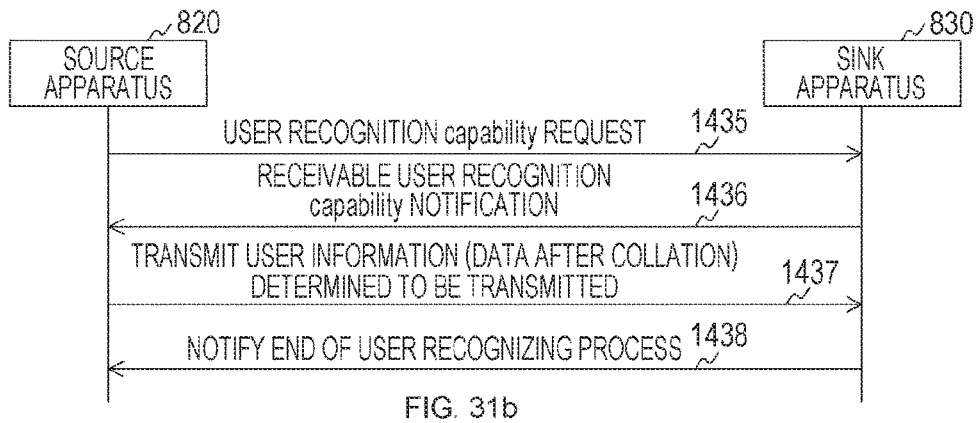
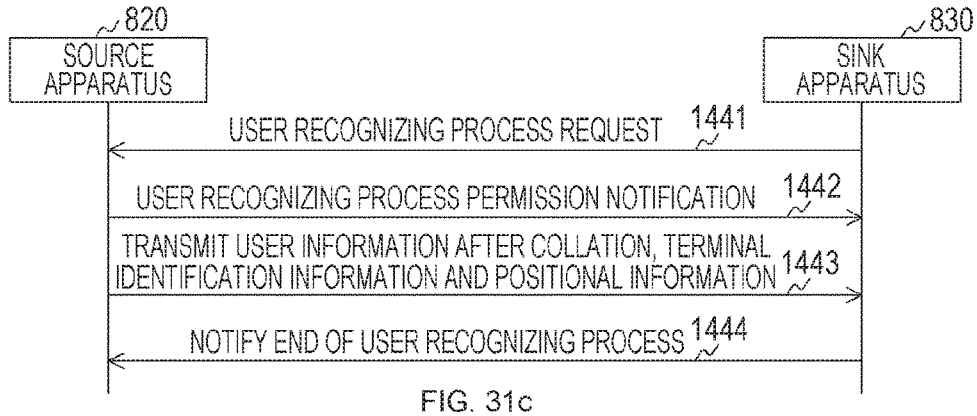

EXAMPLE OF LINK BETWEEN SOURCE APPARATUS AND DISPLAY POSITION OF SINK APPARATUS (EXAMPLE IN WHICH SOURCE APPARATUS ACQUIRES USER INFORMATION)

EXAMPLE OF LINK BETWEEN SOURCE APPARATUS
AND DISPLAY POSITION OF SINK APPARATUS

EXAMPLE OF LINK OF SOURCE APPARATUS WITH DISPLAY POSITION OF SINK APPARATUS

FIG. 49
EXAMPLE OF WFD IE FORMAT

| Field | Size (octets) | Value (Hexadecimal) | Description |
|---|---|---|---|
| Element ID | 1 | DD | IEEE 802.11 vendor specific usage |
| Length | 1 | Variable | Length of the following fields in the IE in octets. The length field is variable and set to 4 plus the total lenght of WFD subelements. |
| OUI | 3 | 50-6F-9A | WFA Specific OUI |
| OUI Type | 1 | 0A | Identifying the type or version of the WFD IE. Setting to 0x0A indicates WFA WFD v1.0. |
| WFD subelements | Variable | | One or more WFD Subelements appear in the WFD IE |

FIG. 50
EXAMPLE OF General Format of a WFD Subelement

| Field | Size (octets) | Value (Hexadecimal) | Description |
|---|---|---|---|
| Subelement ID | 1 | | Identifying the type of WFD Subelement. The specific value is defined in Table 5-3. |
| Length | 2 | Variable | Length of the following fields in the subelements. |
| Subelements body field | Variable | | Subelement specific information fields |

FIG. 51

EXAMPLE OF WFD Subelement ID Definitions

| Subelement ID (Decimal) | Description |
| --- | --- |
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11 | New Device Information |
| 12-255 | Reserved |

FIG. 52

EXAMPLE OF New Device Information Subelement

| Field | Size (octets) | Value | Description |
|---|---|---|---|
| Subelement ID | 1 | 11 | |
| Length | 1 | Variable | Length of the following fields in the subelements. |
| New Device Information | 3 | | |

FIG. 53

EXAMPLE OF New Device Information Field

| Field | Size (octets) | Value | Description |
|---|---|---|---|
| 1:0 | 3 | Infra CONNECTION | [0] USE OF WIRELESS LINE (1: Connected  0: Non-use)<br>[1] USE OF WIRED LINE (1: Connected  0: Non-use) |
| 5:2 | | RADIO CAPABILITY | [5] TIME DIVISIONAL CONNECTION OF SAME FREQUENCY CHANNEL (1: OK  0: NG)<br>[4] TIME DIVISIONAL CONNECTION OF DIFFERENT FREQUENCY CHANNELS (1: OK  0: NG)<br>[3] SIMULTANEOUS CONNECTION OF SAME FREQUENCY CHANNEL (1: OK  0: NG)<br>[2] SIMULTANEOUS CONNECTION OF DIFFERENT FREQUENCY CHANNELS (1: OK  0: NG) |
| 10:8 | | Source Capability | 10: USE Infra (1: OK  0: Non-Available)<br>9: USE P2P (1: OK  0: Non-Available)<br>8: USE TLDS (1: OK  0: Non-Available) |
| 13:11 | | Sink Capability | 13: USE Infra (1: OK  0: Non-Available)<br>12: USE P2P (1: OK  0: Non-Available)<br>11: USE TLDS (1: OK  0: Non-Available) |
| 23:14 | | Frequency Channel | IN CASE WHERE WIRELESS USE IS Connected IN [1: 0], Channel NUMBER IS WRITTEN |

FIG. 54

EXAMPLE OF Payload of ASP message

| Field | Size (octets) | Value | Description |
|---|---|---|---|
| 1:0 | 3 | Infra CONNECTION | [0] USE OF WIRELESS LINE (1: Connected  0: Non-use)<br>[1] USE OF WIRED LINE (1: Connected  0: Non-use) |
| 5:2 | | RADIO CAPABILITY | [5] TIME DIVISIONAL CONNECTION OF SAME FREQUENCY CHANNEL (1: OK  0: NG)<br>[4] TIME DIVISIONAL CONNECTION OF DIFFERENT FREQUENCY CHANNELS (1: OK  0: NG)<br>[3] SIMULTANEOUS CONNECTION OF SAME FREQUENCY CHANNEL (1: OK  0: NG)<br>[2] SIMULTANEOUS CONNECTION OF DIFFERENT FREQUENCY CHANNELS (1: OK  0: NG) |
| 10:8 | | Source Capability | 10: USE Infra (1: OK  0: Non-Available)<br>9: USE P2P (1: OK  0: Non-Available)<br>8: USE TLDS (1: OK  0: Non-Available) |
| 13:11 | | Sink Capability | 13: USE Infra (1: OK  0: Non-Available)<br>12: USE P2P (1: OK  0: Non-Available)<br>11: USE TLDS (1: OK  0: Non-Available) |
| 23:14 | | Frequency Channel | IN CASE WHERE WIRELESS USE IS Connected IN [1: 0], Channel NUMBER IS WRITTEN |

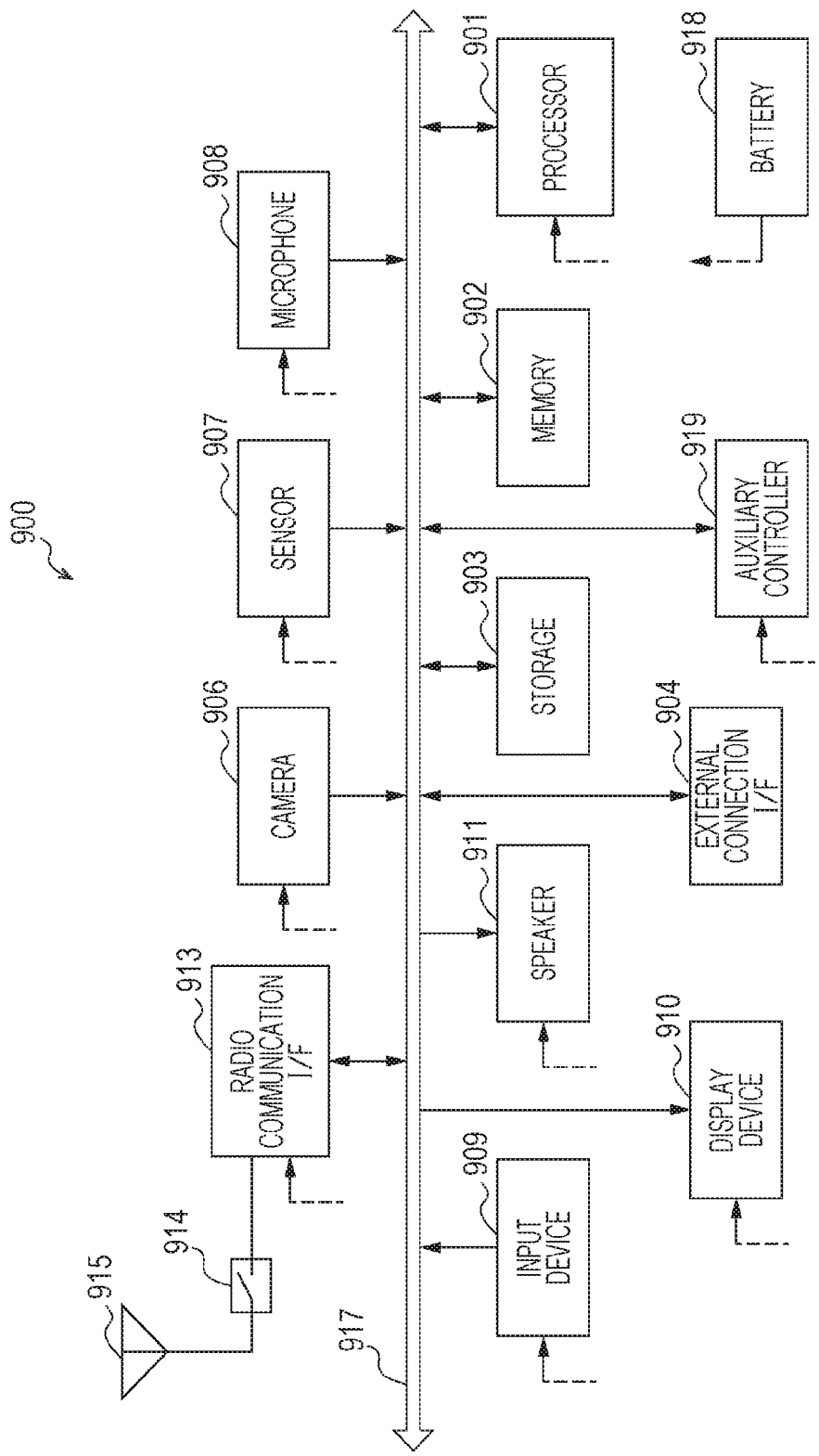

INFORMATION PROCESSING APPARATUS, COMMUNICATION SYSTEM, AND INFORMATION PROCESSING METHOD

CROSS REFERENCE TO RELATED APPLICATIONS

This application is a U.S. National Phase of International Patent Application No. PCT/JP2015/073775 filed on Aug. 25, 2015, which claims priority benefit of Japanese Patent Application No. JP 2014-224506 filed in the Japan Patent Office on Nov. 4, 2014. Each of the above-referenced applications is hereby incorporated herein by reference in its entirety.

TECHNICAL FIELD

The present technology relates to an information processing apparatus, and more particularly, to an information processing apparatus, a communication system, and an information processing method for exchanging various kinds of information by using radio communication and a program causing a computer to perform the method.

BACKGROUND ART

In related art, radio communication technologies for exchanging various kinds of data by using radio communication are present. For example, radio communication technologies for exchanging various kinds of information between two information processing apparatuses using radio communication have been proposed (for example, see Patent Document 1).

CITATION LIST

Patent Document

Patent Document 1: Japanese Patent Application Laid-Open No. 2008-278388

SUMMARY OF THE INVENTION

Problems to be Solved by the Invention

According to the related art described above, various kinds of information can be exchanged between two information processing apparatuses by using radio communication without a connection using a wire circuit. For example, an image based on video data transmitted from an information processing apparatus of the transmission side can be displayed on a display unit of an information processing apparatus of the reception side.

In this way, in a case where a video based on video data transmitted from an information processing apparatus of the transmission side is displayed by an information processing apparatus of the reception side on a display unit, a user viewing the video may be considered to move. In this way, in a case where a relation between a displayed video and a user viewing the video is relatively changed, it is of significance to provide a video that can be easily viewed and operated by the user before and after the change.

The present technology is in consideration of such situations and, an object thereof is to provide a video that is easily viewable and is easily operable for a user.

Solutions to Problems

The present technology is in consideration of solving the problems described above, and, according to a first aspect, there is provided an information processing apparatus including a control unit that performs control of displaying an image based on image information transmitted from at least one first information processing apparatus by using radio communication in one area of a display unit for each first information processing apparatus and determining a display form of the image corresponding to the first information processing apparatus in the display unit on the basis of a positional relation between a user associated with the first information processing apparatus and the display unit, and an information processing method thereof, and a program causing a computer to perform the method. Accordingly, an action of determining the display form of the image corresponding to the first information processing apparatus in the display unit on the basis of the positional relation between the user associated with the first information processing apparatus and the display unit is acquired.

In addition, in the first aspect, the control unit may determine at least one of movement of the display area of the image corresponding to the first information processing apparatus associated with the user in the display unit and a direction of the image on the basis of movement of the user. According to such a case, on the basis of the movement of the user, there is an action of determining at least one of the movements of the display area of the image corresponding to the first information processing apparatus associated with the user in the display unit and the direction of the image.

In addition, in the first aspect, the first information processing apparatus may acquire user information relating to the user and transmit the user information to the information processing apparatus, and the control unit may perform a user recognizing process relating to the user on the basis of registration user information that is registered and the user information transmitted from the first information processing apparatus, perform association between the registration user information for the user and the image displayed on the display unit on the basis of a result of the user recognizing process, and determine the display form of the image on the basis of a change in the user information. According to such a case, there is an action of performing a user recognizing process on the basis of the registration user information that is registered and the user information transmitted from the first information processing apparatus, performing association between the registration user information for the user and the image displayed on the display unit on the basis of the result of the user recognizing process, and determining the display form of the image on the basis of a change in the user information.

In addition, in the first aspect, the first information processing apparatus may acquire user information relating to the user, perform a user recognizing process relating to the user on the basis of registration user information that is registered and the user information, and transmit a result of the user recognizing process to the information processing apparatus, and the control unit may perform association between the registration user information for the user and the image displayed on the display unit on the basis of the result of the user recognizing process transmitted from the first information processing apparatus and determine the display form of the image on the basis of a change in the user information. According to such a case, there is an action of performing association between the registration user information for the user and the image displayed on the display unit on the basis of the result of the user recognizing process transmitted from the first information processing apparatus and determining the display form of the image on the basis of a change in the user information.

In addition, in the first aspect, the first information processing apparatus may acquire user information relating to the user, perform a user recognizing process relating to the user on the basis of registration user information that is registered and the user information, perform association between the registration user information for the user and the image displayed on the display unit on the basis of a result of the user recognizing process, and transmit the result of the association and positional information based on the user information to the information processing apparatus, and the control unit may record the result of the association transmitted from the first information processing apparatus and determine the display form of the image on the basis of the positional information transmitted from the first information processing apparatus. According to such a case, there is an action of recording the result of the association transmitted from the first information processing apparatus and determining the display form of the image on the basis of the positional information transmitted from the first information processing apparatus.

In addition, in the first aspect, in a case where a determination request for determining the display form of the image in accordance with the movement of the user is received from the user, the first information processing apparatus may transmit positional information based on the user information to the information processing apparatus regularly or irregularly. According to such a case, according to the first information processing apparatus, there is an action of, in a case where a determination request for determining the display form of the image in accordance with the movement of the user is received from the user, transmitting positional information based on the user information to the information processing apparatus regularly or irregularly.

In addition, in the first aspect, in a case where the registration user information corresponding to the user information transmitted from the first information processing apparatus is not present as the result of the user recognizing process, the control unit may transmit request information for requesting the registration user information relating to the user information to the first information processing apparatus. According to such a case, in a case where the registration user information corresponding to the user information transmitted from the first information processing apparatus is not present as the result of the user recognizing process, there is an action of transmitting request information relating to the user information to the first information processing apparatus.

In addition, in the first aspect, an acquisition unit that acquires user information relating to the user may be further included, the control unit may transmit the user information to the first information processing apparatus, the first information processing apparatus may perform a user recognizing process relating to the user on the basis of registration user information that is registered and the user information transmitted from the information processing apparatus, perform association between the registration user information for the user and the image displayed on the display unit on the basis of a result of the user recognizing process, and transmit a result of the association to the information processing apparatus, and the control unit may determine the display form of the image on the basis of positional information based on the user information. According to such a case, there is an action of transmitting the user information to the first information processing apparatus and determining the display form of the image on the basis of positional information based on the user information.

In addition, in the first aspect, an acquisition unit that acquires user information relating to the user may be further included, the control unit may perform a user recognizing process relating to the user on the basis of registration user information that is registered and the user information and transmit the result of the user recognizing process to the first information processing apparatus, the first information processing apparatus may perform association between the registration user information for the user and the image displayed on the display unit on the basis of the result of the user recognizing process, and transmit a result of the association to the information processing apparatus, and the control unit may determine the display form of the image on the basis of positional information based on the user information. According to such a case, there is an action of performing a user recognizing process on the basis of registration user information that is registered and the user information and transmitting the result of the user recognizing process to the first information processing apparatus and determining the display form of the image on the basis of positional information based on the user information.

In addition, in the first aspect, an acquisition unit that acquires user information relating to the user may be further included, the control unit may perform a user recognizing process relating to the user on the basis of registration user information that is registered and the user information, perform association between the registration user information for the user and the image displayed on the display unit on the basis of a result of the user recognizing process, and transmit checking information for checking whether or not the display form of the image is determined to the first information processing apparatus, and the first information processing apparatus, in a case where an approval for the checking information is made by a user operation, may transmit approval information to the information processing apparatus, and the control unit, in a case where the approval information is received, may determine the display form of the image on the basis of positional information based on the user information. According to such a case, there is an action of performing a user recognizing process on the basis of registration user information that is registered and the user information, performing association between the registration user information for the user and the image displayed on the display unit on the basis of a result of the user recognizing process, and transmitting checking information to the first information processing apparatus, and, in a case where the approval information is received, determining the display form of the image on the basis of positional information based on the user information.

In addition, in the first aspect, the first information processing apparatus may notify capabilities used for performing the user recognizing process to the information processing apparatus and exchange information used for performing the user recognizing process with the information processing apparatus. In such a case, according to the first information processing apparatus, there is an action of notifying capabilities used for performing the user recognizing process to the information processing apparatus and exchanging information used for performing the user recognizing process with the information processing apparatus.

In addition, in the first aspect, the first information processing apparatus may acquire capabilities of the information processing apparatus by transmitting a capability request used for performing the user recognizing process to the information processing apparatus and exchange information used for performing the user recognizing process with the information processing apparatus. According to such a case, according to the first information processing apparatus, there is an action of acquiring capabilities of the information processing apparatus by transmitting a capability request used for performing the user recognizing process to the information processing apparatus and exchanging information used for performing the user recognizing process with the information processing apparatus.

In addition, in the first aspect, the control unit may acquire capabilities of the first information processing apparatus by transmitting a capability request used for performing the user recognizing process to the first information processing apparatus and exchange information used for performing the user recognizing process with the first information processing apparatus. According to such a case, there is an action of acquiring capabilities of the first information processing apparatus by transmitting a capability request used for performing the user recognizing process to the first information processing apparatus and exchanging information used for performing the user recognizing process with the first information processing apparatus.

In addition, in the first aspect, the first information processing apparatus may perform real-time image transmission/reception to/from the information processing apparatus in compliance with a wireless fidelity (Wi-Fi) certified miracast specification. According to such a case, according to the first information processing apparatus, there is an action of performing real-time image transmission/reception to/from the information processing apparatus in compliance with a wireless fidelity (Wi-Fi) certified miracast specification.

In addition, according to a second aspect of the present technology, there is provided a communication system including: at least one first information processing apparatus that transmits image information by using radio communication; and a second information processing apparatus that performs control of displaying an image based on the image information transmitted from the at least one first information processing apparatus in one area of a display unit for each first information processing apparatus, and determining a display form of the image corresponding to the first information processing apparatus in the display unit on the basis of a positional relation between a user associated with the first information processing apparatus and the display unit, an information processing method thereof, and a program causing a computer to execute the method. Accordingly, according to the information processing apparatus, there is an action of determining a display form of the image corresponding to the first information processing apparatus in the display unit on the basis of a positional relation between a user associated with the first information processing apparatus and the display unit.

Effects of the Invention

According to the present technology, there is a superior effect of providing a video that is easily viewable and is easily operable for a user. In addition, the effect described here is not necessarily limited, but there may be any effect to be described in the present disclosure.

BRIEF DESCRIPTION OF DRAWINGS

FIG. 4 is a diagram that schematically illustrates an example of a stored content of a management information storing unit 390 according to the first embodiment of the present technology.

FIG. 6 is a sequence diagram that illustrates an example of a communication process between apparatuses configuring the communication system 100 according to the first embodiment of the present technology.

FIG. 23 is a diagram that illustrates an example of the system configuration of the communication system 1100 according to the third embodiment of the present technology.

FIG. 24 is a diagram that illustrates an example of a table of user recognition capability information exchanged between apparatuses configuring the communication system 1100 according to the third embodiment of the present technology.

FIG. 25 is a diagram that schematically illustrates an example of a stored content of an apparatus information storing unit 1140 according to the third embodiment of the present technology.

FIG. 26 is a diagram that schematically illustrates an example of a stored content of a user information storing unit 1150 according to the third embodiment of the present technology.

FIGS. 31a, 31b and 31c are sequence diagrams that illustrate an example of a communication process between a source apparatus and a sink apparatus according to the third embodiment of the present technology.

FIG. 49 is a diagram that illustrates an example of a WFD IE format exchanged between apparatuses configuring the communication system 700 according to the second embodiment of the present technology.

FIG. 50 is a diagram that illustrates an example of the WFD IE format exchanged between apparatuses configuring the communication system 700 according to the second embodiment of the present technology.

FIG. 51 is a diagram that illustrates an example of the WFD IE format exchanged between apparatuses configuring the communication system 700 according to the second embodiment of the present technology.

FIG. 52 is a diagram that illustrates an example of the WFD IE format exchanged between apparatuses configuring the communication system 700 according to the second embodiment of the present technology.

FIG. 53 is a diagram that illustrates an example of the WFD IE format exchanged between apparatuses configuring the communication system 700 according to the second embodiment of the present technology.

FIG. 54 is a diagram that illustrates an example of a new message used for an application service platform (ASP) exchanged between apparatuses configuring the communication system 700 according to the second embodiment of the present technology.

FIG. 55 is a block diagram that illustrates an example of the schematic configuration of a smartphone.

MODE FOR CARRYING OUT THE INVENTION

Hereinafter, embodiments for performing the present technology (hereinafter, referred to as embodiments) will be described. The description will be presented in the following order.

1. First Embodiment (Example in Which Control relating to Radio Communication Is Performed On the basis of User Information and Management Information)

2. Second Embodiment (Example in Which Switching between Connection between Source Apparatus and Sink Apparatus through Access Point and Direct Connection between Sink Apparatus and Source Apparatus (or Simultaneous Connection) Is Performed)

3. Third Embodiment (Example in Which Display Form (Display Form of Display Unit) of Image Transmitted from Source Apparatus Is Determined On the basis of Positional Relation between User Using Source Apparatus and Display Unit of Sink Apparatus Side)

4. Application Example

<1. First Embodiment>

[Example of Configuration of Communication System]

Figure 1:
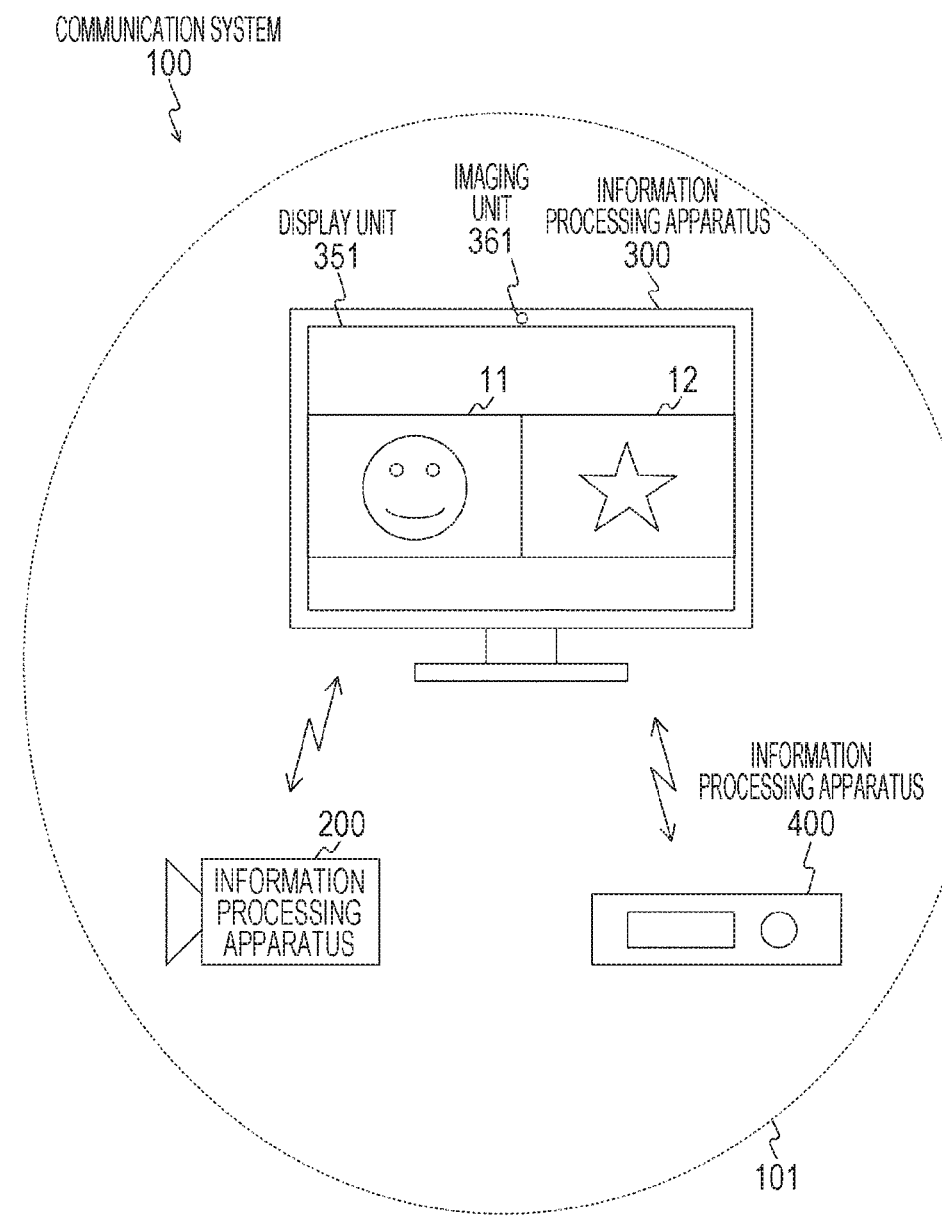
FIG. 1 is a block diagram that illustrates an example of the system configuration of a communication system 100 according to a first embodiment of the present technology.

FIG. 1 is a block diagram that illustrates an example of the system configuration of a communication system 100 according to a first embodiment of the present technology. FIG. 1 illustrates an example of the communication system capable of forming a radio connection through peer-to-peer (P2P) direct communication.

The communication system 100 includes an information processing apparatus 200, an information processing apparatus 300, and an information processing apparatus 400. In addition, the communication system 100 is a communication system in which data (for example, video data and audio data) transmitted from at least one of the information processing apparatus 200 and the information processing apparatus 400 is received by the information processing apparatus 300.

In addition, the information processing apparatuses 200, 300, and 400 are transmitting/receiving apparatuses having a radio communication function. For example, the information processing apparatuses 200, 300, and 400 are display devices (for example, personal computers) having a radio communication function or portable-type information processing apparatuses (for example, smartphones or tablet terminals). In addition, for example, the information processing apparatuses 200, 300, and 400 are radio communication apparatuses that are compliant with IEEE (Institute of Electrical and Electronics Engineers) 802.11, IEEE 802.15, IEEE 802.16, 3GPP (3rd Generation Partnership Project) specifications (for example, W-CDMA (Wideband Code Division Multiple Access), GSM (registered trademark) (Global System for Mobile Communications), WiMAX (Worldwide Interoperability for Microwave Access), WiMAX2, LTE (Long Term Evolution), and LTE-A (Advanced)). Thus, the information processing apparatuses 200, 300, and 400 can exchange various kinds of information by using the radio communication function.

Here, as an example, an example of a case where radio communication using a wireless local area network (LAN) is performed between the information processing apparatus 200 and the information processing apparatus 300 or between the information processing apparatus 400 and the information processing apparatus 300 will be described.

As this wireless LAN, for example, wireless fidelity (Wi-Fi) direct, tunneled direct link setup (TDLS), an adhoc network, or a mesh network may be used. In addition, as short-distance wireless audio visual (AV) transmission communication used for the communication system 100, for example, Wi-Fi certified miracast (technical specification title: Wi-Fi display) may be used. In addition, the Wi-Fi certified miracast is a mirroring technology for transmitting an audio or a display video reproduced by one terminal to another terminal by using the technology of the Wi-Fi Direct or the TDLS and, similarly, outputting the audio or the video data also from the another terminal.

In addition, in the Wi-Fi certified miracast, a user input back channel (UIBC) is realized on a transmission control protocol/Internet protocol (TCP/IP). The UIBC is a technology for transmitting operation information of an input device such as a mouse, a keyboard, or the like from one terminal to another terminal. In addition, instead of the Wi-Fi certified miracast, other remote desktop software (for example, virtual network computing (VNC)) may be applied.

Here, in the Wi-Fi certified miracast, an image (video) is determined to be compressed and decompressed, for example, by using H.264. In addition, for example, in the Wi-Fi certified miracast, H.264 can be adjusted on the transmission side. In addition, the specification is not limited to H.264 but, for example, may be compatible also with H.265 (for example, high efficiency video coding (HEVC) or scalable video coding extensions of high efficiency video coding (SHVC)), Moving Picture Experts Group (MPEG) 4, or Joint 1Photographic Experts Group (JPEG) 2000. Furthermore, for example, the specification may be compatible also with a line base codec (for example, Wavelet or discrete cosine transform (DCT) performing compression with one or more lines bound together or performing compression/decompression with two or more lines divided into a macroblock of 2×2 or more. In addition, for example, the specification may be compatible also with a codec decreasing the transmission rate without compression such as the DCT or the Wavelet by acquiring a difference between a specific code amount area (a picture, a bundle of a plurality of lines, a macroblock, or the like) and a previous code amount. Furthermore, an image (video) may be transmitted and received without any compression.

In addition, in the first embodiment of the present technology, an example is illustrated in which the information processing apparatus 200 has video data and audio data generated by an imaging operation as transmission targets. Furthermore, in the first embodiment of the present technology, an example is illustrated in which the information processing apparatus 400 has contents (for example, contents formed by video data and audio data) stored in a storage unit (for example, a hard disk) as transmission targets. In addition, as the information processing apparatus 200, an electronic apparatus (for example, a PC, a gaming device, a smartphone, or a tablet terminal) in which a camera is mounted may be used. In addition, as the information processing apparatus 300, another electronic apparatus (for example, an imaging apparatus, a gaming device, a smartphone, or a tablet terminal) including a display unit may be used. Furthermore, in a case where the information processing apparatus 400 has a tethering function, contents stored in an internet services provider (ISP) through a wireless or wired network may be set as transmission targets.

For example, video data generated by an imaging operation of the information processing apparatus 200 is transmitted to the information processing apparatus 300, and a video 11 based on the video data is displayed on a display unit 351 of the information processing apparatus 300. In addition, a content stored in a storage unit (for example, a hard disk) of the information processing apparatus 400 is transmitted to the information processing apparatus 300, and a video 12 based on the content is displayed on the display unit 351 of the information processing apparatus 300.

In this way, in the first embodiment of the present technology, an example is illustrated in which information processing apparatuses (source apparatuses) of the source side are the information processing apparatuses 200 and 400, and an information processing apparatus (sink apparatus) of the sink side is the information processing apparatus 300.

In FIG. 1, a range in which the information processing apparatus 300 can perform direct communication using radio communication through a peer to peer (P2P) direct connection is illustrated as an information transmission range 101. This information transmission range 101 is an information transmission range (service range) of a case where the information processing apparatus 300 is set as the reference.

[Example of Configuration of Information Processing Apparatus (Source Apparatus)]

Figure 2:
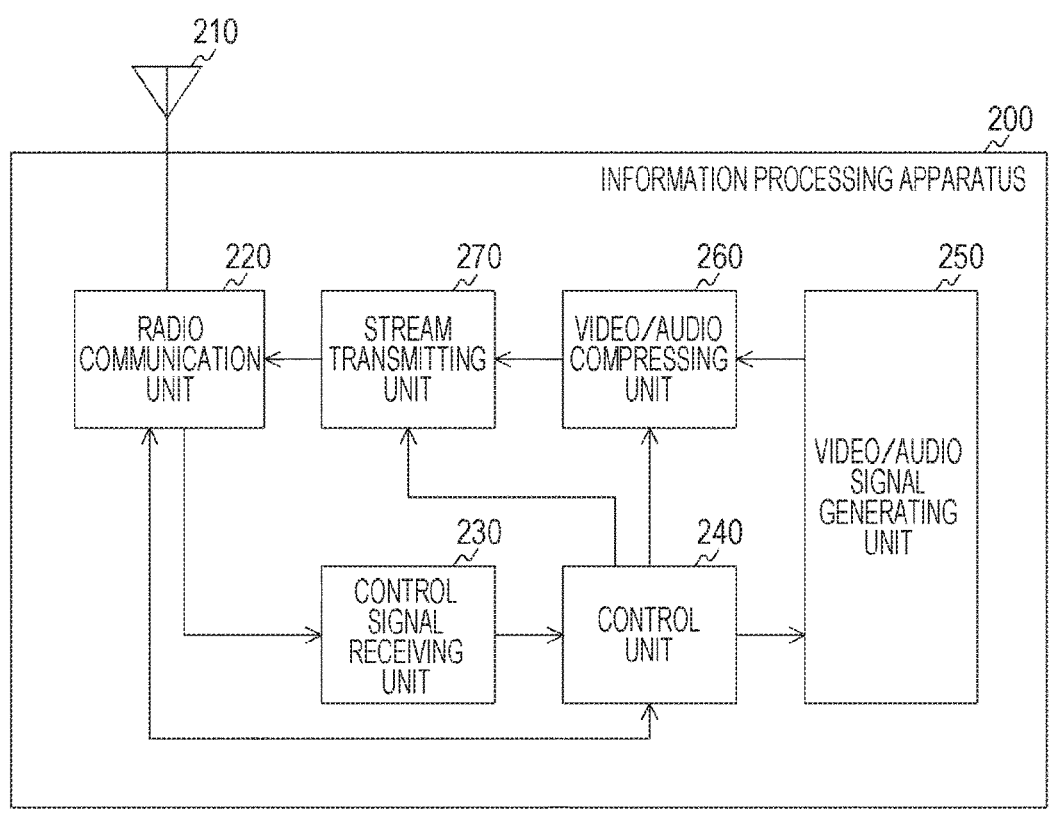
FIG. 2 is a block diagram that illustrates an example of the functional configuration of an information processing apparatus 200 according to the first embodiment of the present technology.

FIG. 2 is a block diagram that illustrates an example of the functional configuration of the information processing apparatus 200 according to the first embodiment of the present technology. In addition, the functional configuration of the information processing apparatus 400 relating to radio communication is a configuration that is approximately same as that of the information processing apparatus 200. For this reason, in the first embodiment of the present technology, only the information processing apparatus 200 will be described, and the description of the information processing apparatus 400 will not be presented.

The information processing apparatus 200 includes: an antenna 210; a radio communication unit 220; a control signal receiving unit 230; a control unit 240; a video/audio signal generating unit 250; a video/audio compressing unit 260; and a stream transmitting unit 270.

The radio communication unit 220, on the basis of the control of the control unit 240, transmits/receives each information (for example, video data and audio data) to/from another information processing apparatus (for example, the information processing apparatus 300) through the antenna 210 by using radio communication. For example, in a case where a video data transmitting process is performed, video data generated by the video/audio signal generating unit 250 is compressed by the video/audio compressing unit 260, and this compressed video data (video stream) is transmitted from the antenna 210 through the radio communication unit 220.

In addition, the radio communication unit 220 can transmit/receive various kinds of information to/from another information processing apparatus (for example, the information processing apparatus 300) by using a plurality of frequency channels. In the first embodiment of the present technology, an example is illustrated in which the radio communication unit 220 has a function for performing transmission/reception using three kinds of frequency channels of 2.4 GHz, 5 GHz, and 60 GHz. In this way, in a case where the source apparatus has a function for performing transmission/reception using a plurality of frequency channels, a sink apparatus (for example, the information processing apparatus 300) can control a frequency channel to be used by each source apparatus.

The control signal receiving unit 230 acquires a control signal (for example, information exchanged with the information processing apparatus 300) transmitted from another information processing apparatus (for example, the information processing apparatus 300) among various kinds of information received by the radio communication unit 220. Then, the control signal receiving unit 230 outputs the acquired control signal to the control unit 240.

The control unit 240 performs control relating to each information transmitted from the information processing apparatus 200. For example, the control unit 240 controls the video/audio signal generating unit 250 and the video/audio compressing unit 260 on the basis of a control signal received by the control signal receiving unit 230. For example, the control unit 240 performs control for changing the resolution of video data that is a transmission target or the number of channels of the audio or control for changing a video area of video data that is a transmission target. In other words, the control unit 240, on the basis of a control signal received by the control signal receiving unit 230, performs transmission control (for example, data transmission speed control or scalability transmission rate control) of a stream that is a transmission target.

In addition, the control unit 240 may be configured to have a function for measuring a radio wave propagation state (link radio wave propagation state) at the time of transmitting/receiving data to/from a sink apparatus through radio communication and transmit a result (radio wave propagation measurement information) of the measurement to the sink apparatus.

Here, the radio wave propagation measurement information, for example, is information that is used when it is determined whether or not the quality of a channel for the sink apparatus is a quality for which video data and audio data can be transmitted and received. In addition, the radio wave propagation measurement information, for example, is used when transmission control (for example, data transmission speed control or scalability transmission rate control) of a stream is performed. Furthermore, the radio wave propagation measurement information will be described in detail with reference to FIG. 4. In addition, instead of the radio wave propagation measurement information, it may be configured such that the number of times of re-transmission of a same packet from the control unit 240 is counted, and transmission control of a stream is performed according to the counted number.

Here, the data transmission speed mainly represents a ratio at which a communication channel is occupied and includes the meaning of a communication speed or a communication capability. In addition, the resolution, for example, is defined as an index of image quality that is configured by an image frame (the number of pixels in vertical and horizontal directions) of video data, a bit rate (compression rate) of video data, and the like. Furthermore, as an index of the image quality, the throughput of a stream may be used. In addition, the number of channels of an audio includes the meaning of a recording/reproducing method of an audio such as mono (1.0 ch) or stereo (2.0 ch). Furthermore, the number of channels of an audio is defined as an index of image quality configured by elements such as a bit rate (compression rate) and the number of channels of audio data and the like. In addition, as an index of the image quality, the throughput of a stream may be used.

In addition, the control unit 240 performs control for enhancing a state that cannot be stabilized according to the data rate control. For example, the control unit 240 acquires system performance information of a sink apparatus by exchanging information with the sink apparatus (for example, the information processing apparatus 300). Here, the system performance information, for example, is performance information relating to the system of the sink apparatus. For example, the system performance information is a usable frequency channel, resolution, a transmission control protocol (TCP), a user datagram protocol (UDP), or the like. In addition, the system performance information, for example, is information representing support for an encryption method, support for standard definition (SD)/high definition (HD), and support for a low power consumption mode. For example, the control unit 240, on the basis of whether or not the sink apparatus supports a low power consumption mode, may select a method for transmission control of a stream (for example, a data transmission speed control method or a scalability transmission rate control method) for further improving the stability of the whole system of the communication system 100.

For example, the control unit 240, inserts information indicating whether or not the information processing apparatus 200 is a mobile apparatus in the middle of exchange of information with the information processing apparatus 300. For example, the information indicating whether or not the information processing apparatus 200 is a mobile apparatus may be included in the capability information relating to the information processing apparatus 200. In addition, in a case where it is acquired that the information processing apparatus 200 is a mobile apparatus, the information processing apparatus 300 can determine that the information processing apparatus 200 does not need to be operated on the basis of a relation with the other connected information processing apparatus. In this way, in a case where it is determined that the information processing apparatus 200 does not need to be operated, the information processing apparatus 200 receives a transmission stop command from the information processing apparatus 300. Then, when the transmission stop command is perceived, the control unit 240 may cause the power for the functions of the video/audio signal generating unit 250, the video/audio compressing unit 260, and the stream transmitting unit 270 to be down for a predetermined time. In addition, the control unit 240 may transit to an intermittent reception mode (a mode in which power is regularly turned on to a degree for receiving a command from the information processing apparatus 300 and is down for the other time) also for the radio communication unit 220.

The video/audio signal generating unit 250 generates data (video data and audio data) that is an output target on the basis of the control of the control unit 240 and outputs the generated data to the video/audio compressing unit 260. For example, the video/audio signal generating unit 250 includes an imaging unit (not illustrated in the drawing) and an audio acquiring unit (not illustrated in the drawing). This imaging unit (for example, a lens, an imaging element, and a signal processing circuit) images a subject, thereby generating a video (video data). In addition, the audio acquiring unit (for example, a microphone) acquires a surrounding audio at the time of generating the video data. The data generated in this way is a target to be transmitted to another information processing apparatus (for example, the information processing apparatus 300).

The video/audio compressing unit 260, on the basis of the control of the control unit 240, compresses (encodes) data (video data and audio data) generated by the video/audio signal generating unit 250. Then, the video/audio compressing unit 260 outputs the compressed data (the video data and the audio data) to the stream transmitting unit 270. In addition, the video/audio compressing unit 260 may be realized by the execution of encoding using software or may be realized by the execution of encoding using hardware. Furthermore, while the video/audio compressing unit 260 is assumed to function as a codec, the video/audio compressing unit 260 is assumed to handle a video or an audio that is uncompressed. In addition, the video/audio compressing unit 260 may function as a scalable codec. Here, the scalable codec is a codec that can be freely adapted, for example, in accordance with the resolution of a reception-side information processing apparatus (sink apparatus), network environments, and the like.

The stream transmitting unit 270, on the basis of the control of the control unit 240, performs a transmission process of transmitting data (video data and audio data) compressed by the video/audio compressing unit 260 as a stream from the antenna 210 through the radio communication unit 220.

In addition, while a display unit, an audio output unit, an operation receiving unit, and the like may be included in the information processing apparatus 200 in addition to each unit described above, these will not be illustrated in FIG. 2. In addition, while an example in which the information processing apparatus 200 generates video data and audio data that are transmission targets is illustrated, the information processing apparatus 200 may be configured to acquire video data and audio data that are transmission targets from an external apparatus. For example, the information processing apparatus 200 may be configured to acquire video data and audio data that are transmission targets from a microphone-attached web camera. In addition, the information processing apparatus 200, regardless of the inside or the outside of the information processing apparatus 200, may be configured to set a content (for example, a content configured by video data and audio data) stored in a storage device (for example, a hard disk) as a transmission target. In such a case, a case where the content stored in the storage device is a compressed content may be also considered. Also in such a case, in a case where the compressed content is compressed using an encoding system defined in a specification employed in the communication system 100, the compressed content may be transmitted as it is without being decoded.

The display unit (not illustrated in the drawing) of the information processing apparatus 200, for example, is a display unit that displays a video generated by the video/audio signal generating unit 250. In addition, as the display unit, for example, a display panel of organic electroluminescence (EL), a crystal light emitting diode (LED), a display (crystal LED display), a liquid crystal display (LCD), or the like may be used.

The audio output unit (not illustrated in the drawing) of the information processing apparatus 200, for example, is an audio output unit (for example, a speaker) that outputs an audio generated by the video/audio signal generating unit 250. In addition, while a video may be output from both the transmitting device and the reception device, it is preferable that an audio is output from any one thereof.

The operation receiving unit (not illustrated in the drawing) of the information processing apparatus 200 is an operation receiving unit that receives an operation input performed by a user and, for example, is a keyboard, a mouse, a game pad, a touch panel, a camera, or a microphone. In addition, the operation receiving unit and the display unit may be configured as one body by using a touch panel for which a user can perform an operation input by placing his finger to be in contact with or to approach a display surface.

[Example of Configuration of Information Processing Apparatus (Reception Side)]

Figure 3:
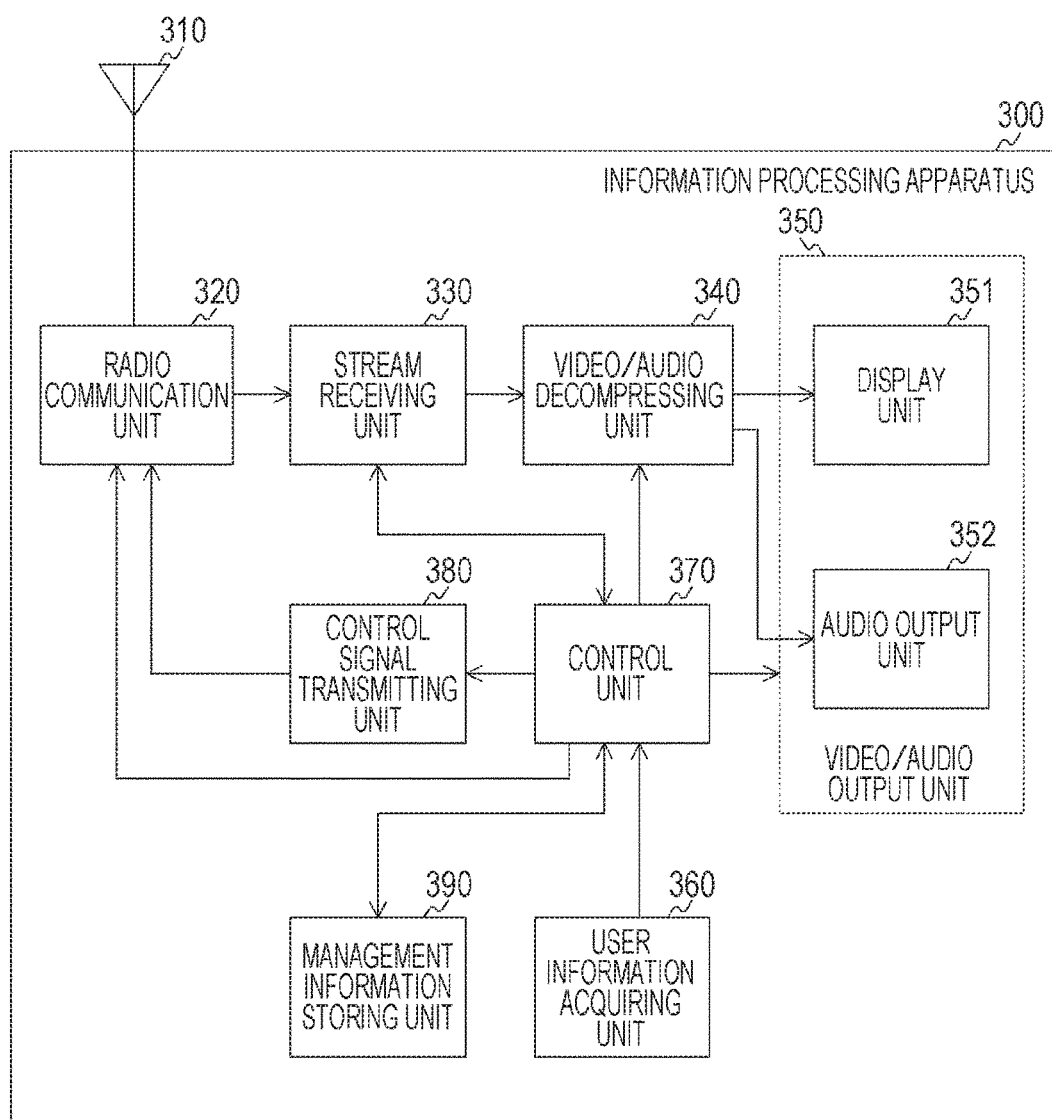
FIG. 3 is a block diagram that illustrates an example of the functional configuration of an information processing apparatus 300 according to the first embodiment of the present technology.

FIG. 3 is a block diagram that illustrates an example of the functional configuration of the information processing apparatus 300 according to the first embodiment of the present technology.

The information processing apparatus 300 includes: an antenna 310; a radio communication unit 320; a stream receiving unit 330; a video/audio decompressing unit 340; a video/audio output unit 350; a user information acquiring unit 360; a control unit 370; a control signal transmitting unit 380; and a management information storing unit 390.

The radio communication unit 320, on the basis of the control of the control unit 370, by using radio communication, transmits/receives each information (for example, video data and audio data) to/from another information processing apparatus (for example, the information processing apparatus 200) through the antenna 310. For example, in a case where a reception process of video data is performed, video data received by the antenna 310 is decompressed (decoded) by the video/audio decompressing unit 340 through the radio communication unit 320 and the stream receiving unit 330. Then, the decompressed video data is supplied to the video/audio output unit 350, and a video corresponding to the decompressed video data is output from the video/audio output unit 350. In other words, a video corresponding to the decompressed video data is displayed on the display unit 351.

In addition, the radio communication unit 320, by using a plurality of frequency channels, is assumed to be able to transmit/receive each information to/from another information processing apparatus (for example, the information processing apparatus 200). In the first embodiment of the present technology, an example in which the radio communication unit 320 has a function for performing transmission/reception using three kinds of frequency channels of 2.4 GHz, 5 GHz, and 60 GHz is illustrated. In other words, the radio communication unit 320 can perform communication using a first frequency band and communication using a second frequency band of a data transmission speed higher than that of the first frequency band. In addition, the control unit 370 controls a frequency channel to be used among a plurality of frequency channels for radio communication with each source apparatus.

In addition, a link between the information processing apparatus 200 and the information processing apparatus 300 and a link between the information processing apparatus 400 and the information processing apparatus 300 may be configured to be performed using a same frequency channel or different frequency channels.

In addition, in the first embodiment of the present technology, while an example in which the radio communication unit 320 has a function for performing transmission/reception using three kinds of the frequency channels of 2.4 GHz, 5 GHz, and 60 GHz is illustrated, the function is not limited thereto. For example, the radio communication unit 320 may be configured to have a function for performing transmission/reception using different frequency channels or two or four or more frequency channels.

The stream receiving unit 330, on the basis of the control of the control unit 370, receives information and streams (for example, a video stream and an audio stream) exchanged with each source apparatus from among each information received by the radio communication unit 320. Then, the stream receiving unit 330 outputs the received command information to the control unit 370 and outputs the received streams to the video/audio decompressing unit 340 and the control unit 370.

Here, the information exchanged with each source apparatus is information transmitted from the source apparatus (for example, the information processing apparatus 200) and, for example, includes a request for acquiring system performance information of the information processing apparatus 300. This system performance information, for example, is information that represents a usable frequency channel, resolution, TCP, UDP, a support for an encryption method, an SD/HD support, and a support for a low power consumption mode.

In addition, the stream receiving unit 330 has a function for measuring a radio wave propagation state (link radio wave propagation state) at the time of transmitting/receiving data to/from a sink apparatus through radio communication. Then, the stream receiving unit 330 outputs a result a result (radio wave propagation measurement information) of the measurement to the control unit 370. In addition, the radio wave propagation measurement information will be described in detail with reference to FIG. 4.

The video/audio decompressing unit 340, on the basis of the control of the control unit 370, decompresses (decodes) streams (video data and audio data) transmitted from another information processing apparatus (for example, the information processing apparatus 200). Then, the video/audio decompressing unit 340 outputs the decompressed data (video data and audio data) to the video/audio output unit 350. In addition, the video/audio decompressing unit 340 may be realized by the execution of decoding using software or may be realized by the execution of decoding using hardware. Furthermore, while the video/audio decompressing unit 340 is assumed to function as a codec, the video/audio decompressing unit 340 is assumed to be able to handle a video or an audio that is uncompressed. In addition, the video/audio decompressing unit 340 is assumed to function also as a scalable codec.

The video/audio output unit 350 includes: a display unit 351; and an audio output unit 352.

The display unit 351 is a display unit that displays each video (for example, videos 11 and 12 illustrated in FIG. 1) based on video data decompressed by the video/audio decompressing unit 340. In addition, as the display unit 351, for example, a display panel such as an organic EL panel, a crystal LED display, or an LCD panel may be used. In addition, as the display unit 351, a touch panel for which a user can perform an operation input by placing his finger to be in contact with or to approach a display surface may be used.

The audio output unit 352 is an audio output unit (for example, a speaker) that outputs various audios (an audio relating to a video displayed on the display unit 351 and the like) based on audio data decompressed by the video/audio decompressing unit 340. Here, as a method of outputting an audio, for example, a method in which only an audio of a source apparatus allocated to a center channel (main video) is reproduced from the speaker, and an audio of a source apparatus allocated to a peripheral channel (sub video) is not reproduced may be used. In addition, as another method of outputting an audio, for example, a method in which reproduction is performed by using the volume of an audio of a source apparatus allocated to the center channel as main with the volume of an audio of a source apparatus allocated to a peripheral channel lowered may be used. In addition, any method of outputting an audio other than these may be used.

The user information acquiring unit 360 acquires information (user information) relating to a user and outputs the acquired used information to the control unit 370. For example, the user information acquiring unit 360 can acquire the user information by receiving input from an operation receiving unit (a keyboard, a mouse, a remote controller, a game pad, or a touch panel) for which a user can directly set a display method. In addition, the operation receiving unit, for example, is an operation member used for designating an arbitrary area of an image displayed on the display unit 351. In addition, for example, the user information acquiring unit 360 can acquire the user information by receiving input from a device such as a camera, a microphone, various sensors (for example, a gyro sensor and a sensor sensing a human body) that is capable of perceiving a user's intention.

For example, the user information acquiring unit 360 acquires user information generated by a user operation when information based on a stream received from another information processing apparatus (for example, the information processing apparatus 200) through radio communication is output from the video/audio output unit 350. This user information, for example, is user information that is generated by a user operation relating to a video displayed on the display unit 351. For example, the user information is information that is generated on the basis of a user operation relating to a video displayed on the display unit 351.

For example, the user information acquiring unit 360 can generate user information by acquiring video data generated by the imaging unit 361 (illustrated in FIG. 1). In addition, for example, the user information acquiring unit 360 may generate user information by acquiring information (for example, positional information and identification information) acquired by an external device (for example, each sensor or a wearable device).

The control unit 370 stores each information acquired by the stream receiving unit 330 in the management information storing unit 390 and manages each source apparatus on the basis of the management information stored in the management information storing unit 390. In addition, the control unit 370 performs transmission control (for example, data transmission speed control or scalability transmission rate control) for streams transmitted from a plurality of source apparatuses so as to improve the stability as the whole system.

For example, the control unit 370 performs transmission control (for example, the data transmission speed control, or the scalability transmission rate control) of streams on the basis of the user information acquired by the user information acquiring unit 360 and the management information stored in the management information storing unit 390. More specifically, the control unit 370, on the basis of the management information stored in the management information storing unit 390, generates a control signal used for the transmission control (for example, the data transmission speed control or the scalability transmission rate control) of streams for each source apparatus. Then, the control unit 370 outputs the generated control signal to the control signal transmitting unit 380. For example, the control unit 370, on the basis of the user information and the management information, changes the resolution of a video displayed on the display unit 351 and generates a control signal used for requesting a transmission rate equivalent to the resolution for each source apparatus. In addition, for example, the control unit 370, on the basis of the user information and the management information, generates a control signal used for determining a display area of the video in the display unit 351. Furthermore, for example, the control unit 370, on the basis of the user information and the management information, generates a control signal used for determining the size of a video in the display unit 351.

In addition, the control unit 370, on the basis of the user information and the management information, performs control for setting a frequency channel and resolution to be used. For example, the control unit 370 sets a frequency channel to be used among a plurality of frequency channels included in the radio communication unit 320 for each source apparatus. In addition, the control unit 370, in a case where a power consumption mode is different for each frequency channel, acquires each mode such that a frequency channel giving care for the power consumption of a mobile device can be set. In other words, the control unit 370 can set a first power consumption mode relating to a first frequency band and a second power consumption mode relating to a second frequency band of a data transmission speed higher than that of the first frequency band.

The control signal transmitting unit 380 performs a transmission process in which a control signal output from the control unit 370 is transmitted to another radio communication apparatus through the radio communication unit 320 and the antenna 310.

The management information storing unit 390 is a table storing information (management information) used for managing each source apparatus connected to the information processing apparatus 300 by using radio communication. In addition, a stored content of the management information storing unit 390 will be described in detail with reference to FIG. 4.

[Example of Stored Content of Management Information Storing Unit]

FIG. 4 is a diagram that schematically illustrates an example of a stored content of the management information storing unit 390 according to the first embodiment of the present technology.

The management information storing unit 390 is a table that stores information (management information) used for managing each source apparatus connected to the information processing apparatus 300 by using radio communication. For example, in the management information storing unit 390, terminal identification information 391, a frequency channel 392, radio wave propagation measurement information 393, apparatus information 394, a band usage level 395, a display form 396, standby/wake-up 397, and multi-receiving diversity support 398 are stored in association with each other.

In the terminal identification information 391, identification information used for identifying a source apparatus connected to the information processing apparatus 300 by using radio communication is stored.

In the frequency channel 392, a frequency channel that is actually used by a source apparatus connected to the information processing apparatus 300 by using radio communication is stored.

In the radio wave propagation measurement information 393, radio wave propagation measurement information relating to a source apparatus connected to the information processing apparatus 300 by using radio communication is stored. This radio wave propagation measurement information is measured by the stream receiving unit 330 for each source apparatus connected to the information processing apparatus 300 by using radio communication.

As the radio wave propagation measurement information 393, for example, a packet error rate (PER), a bit error rate (BER), the number of times of re-transmission of a packet, and a throughput are stored. In addition, as the radio wave propagation measurement information 393, for example, frame missing, a signal to interference ratio (SIR), and a received signal strength indicator (RSSI) are stored. Here, a signal to interference plus noise ratio (SINR) may be used instead of the SIR. In addition, the radio wave propagation measurement information 393 illustrated in FIG. 4 is an example, and thus, at least one thereof may be stored, or any other radio wave propagation measurement information may be measured and stored by the stream receiving unit 330. In addition, the radio wave propagation measurement information measured by a source apparatus may be acquired and stored. Furthermore, it may be configured such that a packet delay received by the reception side is determined, and information relating to the packet delay is used as the radio wave propagation measurement information. For example, when an error occurs, a delay occurs in the transmission to the reception side in accordance with a re-transmission process in the layer 2 and thus, this packet delay becomes one index relating to the radio wave propagation. In addition, the packet delay, for example, in a radio system in which a radio band is shared by a plurality of apparatuses, is an index that represents a link characteristic that is degraded.

In the apparatus information 394, a type (an attribute of a source apparatus) of source apparatus connected to the information processing apparatus 300 by using radio communication is stored. For example, as the type of source apparatus, any one of a mobile apparatus type and a stationary apparatus type is stored. In addition, as the type of source apparatus, one of a type of apparatus used with power plugged and a type of other apparatus may be stored. Furthermore, as the type of source apparatus, one of a battery-driven apparatus type and any other apparatus type may be stored.

In the band usage level 395, a usage level of a band that is used by a source apparatus connected to the information processing apparatus 300 by using radio communication is stored. As the band usage level, for example, resolution or a throughput may be used. In addition, for example, in the band usage level, a throughput in the middle of usage may be stored, and it may be configured such that a table determined in advance is prepared, and a number representing a range of the table is stored and managed.

In the display form 396, a display form (output form) of data based on a stream transmitted from a source apparatus connected to the information processing apparatus 300 by using radio communication is stored. For example, a display form (a main video (center channel) and a sub video (peripheral channel)) of video data based on a stream transmitted from a source apparatus in the display unit 351 is stored. In addition, for example, an output form (a main audio and a sub audio) of audio data, which is based on a stream transmitted from a source apparatus, from the audio output unit 352 is stored. In addition, the display form may be a form not displaying the peripheral channel.

In the standby/wake-up 397, the mode (a standby mode or awake-up mode) of a source apparatus connected to the information processing apparatus 300 by using radio communication is stored. In addition, the standby mode and the wake-up mode will be described in detail with reference to FIGS. 6 to 8.

In the multi-receiving diversity support 398, information representing whether or not a source apparatus connected to the information processing apparatus 300 by using radio communication supports multi-receiving diversity is stored.

In this way, the management information stored in the management information storing unit 390 is information that is managed by associating identification information (the terminal identification information 391) used for identifying another information processing apparatus and capability information relating to another information processing apparatus with each other. In addition, the management information stored in the management information storing unit 390, as the capability information relating to another information processing apparatus, at least includes information (the radio wave propagation measurement information 393) relating to radio wave propagation measurement relating to communication with another information processing apparatus and information (the standby/wake-up 397) relating to power consumption. Furthermore, the management information stored in the management information storing unit 390, as the capability information relating to another information processing apparatus, at least includes information (the display form 396) relating to the display form used for displaying video information. The information relating to the display form, for example, is information representing the main display or sub display of video information.

[Example of Transition of Image]

Figure 5A:
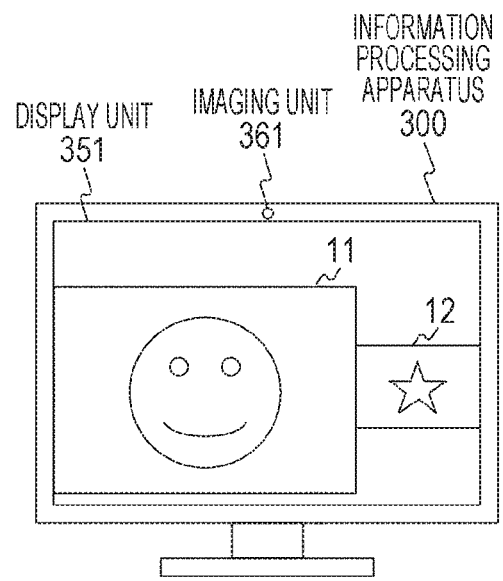
FIGS. 5a and 5b are diagrams that illustrate an example of transitions of an image displayed on a display unit 351 of the information processing apparatus 300 according to the first embodiment of the present technology.
Figure 5B:
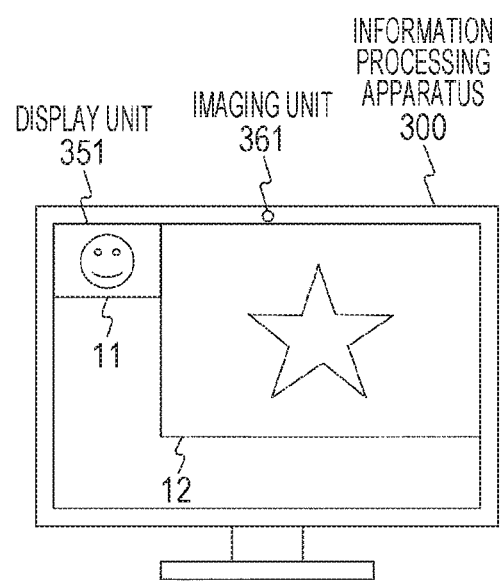

FIGS. 5a and 5b are diagrams that illustrate an example of transitions of an image displayed on the display unit 351 of the information processing apparatus 300 according to the first embodiment of the present technology.

FIG. 5a illustrates an example of a display form in which videos 11 and 12 are displayed on the display unit 351 of the information processing apparatus 300 by setting the video 11 to a center channel and setting the video 12 to a peripheral channel.

FIG. 5b illustrates an example of a display form in which videos 11 and 12 are displayed on the display unit 351 of the information processing apparatus 300 by setting the video 11 to a center channel and setting the video 12 to a peripheral channel.

For example, a case will be described in which each of the information processing apparatus 200 and the information processing apparatus 400 transmits a stream (video data and audio data) of standard resolution to the information processing apparatus 300. In such a case, as illustrated in FIG. 1, the video 11 based on video data supplied from the information processing apparatus 200 and the video 12 based on video data supplied from the information processing apparatus 400 can be displayed on the display unit 351 of the information processing apparatus 300 such that the sizes thereof are the same. In addition, in this example, while the given resolutions and the display areas are defined to be the same, by adding a scaler function to the display unit 351, the video 11 and the video 12 may be rescaled and be displayed on the display unit 351. However, in the embodiment of the present technology, in order to simplify description, the description will be presented on the premise not using this function.

In addition, it may be configured such that, as the display forms of the videos 11 and 12, for example, display forms set at the time of previous communication are stored, and the videos 11 and 12 are displayed on the display unit 351 of the information processing apparatus 300 in accordance with the display forms.

In addition, on the basis of the connection order for the information processing apparatus 300, the display forms of the videos 11 and 12 may be determined. For example, a case will be assumed in which, first, the information processing apparatus 200 is connected to the information processing apparatus 300, and, after this connection, the information processing apparatus 400 is connected to the information processing apparatus 300. In such a case, the videos 11 and 12 are displayed on the display unit 351 of the information processing apparatus 300 by setting the video 11 to the center channel and setting the video 12 to the peripheral channel. In other words, on the basis of the connection order for the information processing apparatus 300, the display may be performed in order of the center channel and the peripheral channel.

In addition, as illustrated in FIG. 5a, in a case where the videos 11 and 12 are displayed on the display unit 351 by setting the video 11 to the center channel and setting the video 12 to the peripheral channel, a case will be assumed in which user information having the video 12 as the center channel is acquired by the user information acquiring unit 360. For example, as a viewer performs an operation for setting the video 12 to the center channel by using a pointer of a remote controller, a gesture, or the like, user information having the video 12 as the center channel is acquired by the user information acquiring unit 360. In this case, as illustrated in FIG. 5b, the videos 11 and 12 are displayed on the display unit 351 by setting the video 12 to the center channel and setting the video 11 to the peripheral channel. In addition, also display positions of the videos 11 and 12 on the display surface of the display unit 351 are determined on the basis of user information (for example, a manual operation, a sight line) acquired by the user information acquiring unit 360.

[Example of Communication of Whole Communication System]

Figure 7:
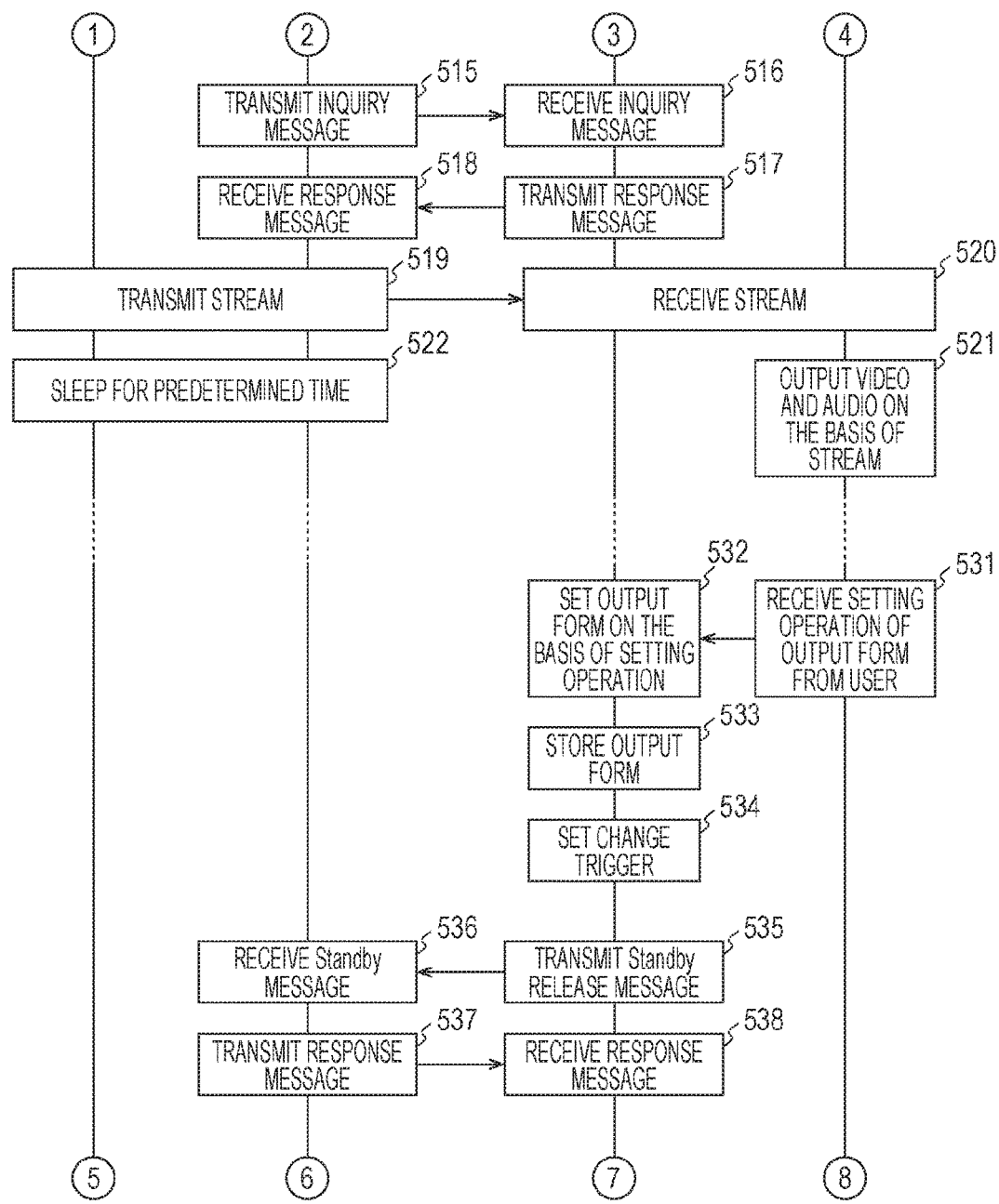
FIG. 7 is a sequence diagram that illustrates an example of a communication process between apparatuses configuring the communication system 100 according to the first embodiment of the present technology.
Figure 8:
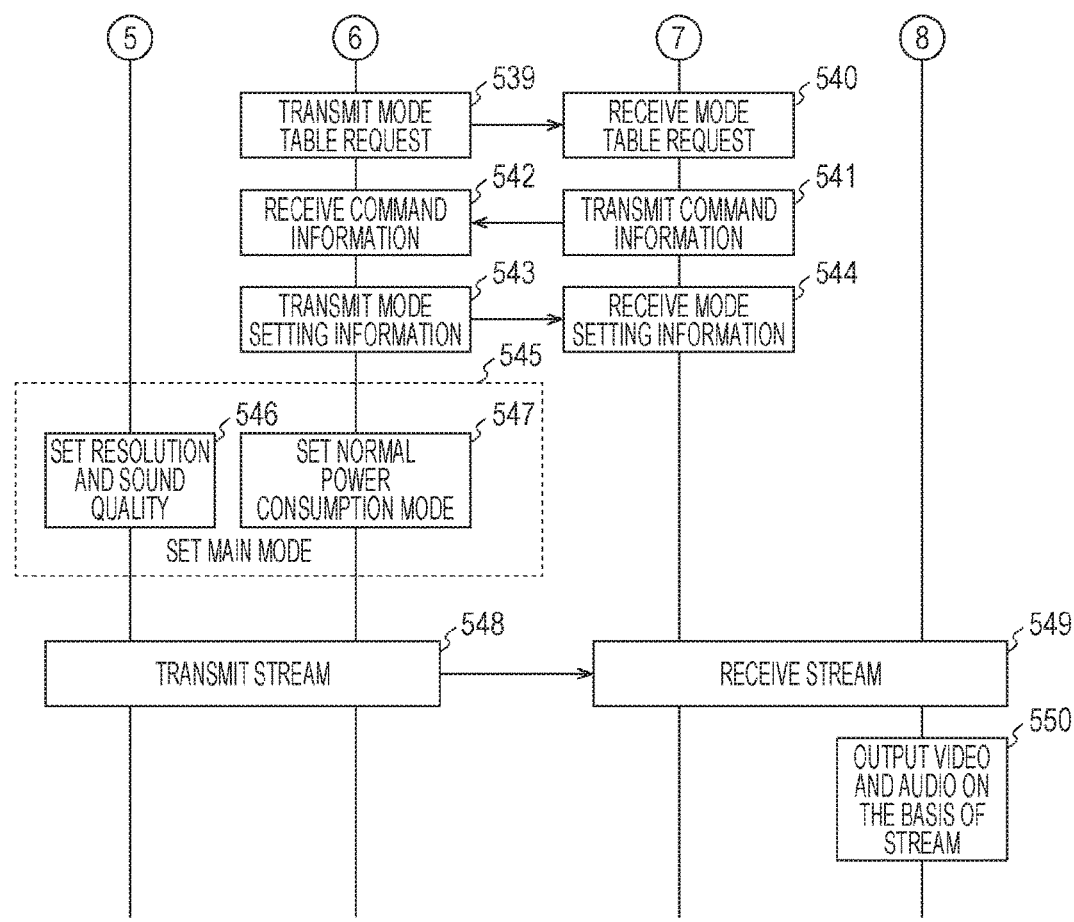
FIG. 8 is a sequence diagram that illustrates an example of a communication process between apparatuses configuring the communication system 100 according to the first embodiment of the present technology.

FIGS. 6 to 8 are sequence diagrams that illustrate an example of a communication process between apparatuses configuring the communication system 100 according to the first embodiment of the present technology. In addition, FIGS. 6 to 8 illustrate an example of a communication process between the information processing apparatus 200 and the information processing apparatus 300.

In addition, in FIGS. 6 to 8, among the units configuring the information processing apparatus 200, the video/audio signal generating unit 250, the video/audio compressing unit 260, and the stream transmitting unit 270 are illustrated as a data transmitting system 201. In addition, the antenna 210, the radio communication unit 220, the control signal receiving unit 230, and the control unit 240 are illustrated as a channel control system 202.

In addition, in FIGS. 6 to 8, among the units configuring the information processing apparatus 300, the antenna 310, the radio communication unit 320, the stream receiving unit 330, the control unit 370, and the control signal transmitting unit 380 is illustrated as a channel control system 301. Furthermore, the video/audio decompressing unit 340, the video/audio output unit 350, and the user information acquiring unit 360 are illustrated as an input/output system 302.

In addition, in FIGS. 6 to 8, an example is illustrated in which, first, a video based on video data supplied from the information processing apparatus 200 is displayed on the display unit 351 of the information processing apparatus 300 as a peripheral channel, and a low power consumption mode is set to the information processing apparatus 200. Subsequently, an example is illustrated in which a video based on video data supplied from the information processing apparatus 200 is displayed on the display unit 351 as a center channel, and a normal power consumption mode is set to the information processing apparatus 200. In other words, in FIGS. 6 to 8, an example of connection setups of the information processing apparatus 200 and the information processing apparatus 300, and an example of a transition of the power consumption mode in the information processing apparatus 200 are illustrated.

First, when the power of the information processing apparatus 300 is turned on, as the display forms (a video display form and an audio display form) of the information processing apparatus 300, display forms (display forms at the time of turning off the power of the information processing apparatus 300) of the previous time are set (501). In addition, the control unit 370 of the information processing apparatus 300 stores the management information of each source apparatus connected to the information processing apparatus 300 by using radio communication in the management information storing unit 390 (illustrated in FIG. 4). Furthermore, the control unit 370 of the information processing apparatus 300, as illustrated in FIGS. 5a and 5b, on the basis of the display forms of the previous time, displays videos 11 and 12 respectively corresponding to two streams transmitted from the information processing apparatus 200 and the information processing apparatus 400 on the display unit 351.

Subsequently, a case will be considered in which a user performs an operation of setting display forms (502). In such a case, a control signal relating to the setting operation is acquired by the user information acquiring unit 360 as user information, and the user information is output to the control unit 370. Then, the control unit 370, on the basis of the user information, changes the stored content of the management information storing unit 390 (illustrated in FIGS. 4) (503 and 504). For example, as illustrated in FIG. 5b, a case will be considered in which a setting operation (change operation) for setting the video 11 based on the video data transmitted from the information processing apparatus 200 to the peripheral channel is performed. In such a case, the control unit 370 changes the display form 396 (illustrated in FIG. 4) of the information processing apparatus 200 to "sub" in the management information storing unit 390 (503 and 504).

In addition, the information processing apparatus 200 transmits a mode table request (a request insuring resolution/sound quality, a low power consumption mode, and the like) to the information processing apparatus 300 regularly or irregularly (including only the start time) (505 and 506). This mode table request requests the transmission of each information (management information relating to the information processing apparatus 300 and information (for example, information of resolution at which display can be performed by the information processing apparatus 200) used for communicating with the information processing apparatus 200) managed by the information processing apparatus 300.

When the mode table request is received (506), the information processing apparatus 300 transmits command information according to the mode table request (507 and 508). This command information is information relating to the information processing apparatus 200 that is used for the information processing apparatus 300 to request settings for the information processing apparatus 200 in consideration of the radio wave propagation environments and the display form.

For example, the command information is information that includes display form information (for example, a center channel or a peripheral channel) of resolution/sound quality, support/no-support of a low power consumption mode, a manufacturer name, and inclusion/no-inclusion of the multi-receiving diversity function. In addition, for example, the command information is information that includes mode control table responses such as resolution/sound quality, a type of video/audio codec, inclusion/no-inclusion of a 3D function, inclusion/no-inclusion of content protection, a display size of a display device, topology information, usable protocols, setting information (port information and the like) of such protocols, connection interface information (a connector type and the like), positions of horizontal synchronization/vertical synchronization, performance priority request information of a source apparatus, support/no-support of the low power consumption mode, and the like, a transmission maximum throughput or a receivable maximum throughput through radio communication, central processing unit (CPU) power, a battery remaining amount, and power supply information. In addition, each of such information is included in a part of the capability information. Here, the display form information of the resolution/sound quality relating to the information processing apparatus 200, for example, is information that represents whether the display form of the data from the information processing apparatus 200 is main or sub.

In addition, the information processing apparatus 300 transmits a request relating to the setting of the resolution/sound quality or the low power consumption mode to be included in the command information as a parameter at a time point of the information processing apparatus 300.

In addition, the information processing apparatus 300, in addition to each information relating to the information processing apparatus 200, may be configured to transmit each information relating to all the source apparatuses as command information. In such a case, the information processing apparatus 200 selects and uses only information dedicated for the own apparatus. In addition, in the case of an apparatus that is compliant with Wi-Fi certified miracast, wfd-audio-codecs, wfd-video-formats, wfd-content-protection, wfd-displayed id, wfd-coupled sink, wfd-client-rtp ports, wfd-I2C, wfd-uibc capability, wfd-connector type, wfd-standby-resume-capability, and the like defined as an RTSP message are supported, in the command, there is no restriction on the content of a transmitted message.

In a case where the command information is received (508), the control unit 240 of the information processing apparatus 200, on the basis of the command information, specifies the display form of data transmitted from the information processing apparatus 200 to be main or sub. In addition, the control unit 240 of the information processing apparatus 200, on the basis of the command information, determines whether or not a function corresponding to the power consumption operation mode is included in the information processing apparatus 300. Subsequently, the control unit 240 of the information processing apparatus 200 transmits mode setting information representing an indication for setting the specified displayed form to the information processing apparatus 300 (509 and 510). Here, it is assumed that the display form of the data transmitted from the information processing apparatus 200 is specified to be sub. In addition, the function corresponding to the low power consumption mode is included in the information processing apparatus 300. Thus, the control unit 240 of the information processing apparatus 200 transmits mode setting information used for giving a notification of an indication of setting the specified display form (sub) and an indication of setting the low power consumption mode to the information processing apparatus 300 (509 and 510).

In addition, in this example, while an example in which the low power consumption mode is set by specifying the center channel or the peripheral channel on the basis of the command information is illustrated, the low power consumption mode may be set without using whether the channel is the center channel or the peripheral channel as a determination reference. For example, by exchanging a permission flag for transition to the low power consumption mode between the source apparatus and the sink apparatus, the low power consumption mode may be set.

Subsequently, the control unit 240 of the information processing apparatus 200 sets a low-speed video/audio transmitting mode (standby mode) (peripheral channel) as a transmitting mode (511). In this way, in the data transmitting system 201, resolution for displaying the peripheral channel and a sound quality for outputting a sub audio are set (512). In addition, in the channel control system 202, the low power consumption mode is set (513).

Here, in this way, in a case where the low power consumption mode is set, both the sink apparatus and the source apparatus need to include the function. In addition, for example, there are many mobile apparatuses (for example, a portable phone, a smartphone, and a tablet terminal) that are battery driven for the operation. For this reason, in a case where the display form of data transmitted from the own apparatus is not main (in a case where the display form is sub), it is preferable to decrease the battery consumption of the own apparatus as much as possible. Thus, it is preferable to set the low power consumption mode to a source apparatus for which the display form in the sink apparatus is set to sub. In addition, in the setting process (512), a setting may be performed such that only an audio of a source apparatus assigned to the center channel is reproduced from the speaker, but an audio of a source apparatus assigned to the peripheral channel is not reproduced. Furthermore, a setting may be performed such that reproduction is performed with the volume of an audio of a source apparatus assigned to the center channel set to be main and lower the volume of an audio of a source apparatus assigned to the peripheral channel lowered.

In this way, the control unit 370 of the information processing apparatus 300, in a case where the display form is set as the peripheral channel (sub display), performs control for setting the low power consumption mode to the information processing apparatus 200. In other words, the control unit 370 of the information processing apparatus 300 performs control for setting the power consumption mode to the information processing apparatus 200 on the basis of the display form of the display unit 351 outputting video information on the basis of the stream.

In this way, in a case where the low power consumption mode is set (513), the control unit 240 of the information processing apparatus 200 starts intermittent transmission (514 to 522).

More specifically, the information processing apparatus 200 stops the transmission process only for a predetermined time to as to cause each unit to be in a sleep state (514). Subsequently, when the predetermined time elapses (514), the information processing apparatus 200 wakes up each unit of the information processing apparatus 200 for performing a transmission process and performs the transmission process toward the information processing apparatus 300 (515 to 520).

For example, the control unit 240 of the information processing apparatus 200 transmits an inquiry message used for checking whether or not there is any change (for example, a change in the display form) in the information processing apparatus 300 to the information processing apparatus 300 (515 and 516).

When the inquiry message is received (516), the control unit 370 of the information processing apparatus 300 transmits a response message used for giving a notification of whether there is any change (for example, a change in the display form) to the information processing apparatus 200 (517 and 518). Here, it is assumed that there is no change (for example, no change in the display form) of the information processing apparatus 300. For this reason, the control unit 370 of the information processing apparatus 300 transmits a response message used for giving a notification of no change (for example no change in the display form) to the information processing apparatus 200 (517 and 518).

In this way, in a case where a response message indicating no change (for example, no change in the display form) is received (518), the setting does not need to be changed in the information processing apparatus 200. For example, the control unit 240 of the information processing apparatus 200 transmits a stream used for outputting a peripheral channel and a sub audio to the information processing apparatus 300 (519 and 520). In this way, when a stream is received (520), the information processing apparatus 300 outputs a video and an audio based on the received stream (521). For example, as illustrated in FIG. 5b, a video 11 based on the stream transmitted from the information processing apparatus 200 is displayed on the display unit 351 as the peripheral channel.

In addition, when the transmission process ends (519), the information processing apparatus 200 stops the transmission process only for a predetermined time, thereby causing each unit to sleep (522). Furthermore, until there is a change request from the information processing apparatus 300, intermittent transmission is continuously performed.

Here, in the intermittent transmission, there is a period in which a stream is not transmitted from the information processing apparatus 200. For this reason, it is preferable for the information processing apparatus 300 to perform a display process in which a video corresponding to a latest stream received from the information processing apparatus 200 is interpolated and displayed. However, a case may be considered in which the information processing apparatus 300 does not have an interpolation process function. In such a case, during the sleep period, a video transmitted from the information processing apparatus 200 cannot be displayed on the display unit 351. For this reason, in a case where the information processing apparatus 300 does not have the interpolation process function, the transmission of video data from the information processing apparatus 200 may be continuously performed. For example, among streams that are targets for transmission from the information processing apparatus 200, final video data at the time of stopping the transmission is stored in a transmission buffer. Then, during the sleep period, while the image processing of the information processing apparatus 200 is stopped, the transmission process is continuously performed for a radio link, and the transmission of video data stored in the transmission buffer is continuously performed.

In addition, during the sleep period, only a video corresponding to a stream transmitted from the information processing apparatus 400 may be displayed on the display unit 351. For example, a video corresponding to a stream transmitted from the information processing apparatus 400 may be displayed on the whole surface of the display unit 351.

Next, an example will be illustrated in which a user performs a setting operation (change operation) of the display form.

In a case where a setting operation (change operation) of the display form is performed by the user (531), as described above, the control unit 370, on the basis of user information relating to the setting operation, changes the stored content of the management information storing unit 390 (illustrated in FIGS. 4) (532 and 533). For example, as illustrated in FIG. 5a, a case will be described in which a setting operation (change operation) for setting the video 11 based on video data transmitted from the information processing apparatus 200 to the center channel is performed. In such a case, the control unit 370 changes the display form 396 (illustrated in FIG. 4) of the information processing apparatus 200 in the management information storing unit 390 to "main" (532 and 533).

Here, as described above, in a case where the low power consumption mode is set in the information processing apparatus 200, the information processing apparatus 200 is assumed to be in the sleep state. In this way, in a case where the information processing apparatus 200 is in the sleep state, an indication representing a setting operation (change operation) of the display form performed by the user cannot be notified to the information processing apparatus 200.

Thus, in a case where a setting operation (change operation) of the display form is performed by the user (531), and the stored content of the management information storing unit 390 (illustrated in FIG. 4) is changed (532 and 533), the control unit 370 of the information processing apparatus 300 sets a change trigger (534). This change trigger is a trigger used for notifying an indication of a setting operation (change operation) of the display form that is performed by the user to the information processing apparatus 200 in a case where an inquiry message is received from the information processing apparatus 200. According to this change trigger, a state in which the information processing apparatus 200 is in the standby mode is released, and an indication of a setting operation (change operation) of the display form that is performed by the user is notified to the information processing apparatus 200.

Here, a case will be considered in which each unit of the information processing apparatus 200 is in a waken-up state, and a transmission process toward the information processing apparatus 300 is started. In such a case, the control unit 370 of the information processing apparatus 300 transmits a standby release message to the information processing apparatus 200 (535 and 536).

When the standby release message is received (536), the control unit 240 of the information processing apparatus 200 transmits a response message to the information processing apparatus 300 (537 and 538).

In this way, by using the standby mode release request from the sink apparatus (535 to 538), the state of the setting in the information processing apparatus 200 needs to be inquired. For this reason, the control unit 240 of the information processing apparatus 200 transmits a mode table request to the information processing apparatus 300 (539 and 540). This mode table request, as described above, requests the transmission of each information (the management information relating to the information processing apparatus 200) managed by the information processing apparatus 300. In addition, in each of the processes (535 to 538) described above, exchange (for example, a response message for an inquiry message in each of the processes (515 to 518)) of an indication of a change (for example, a change in the display form) may be performed.

When the mode table request is received (540), the information processing apparatus 300 transmits command information according to the mode table request (541 and 542). Here, in a case where the command information has already been transmitted from the information processing apparatus 300 to the information processing apparatus 200, the information processing apparatus 200 has already acquired information included in the command information. For this reason, here, the information processing apparatus 300 may be configured to transmit only difference information as the command information according to the mode table request (541 and 542). This difference information is information relating to a change and, for example, is display form information of the resolution/sound quality relating to the information processing apparatus 200.

In a case where the command information is received (542), the control unit 240 of the information processing apparatus 200 specifies whether the display form of data transmitted from the information processing apparatus 200 is main or sub on the basis of the command information. Subsequently, the control unit 240 of the information processing apparatus 200 transmits mode setting information representing an indication of setting the specified display form to the information processing apparatus 300 (543 and 544). Here, the display form of the data transmitted from the information processing apparatus 200 is assumed to be specified to be main. Thus, the control unit 240 of the information processing apparatus 200 transmits mode setting information used for giving a notification of setting the specified display form (main) and an indication of setting the normal power consumption mode to the information processing apparatus 300 (543 and 544). In addition, in the case of an apparatus that is compliant with Wi-Fi certified miracast, each of the processes (539 to 544) may be performed through a capability re-negotiation. In the case of the capability re-negotiation, for a setting value of which the display form is not changed in the process (534), a negotiation does not need to be performed again. For example, there are the wfd-displayed id, the wfd-client-rtp ports, the wfd-I2C, the wfd-connector type, and the like.

Subsequently, the control unit 240 of the information processing apparatus 200 sets the high-speed video/audio transmitting mode (center channel) as the transmitting mode (545). In this way, in the data transmitting system 201, resolution for displaying the center channel and the sound quality for outputting the main audio are set (546). In addition, in the channel control system 202, the normal power consumption mode is set (547).

In this way, in a case where the normal power consumption mode is set (547), the control unit 240 of the information processing apparatus 200 starts a normal transmission process (548 and 549). In other words, the information processing apparatus 200 transmits streams used for outputting the center channel and the main audio to the information processing apparatus 300 (548 and 549). In this way, when the streams are received (549), the information processing apparatus 300 outputs a video and an audio that are based on the received stream (550). For example, as illustrated in FIG. 5a, the video 11 based on the stream transmitted from the information processing apparatus 200 is displayed on the display unit 351 as the center channel.

In addition, in this example, an example is illustrated in which, in a case where the power of the information processing apparatus 300 is turned on, as the display form of the display unit 351, the display form (the display form at the time of turning off the power of the information processing apparatus 300) of the previous time is set. However, in a case where the power of the information processing apparatus 300 is turned on, another display form may be set. For example, in a case where the power of the information processing apparatus 300 is turned on, a default display form may be constantly set. Alternatively, on the basis of the connection order for the information processing apparatus 300, the display form may be determined.

In addition, in FIGS. 6 to 8, an example is illustrated in which the information processing apparatus 200 inquires about the setting information of the information processing apparatus 300, and a transmission parameter is set on the basis of the received parameter information. However, it may be configured such that the information processing apparatus 200 requests the information processing apparatus 300 to set a parameter desired be set, and the information processing apparatus 300 sets the parameter at a time point when a response of an indication of no problem is received. This example is illustrated in FIGS. 9 and 10.

[Example of Communication]

Figure 9:
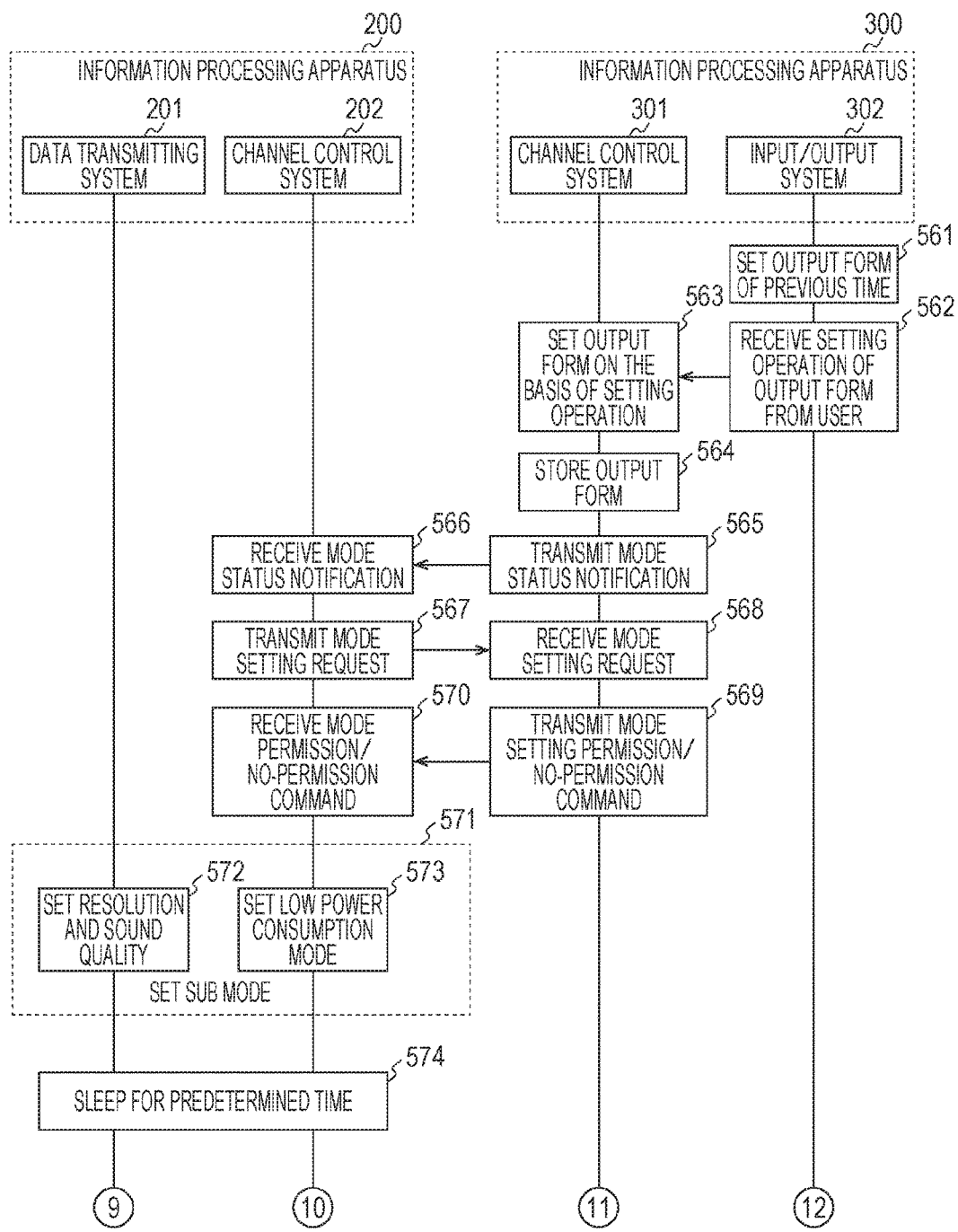
FIG. 9 is a sequence diagram that illustrates an example of a communication process between apparatuses configuring the communication system 100 according to the first embodiment of the present technology.
Figure 10:
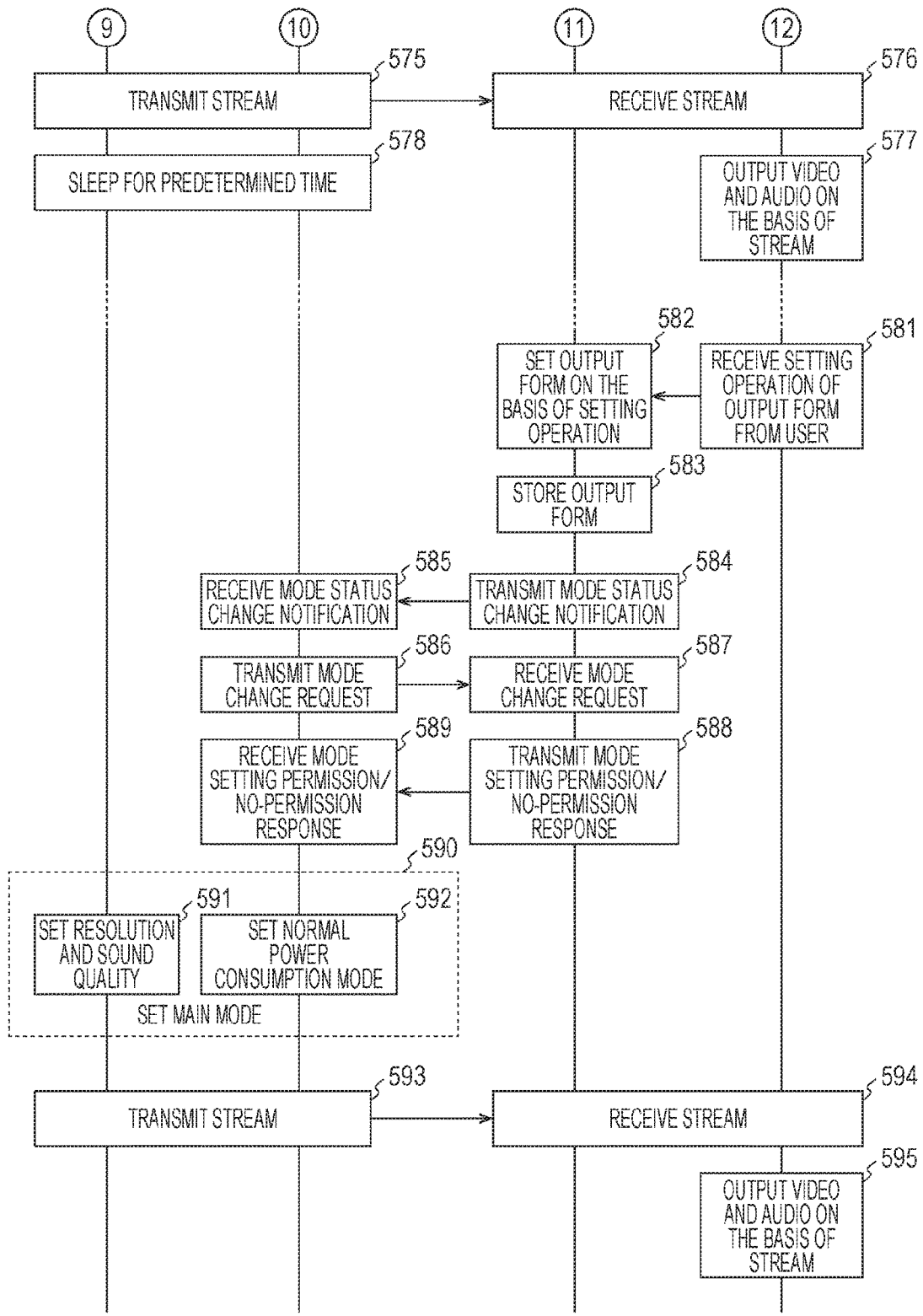
FIG. 10 is a sequence diagram that illustrates an example of a communication process between apparatuses configuring the communication system 100 according to the first embodiment of the present technology.
Figure 11:
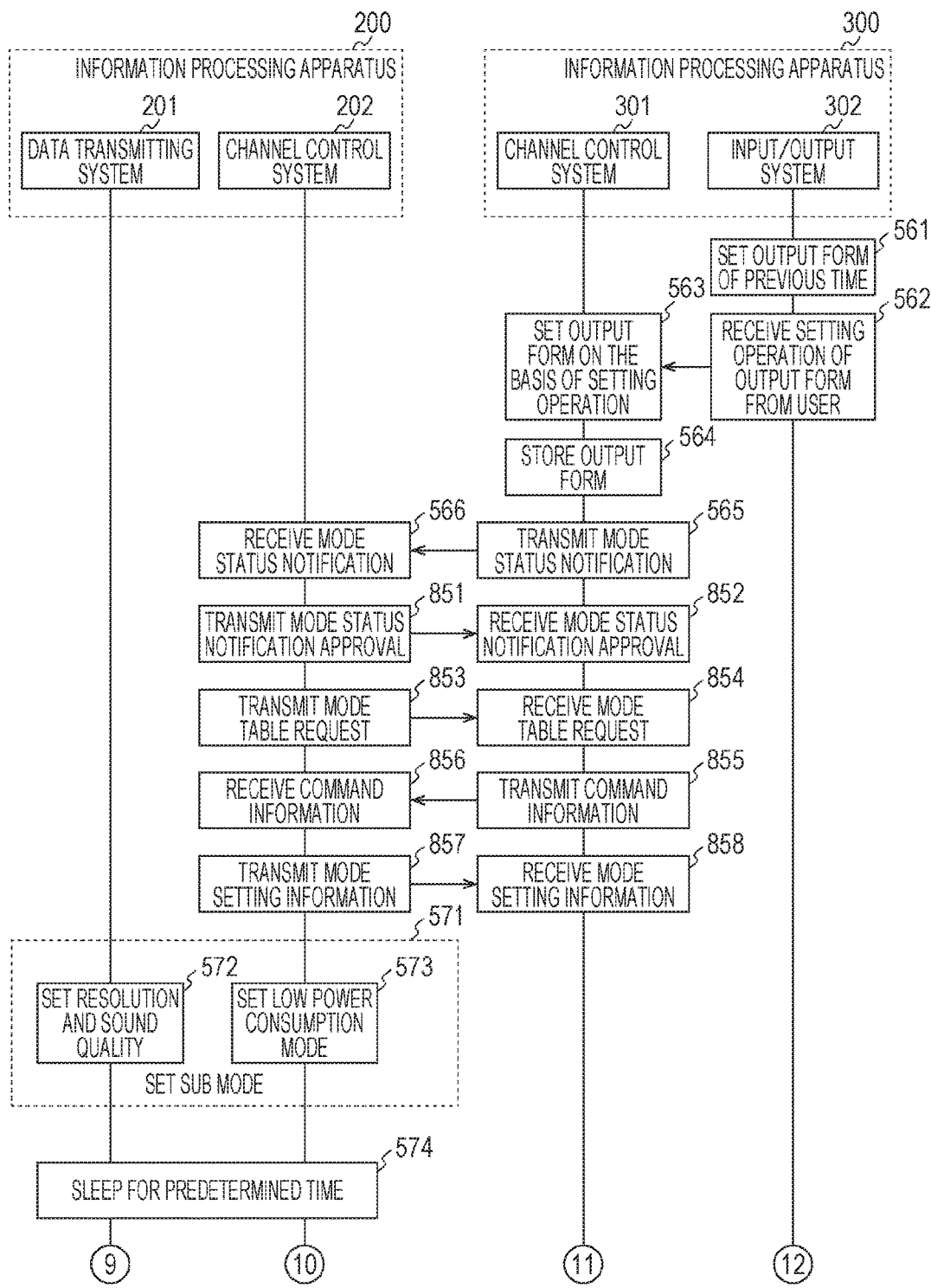
FIG. 11 is a sequence diagram that illustrates an example of a communication process between apparatuses configuring the communication system 100 according to the first embodiment of the present technology.

FIGS. 9 to 11 are sequence diagrams that illustrate an example of a communication process between apparatuses configuring the communication system 100 according to the first embodiment of the present technology. FIGS. 9 and 10 illustrate a modification of a part of the example of the communication process illustrated in FIGS. 6 to 8. For this reason, in FIGS. 9 and 10, a same reference numeral will be assigned to a part common to the example of the communication process illustrated in FIGS. 6 to 8, and a part of the description thereof will not be presented. In addition, FIG. 11 is a modification of a part of the example of the communication process illustrated in FIG. 9. For this reason, in FIG. 11, a same reference numeral will be assigned to apart common to the example of the communication process illustrated in FIG. 9, and a part of the description thereof will not be presented.

Processes (561 to 564) illustrated in FIG. 9 respectively correspond to the processes (501 to 504) illustrated in FIG. 6.

Subsequently, the control unit 370 of the information processing apparatus 300 transmits a mode status notification used for giving a notification of the display form set by the user to the information processing apparatus 200 (565 and 566). This mode status notification is information used for giving a notification of mode control table responses such as resolution/sound quality that can be set by the information processing apparatus 200, a type of video/audio codec, inclusion/no-inclusion of a 3D function, inclusion/no-inclusion of content protection, a display size of a display device, topology information, usable protocols, setting information (port information and the like) of such protocols, connection interface information (a connector type and the like), positions of horizontal synchronization/vertical synchronization, performance priority request information of a source apparatus, support/no-support of the low power consumption mode, and the like, a transmission maximum throughput or a receivable maximum throughput through radio communication, CPU power, a battery remaining amount, power supply information and the like together with the display form (for example, main or sub) set by the user.

In this way, immediately after the user's setting operation of the display form in the information processing apparatus 300, a mode status notification used for giving a notification of the display form relating to the setting operation can be transmitted to the information processing apparatus 200. For this reason, a setting time (change time) between the information processing apparatus 200 and the information processing apparatus 300 connected using radio communication can be shortened.

When the mode status notification is received (566), the control unit 240 of the information processing apparatus 200 compares a status parameter specified by the received mode status notification with a status parameter of the own apparatus. Subsequently, the control unit 240 of the information processing apparatus 200 determines setting contents (for example, the resolution/sound and the power consumption mode) on the basis of a result of the comparison. Subsequently, the control unit 240 of the information processing apparatus 200 transmits a mode setting request used for giving a notification of the determined setting contents (for example, the resolution/sound and the power consumption mode) to the information processing apparatus 300 (567 and 568).

When the mode setting request is received (568), the control unit 370 of the information processing apparatus 300 determines whether the setting contents (for example, the resolution/sound and the power consumption mode) specified by the received mode setting request are to be permitted or not. Then, the control unit 370 of the information processing apparatus 300 transmits a mode setting permission/no-permission command used for giving a notification of a result of the determination to the information processing apparatus 200 (569 and 570).

When the mode setting permission/no-permission command is received (570), the control unit 240 of the information processing apparatus 200 checks the content of the mode setting permission/no-permission command. For example, in a case where the information processing apparatus 200 receives a mode setting permission/no-permission command indicating permission for the setting contents relating to the transmitted mode setting request, the control unit 240 of the information processing apparatus 200 sets a low-speed video/audio transmitting mode (peripheral channel) as the transmitting mode (571). In addition, processes (571 to 574) illustrated in FIG. 9 respectively correspond to the processes (511 to 514) illustrated in FIG. 6. Furthermore, processes (575 to 578) illustrated in FIG. 10 respectively correspond to the processes (519 to 522) illustrated in FIG. 7.

In addition, in a case where the information processing apparatus 200 receives a mode setting permission/no-permission command indicating no permission for the setting contents relating to the transmitted mode setting request, the control unit 240 of the information processing apparatus 200 newly determines setting contents (for example, the resolution/sound and the power consumption mode). Then, the control unit 240 of the information processing apparatus 200 transmits a mode setting request used for giving a notification of the setting contents (for example, the resolution/sound and the power consumption mode) that are newly determined to the information processing apparatus 300.

Processes (581 to 583) illustrated in FIG. 10 respectively correspond to the processes (531 to 533) illustrated in FIG. 7.

Subsequently, the control unit 370 of the information processing apparatus 300 transmits a mode status change notification used for giving a notification of the display form changed by the user to the information processing apparatus 200 (584 and 585). This mode status change notification is information used for giving a notification of the resolution/sound quality that can be set by the information processing apparatus 200, support/no-support for the low power consumption mode, and the like together with the display form (for example, "main" or "sub") changed by the user.

When the mode status change notification is received (585), the control unit 240 of the information processing apparatus 200 determines setting contents (for example, the resolution/sound and the power consumption mode). The process of determining the setting contents is similar to the determination process described above. Subsequently, the control unit 240 of the information processing apparatus 200 transmits a mode change request used for giving a notification of the determined setting contents (for example, the resolution/sound and the power consumption mode) to the information processing apparatus 300 (586 and 587).

When the mode change request is received (587), the control unit 370 of the information processing apparatus 300 determines whether the setting contents (for example, the resolution/sound and the power consumption mode) specified by the received mode change request are to be permitted or not. Then, the control unit 370 of the information processing apparatus 300 transmits a mode setting permission/no-permission command used for giving a notification of a result of the determination to the information processing apparatus 200 (588 and 589).

When the mode setting permission/no-permission command is received (589), the control unit 240 of the information processing apparatus 200 checks the content of the mode setting permission/no-permission command and sets a transmitting mode (590). In addition, this checking process is similar to the checking process described above. In addition, processes (590 to 595) illustrated in FIG. 10 respectively correspond to the processes (545 to 550) illustrated in FIG. 8.

Here, in a case where switching between the peripheral channel and the center channel is performed, the source apparatus may transmit information (for example, information used for perceiving the start of a group of picture (GOP) or information used for perceiving the start of a picture) representing the switching timing thereof with being included in a stream. In other words, in a case where switching between a main display and a sub display is performed, the source apparatus may transmit information representing the switching timing to the sink apparatus. In such a case, the sink apparatus that has received the stream can perform switching between the peripheral channel and the center channel at appropriate timing on the basis of the information representing the timing.

Here, in FIGS. 6 to 10, an example is illustrated in which the standby/wake-up of a source apparatus connected to the sink apparatus is controlled. Here, on the basis of the standby/wake-up of a source apparatus connected to the sink apparatus, the standby/wake-up of the sink apparatus may be controlled. For example, in a case where all the source apparatuses connected to the sink apparatus are in the standby state, the sink apparatus may be controlled to be in the standby state. In addition, in a case where at least one of source apparatuses connected to the sink apparatus is in the wake-up state, the sink apparatus may be controlled to be in the wake-up state.

In addition, a modified example of a case where a change in the stored content stored in the process (564) is notified from the sink apparatus to the source apparatus, and a mode table request is transmitted from the source apparatus in the processes (565 to 570) illustrated in FIG. 9 is illustrated in FIG. 11.

As illustrated in FIG. 11, the information processing apparatus 300 notifies a change (564) in the display form to the information processing apparatus 200, and, in order to urge the transmission of a mode setting request from the information processing apparatus 200, transmits a mode status notification (565 and 566). The information processing apparatus 200 that has received this mode status notification, in a case where the support can be performed, transmits a mode status notification approval representing an indication of an approval of the mode status notification to the information processing apparatus 300 (851 and 852).

In this way, after the mode status notification approval is transmitted (851), each of processes (853 to 858) is performed. In addition, these processes (853 to 858) respectively correspond to the processes (505 to 510) illustrated in FIG. 6. In this way, after the mode status notification approval is transmitted (851), by performing the processes (853 to 858), for a state change (a change in the display form (564)), transmission control (for example, data transmission speed control and scalability transmission rate control) of a stream can be appropriately performed.

Here, for example, in a command prepared in the Wi-Fi certified miracast, an RTSPM5 message including wfd-triggered-method, in the current state, is defined as a command transmitted by the information processing apparatus 200 to the information processing apparatus 300. However, in a case where the RTSPM5 including the wfd-triggered-method can be expanded as a command transmitted by the information processing apparatus 300 to the information processing apparatus 200, the RTSPM5 message including the wfd-triggered-method is received by the information processing apparatus 200, and the information processing apparatus 200 can start capability re-negotiation with the information processing apparatus 300. In other words, the management information can be exchanged by using the RTSPM5 message including the wfd-triggered-method. For example, the control unit 370 of the information processing apparatus 300 can perform control of transmitting the RTSPM5 message including the wfd-triggered-method defined in the specification of the Wi-Fi certified miracast specification to the information processing apparatus 200, in a case where the management information is changed, as a command used for notifying the change to the information processing apparatus 200. In addition, a new command may be newly defined in addition to such a command so as to be equivalent thereto.

[Example of Operation of Information Processing Apparatus (Source Apparatus)]

Figure 12:
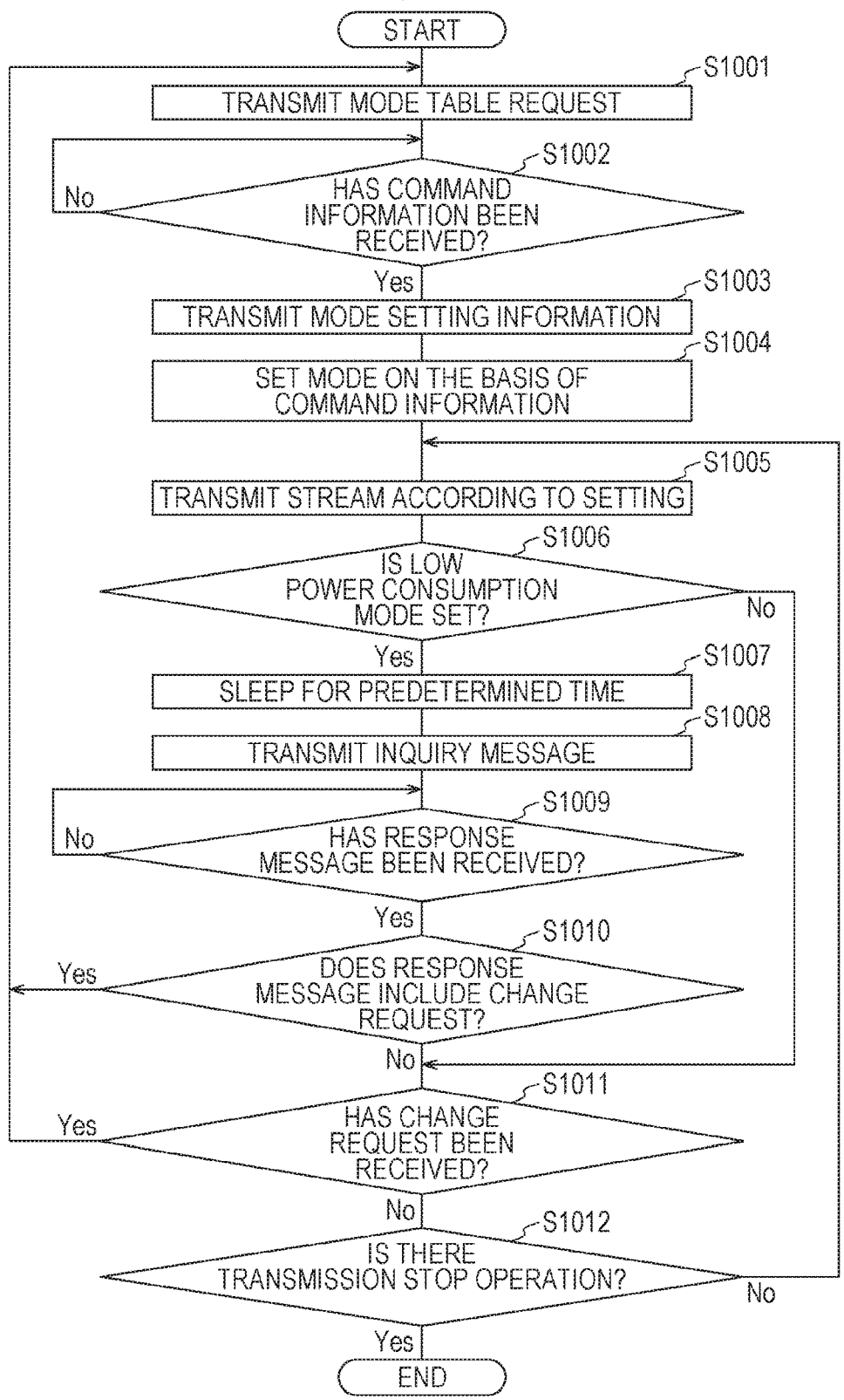
FIG. 12 is a flowchart that illustrates an example of the processing sequence of a data transmitting process performed by an information processing apparatus 200 according to the first embodiment of the present technology.

FIG. 12 is a flowchart that illustrates an example of the processing sequence of a data transmitting process performed by the information processing apparatus 200 according to the first embodiment of the present technology. In FIG. 12, an example of a case where, first, the information processing apparatus 200 transmits streams (video data and audio data) of standard resolution to the information processing apparatus 300 is illustrated. In such a case, the information processing apparatus 300 is assumed to output based on the streams.

First, the control unit 240 transmits a mode table request to the information processing apparatus 300 (Step S1001). Subsequently, the control unit 240 determines whether or not command information has been received from the information processing apparatus 300 (Step S1002) and, in a case where command information has not been received, continues to perform monitoring. In addition, in a case where command information cannot be received also after standby for a predetermined time, the control unit 240 may regard a timeout and end the process. For example, in the Wi-Fi certified miracast, a timeout time of five seconds to nine seconds is set depending on the situation.

In a case where the command information is received from the information processing apparatus 300 (Step S1002), the control unit 240 transmits mode setting information representing an indication of setting a mode on the basis of the received command information to the information processing apparatus 300 (Step S1003).

Subsequently, the control unit 240 sets the mode on the basis of the received command information (Step S1004). In addition, in a case where a change request for improving the resolution is included in the command information, the control unit 240 sets the resolution of the video and the audio in response to the change request. On the other hand, in a case where a change request for lowering the resolution is included in the command information, the control unit 240 sets the resolution of the video and the sound quality of the audio in response to the change request.

Subsequently, the control unit 240 performs a transmission process of transmitting the streams to the information processing apparatus 300 on the basis of the settings (Step S1005).

Subsequently, the control unit 240 determines whether or not the low power consumption mode is set (Step S1006). In a case where the low power consumption mode is not set (in other words, in a case where the normal power consumption mode is set), the process proceeds to Step S1011. On the other hand, in a case where the low power consumption mode is set (Step S1006), the control unit 240 sets a sleep state for a predetermined time (Step S1007).

Subsequently, the control unit 240 transmits an inquiry message to the information processing apparatus 300 (Step S1008). Subsequently, the control unit 240 determines whether or not a response message has been received from the information processing apparatus 300 (Step S1009) and, in a case where a response message has not been received, continues to perform monitoring. In a case where the response message has not been received after standby of a predetermined time, the control unit 240 may seta time-out and end the process. For example, in the Wi-Fi certified miracast, a timeout time of five seconds to nine seconds is set depending on the situation.

In a case where a response message has been received from the information processing apparatus 300 (Step S1009), the control unit 240 determines whether or not a change request is included in the response message (Step S1010). Then, in a case where a change request is included in the response message (Step S1010), the process is returned to Step S1001.

On the other hand, in a case where a change request is included in the response message (Step S1010), the control unit 240 determines whether or not a change request has been received (Step S1011). Then, in a case where a change request has been received (Step S1011), the process is returned to Step S1001. On the other hand, in a case where a change request has not been received (Step S1011), the control unit 240 determines whether or not a transmission stop operation has been performed (Step S1012). Then, in a case where the transmission stop operation has been performed (Step S1012), the operation of the data transmitting process is ended. On the other hand, in a case where a transmission stop operation has not been performed (Step S1012), the process is returned to Step S1005.

[Example of Operation of Information Processing Apparatus (Sink Apparatus)]

Figure 13:
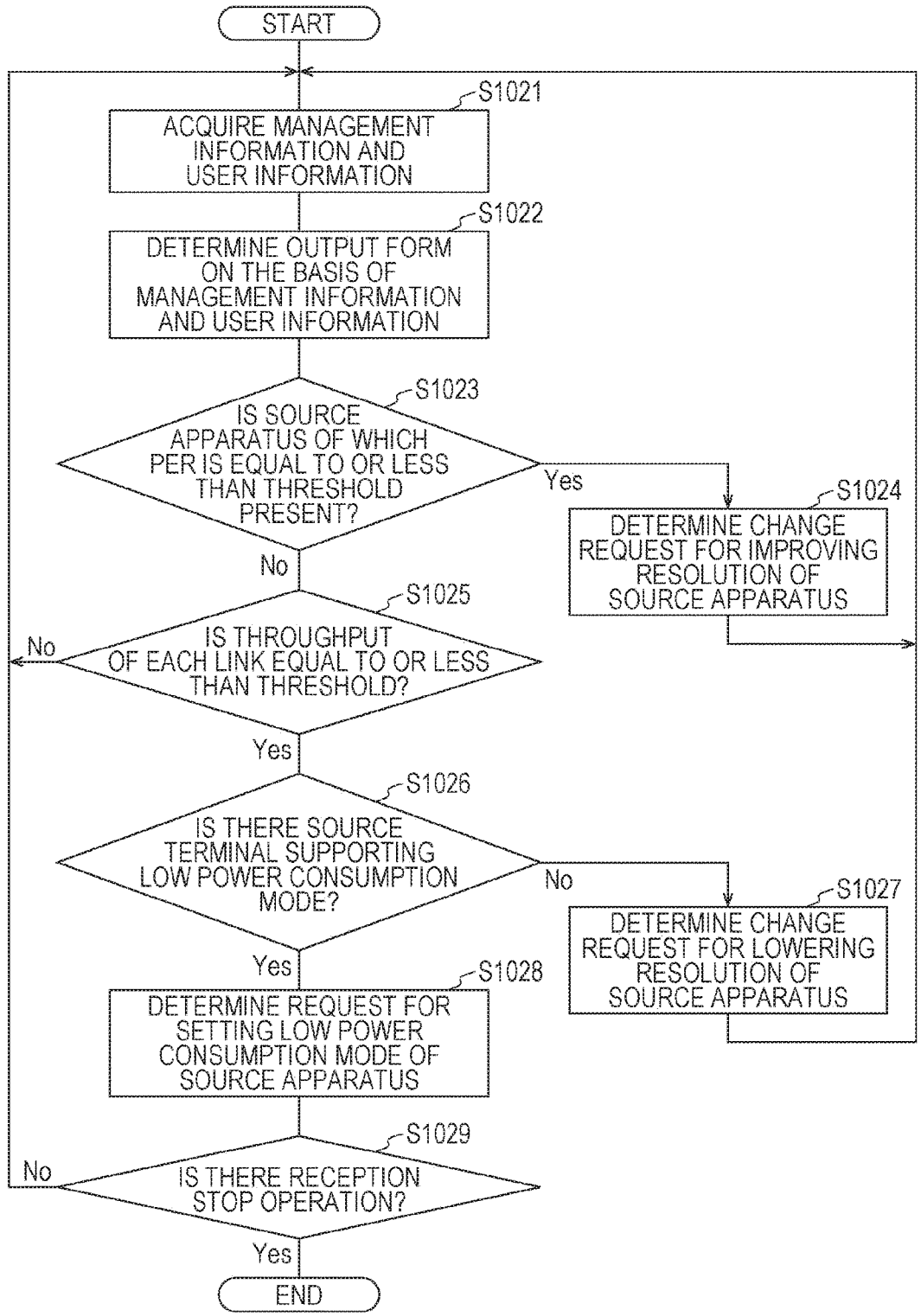
FIG. 13 is a flowchart that illustrates an example of the processing sequence of a data transmission speed control process performed by the information processing apparatus 300 according to the first embodiment of the present technology.

FIG. 13 is a flowchart that illustrates an example of the processing sequence of a data transmission speed control process performed by the information processing apparatus 300 according to the first embodiment of the present technology. In FIG. 13, an example is illustrated in which, in a case where streams (video data and audio data) are received, the information processing apparatus 300 determines setting contents (for example, the resolution and the power consumption mode) relating to the source apparatus.

For example, the control unit 370 of the information processing apparatus 300 can determine resolution to be used and a frequency channel to be used on the basis of the user information for setting the center channel and link radio wave propagation environments between the information processing apparatus 300 and each source apparatus.

For example, a case will be considered in which a user operation for selecting the video 12 is performed in the state illustrated in FIG. 5a. In such a case, it is preferable to raise the resolution of the video 12 and lower the resolution of the video 11. In addition, in accordance with the elapse of time, on the basis of the link radio wave propagation environments of each source apparatus, it is preferable to select resolutions that are optimal to the videos 11 and 12.

For example, the information processing apparatus 300 can acquire radio wave propagation characteristics by transmitting data corresponding to corresponding throughputs in a plurality of frequency channels. In addition, for example, the information processing apparatus 300 maintains a table used for acquiring an ideal throughput for each of the plurality of frequency channels. Then, the information processing apparatus 300, on the basis of the number of source apparatuses that are simultaneously used and the PER, may acquire usable data transmission speeds of frequency channels to be used and select an optimal frequency channel for each frequency channel.

For example, the control unit 370 acquires the management information from the management information storing unit 390 and acquires the user information from the user information acquiring unit 360 (Step S1021). Subsequently, the control unit 370, on the basis of the management information and the user information that are acquired, determines a display form (Step S1022). On the basis of this determined display form, videos corresponding to two streams transmitted from each of the plurality of source apparatus are displayed on the display unit 351.

Subsequently, the control unit 370 determines whether or not a source apparatus of which the PER included in the management information is equal to or less than a threshold is present (Step S1023). In a case where a source apparatus of which the PER included in the management information is equal to or less than the threshold is present (Step S1023), the control unit 370 determines a change request for improving the resolution of the source apparatus (Step S1024). In addition, by using the display form based on the user information, control for allocating a high data transmission speed to the center channel is performed by the control unit 370. This change request, for example, is transmitted to the source apparatus with being included in command information (for example, the command information illustrated in FIG. 6). In addition, it may be configured such that it is determined whether or not the throughput after the improvement of the resolution of the source apparatus is within a threshold, and the rate of the stream is controlled on the basis of a result of the determination.

In a case where a source apparatus of which the PER included in the management information is equal to or less than the threshold is not present (Step S1023), the control unit 370 determines whether or not the throughput of each source apparatus is equal to or less than a threshold (Step S1025). In other words, it is determined whether or not there is no problem in the throughput of each link also in the current frequency channel (Step S1025).

In a case where the throughput of each source apparatus is not equal to or less than the threshold (Step S1025), the process is returned to Step S1021. On the other hand, in a case where the throughput of each source apparatus is equal to or less than the threshold (Step S1025), the control unit 370 determines whether or not a source apparatus corresponding to the low power consumption mode is present on the basis of the management information (Step S1026).

In a case where a source apparatus corresponding to the low power consumption mode is present (Step S1026), the control unit 370 determines a change request for setting the low power consumption mode in the source apparatus corresponding to the low power consumption mode (Step S1028). This change request, for example, is transmitted to the source apparatus with being included in command information (for example, the command information illustrated in FIG. 6).

On the other hand, in a case where a source apparatus corresponding to the low power consumption mode is not present (Step S1026), the control unit 370 determines a change request for lowering the resolution of the source apparatus (the source apparatus of which the PER is equal to or less than the threshold) (Step S1027). This change request, for example, is transmitted to the source apparatus with being included in command information (for example, the command information illustrated in FIG. 6).

In addition, it is determined whether or not a reception stop operation is performed (Step S1029). In a case where the reception stop operation is performed, the operation of the data transmission speed control process is ended. On the other hand, in a case where the reception stop operation is not performed, the process is returned to Step S1021. In addition, in a case where a source apparatus that is in the sleep state in accordance with the setting of the low power consumption mode is present, the number of source apparatuses connected to the information processing apparatus 300 is decreased. In such a case, the throughput threshold in Step S1025 may be changed. In addition, after the throughput threshold is changed in this way, a step corresponding to Step S1025 may be configured to be further performed.

In this way, the sink apparatus performs training of channel environments for a predetermined time and can realize a control protocol for notifying resolution at which stable video communication can be performed to the source apparatus. In addition, a control protocol may be employed in which the source apparatus performs training of the channel environments for a predetermined time and acquires resolution at which stable video communication can be performed, and the sink apparatus responds thereto.

In this way, the control unit 370 of the information processing apparatus 300, on the basis of the management information of the management information storing unit 390 and the user information acquired by the user information acquiring unit 360, can perform transmission control (for example, the data transmission speed control and the scalability transmission rate control) of two streams transmitted from each source apparatus.

In addition, the control may be performed such that a sum data transmission speed of two streams transmitted from the information processing apparatus 200 and the information processing apparatus 400 is minimal. For example, a maximum allowed value of the sum data transmission speed is set by the control unit 370 of the reception-side information processing apparatus 300. Then, after transmitting a change request for lowering the bit rate to the information processing apparatus 200, the control unit 370 acquires bit rates of two streams transmitted from the information processing apparatuses 200 and 400 from the stream receiving unit 330. Subsequently, the control unit 370 calculates a sum data transmission speed of the acquired two streams. Subsequently, the control unit 370 determines a bit rate of a stream transmitted from the information processing apparatus 400 in a range not exceeding the set maximum allowed value and transmits a change request for improving the bit rate to the information processing apparatus 400. In addition, in a case where, even when the lowest bit rate is set, the PER is high, and the streams cannot be housed in a same frequency channel, different frequency channels may be used. In addition, in a case where videos (the center channel and the peripheral channel) are stopped for a predetermined time or more, unless the user performs an operation (for example, pointing), the video data may be configured to be stopped.

In this way, according to the first embodiment of the present technology, also in a case where a plurality of streams transmitted from a plurality of source apparatuses are received by one sink apparatus, appropriate stream transmission control (for example, data transmission speed control) according to the user's operation, status, and intention can be performed. For example, in accordance with the user's operation, status, and intention, among a plurality of video/audio streams, the data transmission speed of a part can be decreased, and the data transmission speed of the remaining streams can be increased.

In addition, for example, in a case where the sink apparatus receives and displays a plurality of streams, timely as set by the user, significant videos and audios can be enjoyed with high quality. In addition, the data transmission speed of each of the other videos and audios can be automatically adjusted to an optimal frequency channel, power consumption, and a transmission rate.

Here, regarding the management information stored in the management information storing unit 390, for the exchange of the management information, a command prepared in the Wi-Fi certified miracast may be used. In such a case, the exchange can be performed using a capability negotiation or a capability re-negotiation defined in the Wi-Fi display specification. Here, as the capability negotiation or the capability re-negotiation, for example, there is RFC 5939 or the Wi-Fi certified miracast specification. However, the capability negotiation or the capability re-negotiation are not limited thereto but are defined as exchange of the apparatus capability information. An example of the communication of the exchange using the Wi-Fi certified miracast specification command is illustrated in FIGS. 14 to 16.

[Example of Communication of Exchange Using Wi-Fi Certified Miracast Specification Command]

Figure 14:
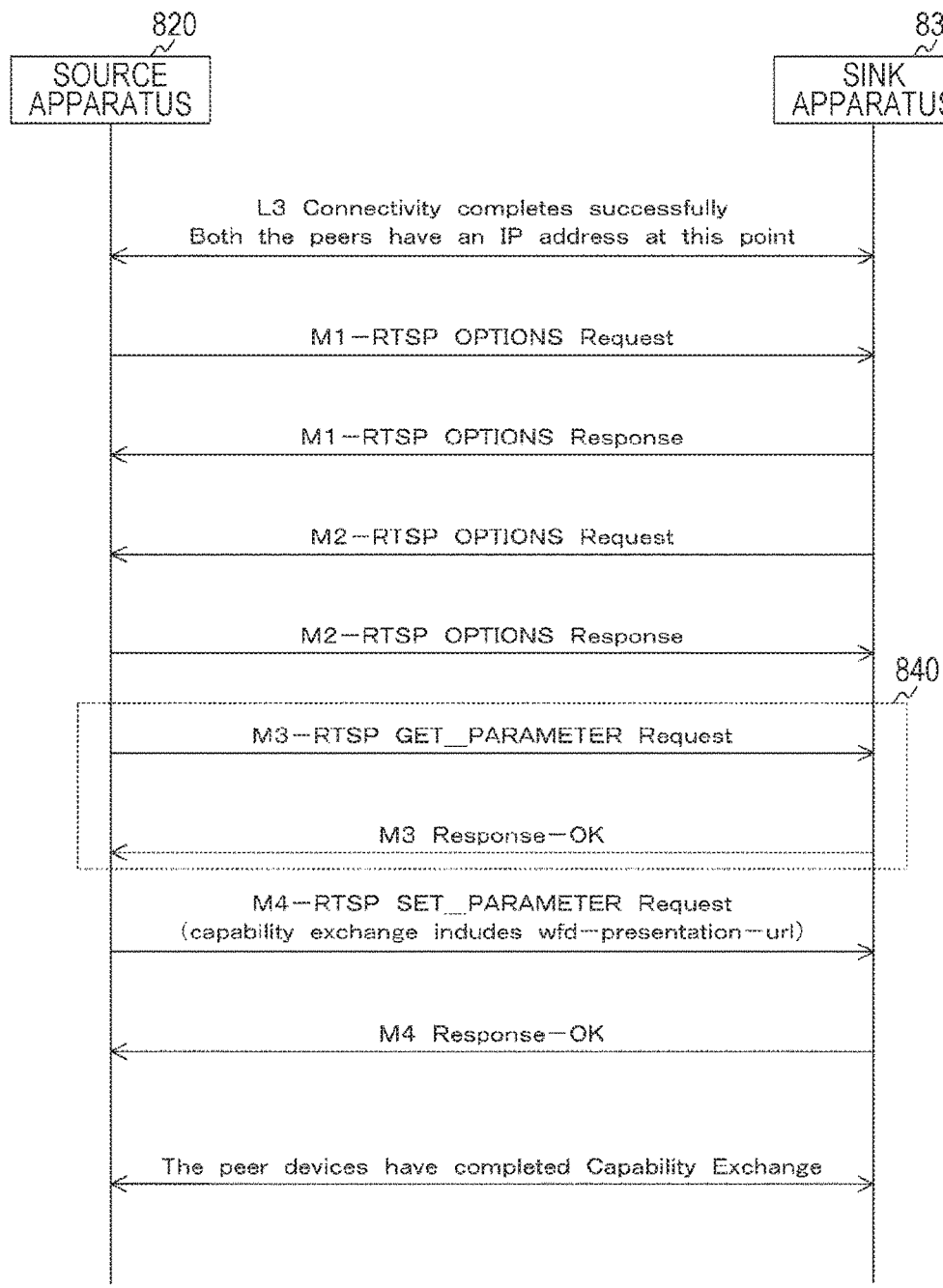
FIG. 14 is a sequence diagram that illustrates an example of a communication process between a source apparatus and a sink apparatus according to the first embodiment of the present technology.
Figure 15:
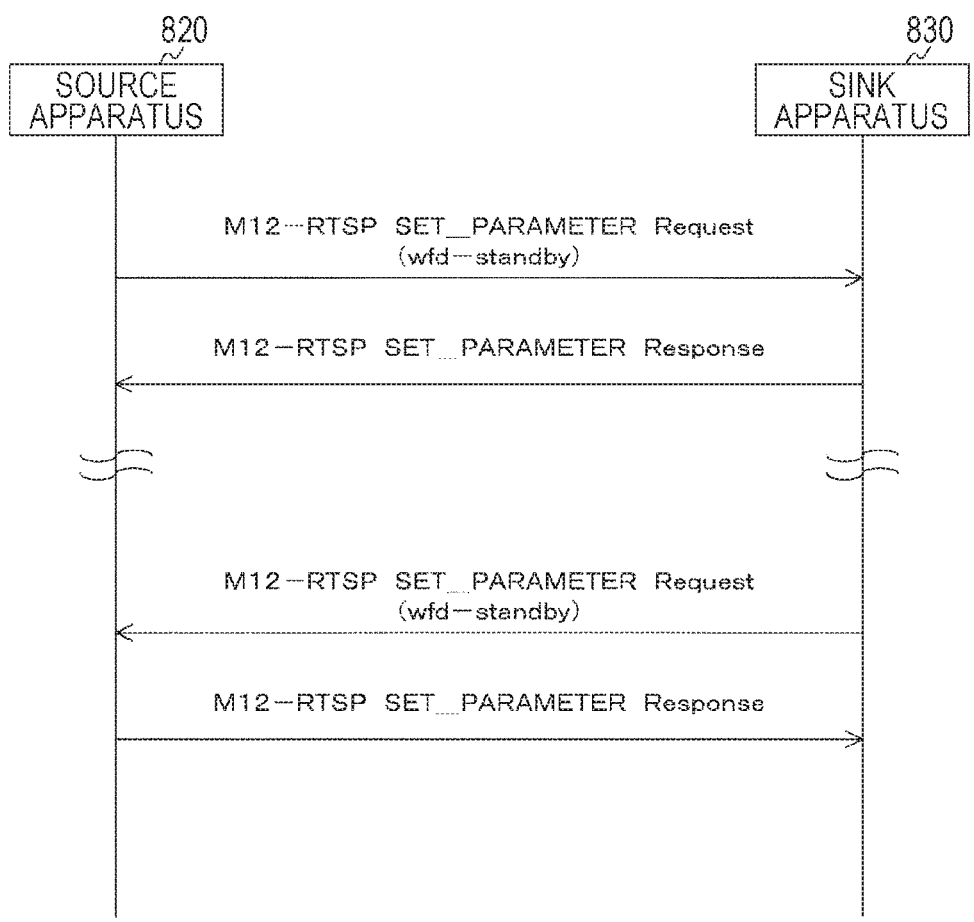
FIG. 15 is a sequence diagram that illustrates an example of a communication process between a source apparatus and a sink apparatus according to the first embodiment of the present technology.
Figure 16:
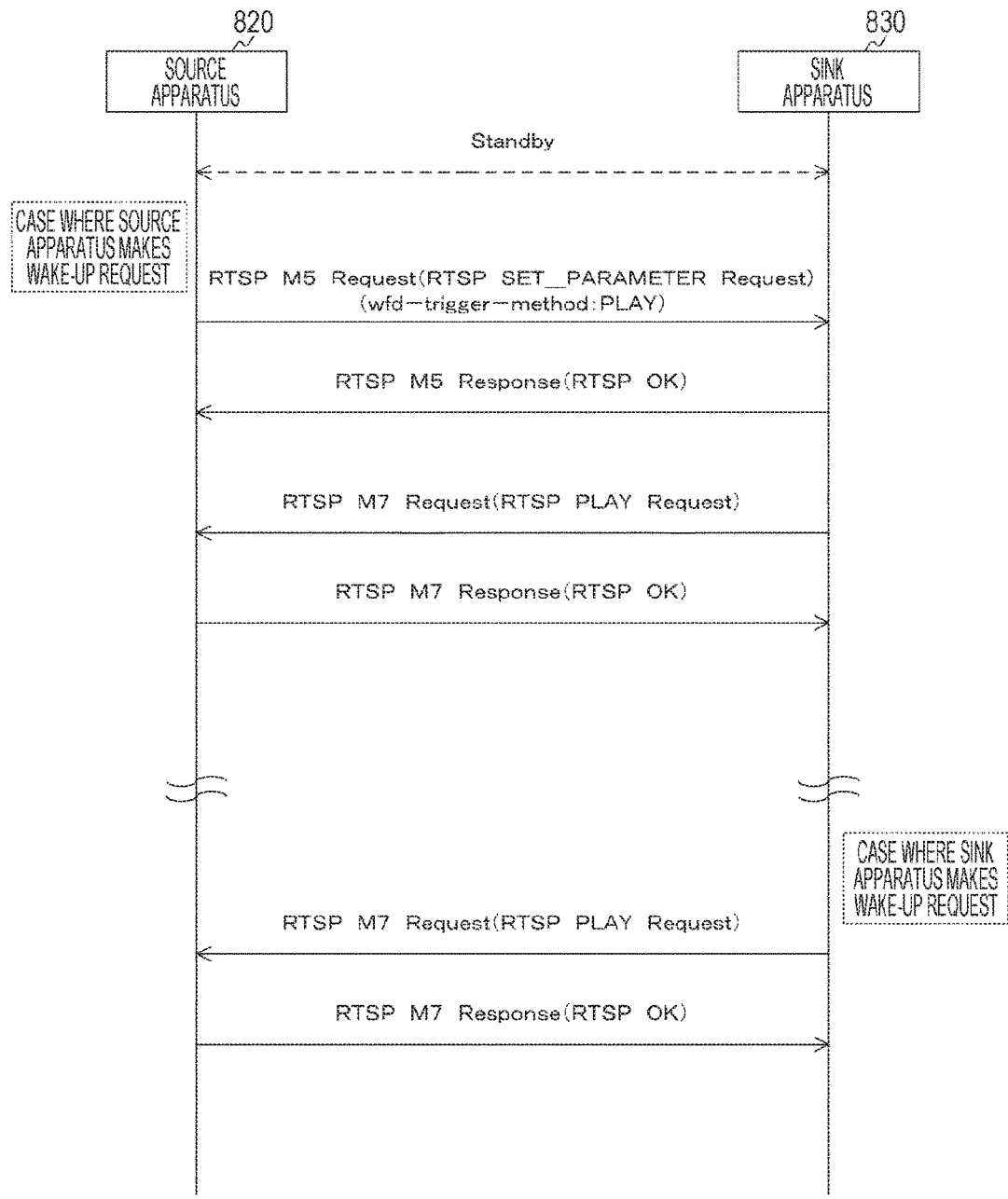
FIG. 16 is a sequence diagram that illustrates an example of a communication process between a source apparatus and a sink apparatus according to the first embodiment of the present technology.

FIGS. 14 to 16 are sequence diagrams that illustrate an example of a communication process between a source apparatus and a sink apparatus according to the first embodiment of the present technology. In FIGS. 14 to 16, an example of the communication of the exchange using an RTSP protocol is illustrated. In addition, a source apparatus 820 corresponds to the information processing apparatuses 200 and 400, and a sink apparatus 830 corresponds to the information processing apparatus 300.

First, description will be presented with reference to FIG. 14. For example, as illustrated inside a dotted-line rectangle 840 in FIG. 14, a "RTSP M3 Request" (RTSP GET_PARAMETER Request) message transmitted to the sink apparatus and an "RTSP M3 Response" (RTSP GET_PARAMETER Response) message transmitted from the sink apparatus to the source apparatus in response thereto can be used. This exchange process, for example, corresponds to the processes (505 to 508) illustrated in FIG. 6 and the processes (539 to 542) illustrated in FIG. 8. Meanwhile, the messages may be appropriately transmitted from the source apparatus to the sink apparatus. For example, it may be configured such that the exchange of the "RTSP M3 Request" (RTSP GET_PARAMETER Request) message and the "RTSP M3 Response" (RTSP GET_PARAMETER Response) message is omitted, management information is included in a message transmitted from the source apparatus to the sink apparatus, the management information is transmitted from the source apparatus to the sink apparatus, and the sink apparatus selects information and stores the selected information in the management information storing unit 390. For example, in a case where a content protection setting is performed, a link protection setup is performed after an M3 Response. For this reason, there are cases where, by performing messages of M4 or more, it is preferable to perform communication with the secrecy of a link that is set once secured.

In addition, the exchange of information relating to the power consumption mode can be performed using predetermined messages using the RTSP protocol. For example, exchange of three types of management information of (1) to (3) described below can be performed.

(1) "Setting to Standby Mode"

(2) "Case Where Source Apparatus Release Standby Mode or Case Where Source Apparatus Release Standby Mode of Sink Apparatus"

(3) "Case Where Sink Apparatus Release Standby Mode or Case Where Sink Apparatus Release Standby Mode of Source Apparatus"

First, description will be presented with reference to FIG. 15. For example, in a case where commands prepared in the Wi-Fi certified miracast are used, in the exchange of (1) "Setting to Standby Mode" described above, an "RTSP M12 Request" (RTSP SET_PARAMETER (with WFD-standby)) message transmitted from the source apparatus 820 to the sink apparatus 830 and an "RTSP M12 Response" (RTSP OK) message transmitted from the sink apparatus 830 to the source apparatus 820 in response thereto can be used. Meanwhile, a setting of the standby mode to the source apparatus 820 from the sink apparatus 830 is similar thereto.

Next, description will be presented with reference to FIG. 16. For example, in (2) "Case Where Source Apparatus Release Standby Mode or Case Where Source Apparatus Release Standby Mode of Sink Apparatus" described above, the source apparatus 820 exchanges an "RTSP M5 Request" (RTSP SET_PARAMETER (Request(wfd-trigger-method: PLAY)) message transmitted to the sink apparatus 830 and an "RTSP M5 Response" (RTSP OK) message transmitted from the sink apparatus 830 to the source apparatus 820 in response thereto. The sink apparatus 830 can use the "RTSP M7 Request" (RTSP PLAY Request) message transmitted to the source apparatus 820 and the "RTSP M7 Response" (RTSP OK) message transmitted from the source apparatus 820 to the sink apparatus 830 in response thereto.

In addition, for example, in the case of the exchange of (3) "Case Where Sink Apparatus Release Standby Mode or Case Where Sink Apparatus Release Standby Mode of Source Apparatus", the sink apparatus 830 can use the "RTSPM7 Request" (RTSP PLAY Request) message transmitted to the source apparatus 820 and the "RTSP M7 Response" (RTSP OK) transmitted from the source apparatus 820 to the sink apparatus 830 in response thereto. Such an exchange, for example, corresponds to the processes (515 to 518) illustrated in FIG. 7 and the processes (535 to 538) illustrated in FIG. 7.

In addition, for example, for the exchange of the processes (565 to 570) illustrated in FIG. 9, an "RTSP M12 Request" (RTSP SET_PARAMETER (with WFD-standby)) message transmitted from the sink apparatus 830 to the source apparatus 820 and an "RTSP M12 Response" (RTSP OK) message transmitted from the source apparatus 820 to the sink apparatus 830 in response thereto can be used.

Furthermore, for example, for the exchange of the processes (584 to 589) illustrated in FIG. 10, an "RTSP M7 Request" (RTSP PLAY Request) message transmitted from the sink apparatus 830 to the source apparatus 820 and an "RTSP M7 Response" (RTSP OK) message transmitted from the source apparatus 820 to the sink apparatus 830 in response thereto can be used.

In this way, the radio communication unit 320 can perform the exchange of capability information through a capability negotiation or a capability re-negotiation defined in the Wi-Fi display specification. In addition, the capability information, for example, is exchanged through an RTSP M3 Message in the capability negotiation or the capability re-negotiation.

In this way, for example, the radio communication unit 320 of the information processing apparatus 300 performs communication for exchanging the capability information of the information processing apparatus 300 and the capability information of the information processing apparatus 200 with the source apparatus. In addition, the radio communication unit 220 of the information processing apparatus 200 performs communication for exchanging the capability information of the information processing apparatus 200 and the capability information of the information processing apparatus 300 with the information processing apparatus 300. In such a case, the radio communication units 220 and 320 perform exchange of the capability information through a capability negotiation or a capability re-negotiation.

Furthermore, the control unit 370 of the information processing apparatus 300, on the basis of the capability information of the information processing apparatus 200, the radio wave propagation measurement information relating to communication with the information processing apparatus 200, and the method used in the information processing apparatus 300, performs transmission control (for example, the data transmission speed control or the scalability transmission rate control) of streams for the information processing apparatus 200. In addition, although the stream transmitting method is different from that of the embodiment of the present technology, the control unit 240 of the information processing apparatus 200, on the basis of the control of the information processing apparatus 300 based on the capability information of the information processing apparatus 200 and the radio wave propagation measurement information relating to communication of streams with the information processing apparatus 300, also can perform transmission control (for example, the data transmission speed control or the scalability transmission rate control) of streams for the information processing apparatus 300.

In addition, the control unit 370 of the information processing apparatus 300, on the basis of the capability information (for example, information representing a mobile apparatus or not) of the information processing apparatus 200, performs control of setting the power consumption mode to the information processing apparatus 200. In this case, the control unit 370, on the basis of the capability information of the information processing apparatus 200 and the management information used for managing the information processing apparatus 200, can perform control of setting the low power consumption mode to the information processing apparatus 200. In addition, the control unit 240 of the information processing apparatus 200, on the basis of the control of the information processing apparatus 300 based on the capability information of the information processing apparatus 200, sets the power consumption mode. In addition, in the embodiment of the present technology, while an example in the topology including two source apparatus has been described, the present technology is not limited to the embodiment of the present technology. For example, in a case where two or more source apparatus are present, it is necessary to perform data transmission speed control corresponding to the number thereof, and the number of state transitions is large. Accordingly, it is difficult to perform control, but the control is useful. The control can respond to a topology in which two or more source apparatuses are connected.

<2. Second Embodiment>

In a second embodiment of the present technology, an example is illustrated in which switching (or simultaneously connecting) between a connection between a source apparatus and a sink apparatus through an access point and a direct connection between the source apparatus and the sink apparatus is performed.

[Example of Configuration of Communication System]

Figure 17:
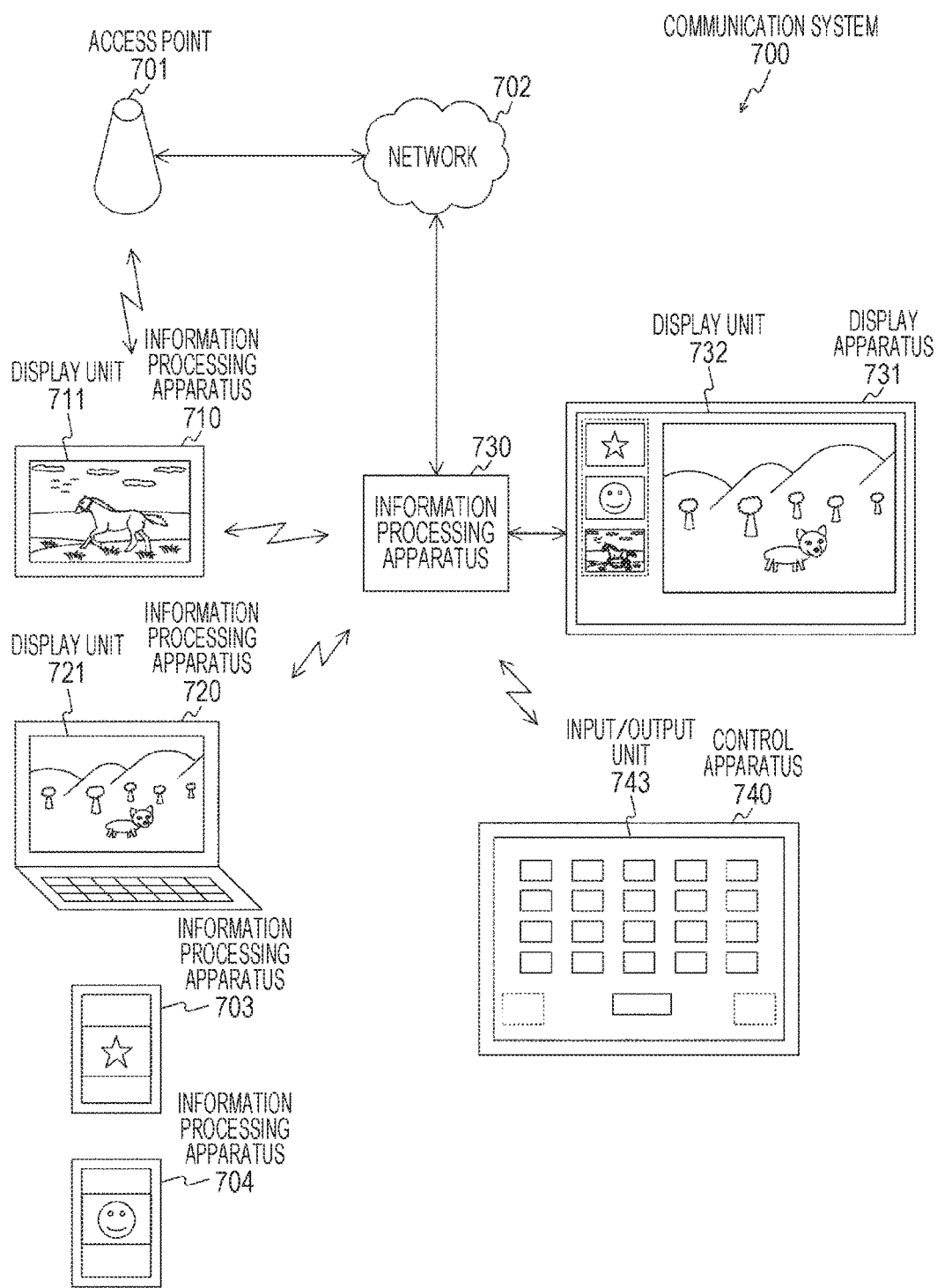
FIG. 17 is a diagram that illustrates an example of the system configuration of a communication system 700 according to a second embodiment of the present technology.

FIG. 17 is a diagram that illustrates an example of the system configuration of a communication system 700 according to the second embodiment of the present technology.

The communication system 700 includes: an access point 701; a network 702; information processing apparatuses 703, 704, 710, 720, and 730; a display device 731; and a control apparatus 740.

The access point 701 is an access point of a wireless LAN (for example Wi-Fi). For example, the access point 701 has a function of an infrastructure mode of the IEEE 802.11 specification. Then, the access point 701 is connected to one or a plurality of information processing apparatuses (for example, a transmission-side information processing apparatus (source apparatus) and a reception-side information processing apparatus (sink apparatus)).

In addition, the access point 701 can be connected to the information processing apparatus 730 through a wire circuit (for example, Ethernet (registered trademark)). For example, the access point 701 can be connected to the information processing apparatus 730 through the network 702. In addition, the access point 701 may perform the process with being connected to an internal bus of the information processing apparatus 730. The internal bus of the information processing apparatus 730, for example, is a universal serial bus (USB), peripheral components interconnect (PCI), or PCI Express. In addition, the connection between the access point 701 and the information processing apparatus 730 may be not a wired connection but a radio connection (for example, a wireless LAN). For example, in the case of the wireless LAN, the network 702 is connected to the information processing apparatus 730, and the information processing apparatus 730 needs to determine a transmission/reception process for the access point 701 or a transmission/reception process for the information processing apparatus 710.

In the second embodiment of the present technology, an example is illustrated in which the access point 701 and the information processing apparatuses 703, 704, 710, and 720 are connected using a wireless LAN (for example, a wireless LAN corresponding to IEEE 802.11a/b/g/n/ac/ad). In addition, an example is illustrated in which the access point 701 and the information processing apparatus 730 are connected using an Ethernet circuit line.

In addition, an example is illustrated in which the information processing apparatuses 703, 704, 710, and 720 are set as information processing apparatuses (source apparatuses) of the transmission side, and the information processing apparatus 730 is set as an information processing apparatus (sink apparatus) of the reception side. Furthermore, the information processing apparatuses 703, 704, 710, and 720 correspond to the information processing apparatus 200 illustrated in FIG. 2, and the information processing apparatus 730 corresponds to the information processing apparatus 300 illustrated in FIG. 3. In addition, hereinafter, as the source apparatus, while the information processing apparatus 710 will be mainly described, the information processing apparatuses 703, 704, and 720 are similar thereto.

The information processing apparatus 710 is an information processing apparatus (source apparatus) of the transmission side transmitting a video. In addition, the information processing apparatus 710 is an information processing apparatus that can be connected to the access point 701 in the infrastructure mode.

Here, a connection example will be described in which the information processing apparatus 710 makes a connection to the access point 701 in the infrastructure mode. The information processing apparatus 710, for a beacon signal transmitted from the access point 701, transmits a connection request signal to the access point 701. In this way, the information processing apparatus 710, by transmitting the connection request signal, starts an operation (connection setup operation) for setting up a connection with the access point 701.

This connection setup operation is an operation for connecting levels of layer 2. For example, in addition to password authentication using a packet identification (PID) performed using a wireless LAN, a connection authentication process for determining whether or not the information processing apparatus 710 is connected as an application is also required.

In addition, the information processing apparatus 710 can be connected to the information processing apparatus 730 using P2P direct communication (for example, Wi-Fi_Direct). For example, the information processing apparatus 710 is connected to the information processing apparatus 730 using Wi-Fi_Direct and has a protocol enabling image/audio (video/audio) transmission such as the Wi-Fi certified miracast or digital living network alliance (DLNA).

In addition, the information processing apparatus 710 makes a connection to the access point 701 and may be set as a low-speed video/audio transmitting apparatus (standby apparatus) only exchanging various kinds of information with the information processing apparatus 730 through the access point 701. In addition, in a case where the information processing apparatus 710 is used only as the low-speed video/audio transmitting apparatus, the information processing apparatus 710 may not have a protocol enabling high-speed video/audio transmission.

The information processing apparatus 730 has a communication function for connections with the access point 701, the information processing apparatuses 703, 704, 710, and 720, and the control apparatus 740. In addition, the information processing apparatus 730 has a function for connections with the access point 701, the information processing apparatuses 703, 704, 710, and 720, and the control apparatus 740 and controlling the whole protocol. Furthermore, the information processing apparatus 730 has a communication function for connections with an internal LAN and a global LAN.

Here, it is of significance to stabilize the connections between the information processing apparatus 730 and the information processing apparatus 703, 704, 710, and 720. For this reason, the connections need to efficiently coexist with radio frequencies used by the access point 701. Thus, for example, it is preferable to distribute the transmission speed and use the distributed transmission speeds for the connections between the information processing apparatus 730 and the information processing apparatuses 703, 704, 710, and 720. In addition, it is preferable to use different frequencies for the connections between the information processing apparatus 730 and the information processing apparatuses 703, 704, 710, and 720. In addition, in the second embodiment of the present technology, an example is illustrated in which frequency bands such as a 2.4 GHz band, a 5 GHz band, and 60 GHz of IEEE 802.11a/b/g/n/ac/ad and the like are used. However, a different radio specification and a different frequency band may be used, or the same frequency band may be shared.

In addition, the information processing apparatus 730 has a display function for displaying a video. This display function is a function for displaying the screen of a television set, a projector, or the like. The information processing apparatus 730 may display a video on a display unit included in the information processing apparatus 730 or may display a video on an external display device. In addition, in the second embodiment of the present technology, an example is illustrated in which the display device 731 of a separate body type that is separate from the information processing apparatus 730 is disposed.

In this way, in a case where the display device 731 of the separate body type that is separate from the information processing apparatus 730 is disposed, a wired connection or wireless connection can be made between the information processing apparatus 730 and the display device 731. For example, in a case where a wired connection is made between the information processing apparatus 730 and the display device 731, the connection can be made using a wired cable (for example, high-definition multimedia interface (HDMI (registered trademark)), mobile high-definition link (MHL), DisplayPort, or USB 3.0)). On the other hand, for example, in a case where a wireless connection is made between the information processing apparatus 730 and the display device 731, the connection can be made using a wireless LAN. In addition, a plurality of the display devices may be connected to the information processing apparatus 730.

The control apparatus 740 is a connection control apparatus that manages the information processing apparatuses (the information processing apparatuses 703, 704, 710, 720, and 730) configuring the communication system 700 and performs control by acquiring the connection or the display state of each information processing apparatus. For example, the control apparatus 740 manages and acquires information (for example, terminal identification information or the capability information) relating to each information processing apparatus and the operation state (for example, a communication mode or a group participation state) of each information processing apparatus. In addition, the control apparatus 740 is connected to the information processing apparatus 730 by using radio communication. As this radio communication, for example, a communication system (for example, a wireless LAN) included in the information processing apparatus 730 can be used. In addition, an infrared ray, another radio system, or a wire circuit may be configured to be used. Furthermore, the control apparatus 740 may include a protocol used for a connection with the access point 701 and be connected to the information processing apparatus 730 through the access point 701.

For example, the control apparatus 740 can manage each information processing apparatus by acquiring participation/withdrawal in/from a group. For example, each source apparatus participating in a group performs a process of transmitting a command to the access point 701 or the information processing apparatus 730 and the like to a degree not having an effect on the power consumption. In a case where this command is directly received or in a case where the command is indirectly received through the access point 701, the information processing apparatus 730 notifies information relating to the source apparatus from which the command has been received to the control apparatus 740. In this way, the control apparatus 740 can check whether or not the source apparatus is withdrawn from the group.

For example, the control apparatus 740 displays images (for example, icons) corresponding to source apparatuses participating in a group on an input/output unit 743. In addition, for example, the control apparatus 740 checks whether or not a source apparatus participating in the group has been withdrawn from the group and, in a case where a withdrawn source apparatus is detected, removes an image (for example, an icon) corresponding to the withdrawn source apparatus from the input/output unit 743. For example, in a case where it is determined that a command from a certain information processing apparatus has not been received for a predetermined time or more, the control apparatus 740 determines that the information processing apparatus has been withdrawn from the group. Then, the control apparatus 740 removes an image (for example, an icon) corresponding to the withdrawing information processing apparatus from the input/output unit 743.

The control apparatus 740 can display images (for example, icons) corresponding to the information processing apparatuses participating in the group on the input/output unit 743 in accordance with places at which the information processing apparatuses are present. For example, the control apparatus 740 may acquire positional information (for example, latitude and longitude) of each information processing apparatus and determine an absolute position of each information processing apparatus on the basis of the positional information. On the basis of the position of each information processing apparatus determined in this way, a relative position of each information processing apparatus may be determined so as to arrange the information processing apparatus. In addition, each information processing apparatus, for example, may acquire positional information using a global positioning system (GPS).

In addition, for example, the relative position of each information processing apparatus may be detected using radio waves. For example, the information processing apparatus 730 may acquire radio wave intensities from a plurality of information processing apparatuses and acquire a relative position (the position of the own apparatus) with respect to the other information processing apparatuses by using a surveying method on the basis of such radio wave intensities. The control apparatus 740 may acquire the relative position acquired in this way and arrange an image of each information processing apparatus.

In addition, here, an example is illustrated in which one or a plurality of information processing apparatuses connected to the information processing apparatuses 730 are managed by the control apparatus 740, and images representing the information processing apparatuses are displayed on the input/output unit 743 of the control apparatus 740. However, it may be configured such that one or a plurality of information processing apparatuses connected to the information processing apparatus 730 are managed by the information processing apparatus 730, and images representing the information processing apparatuses are displayed on the display unit of the information processing apparatus 730 or the display device 731.

[Example of Switching Between Communication Modes of Source Apparatus]

Here, a switching method used in a case where switching between communication modes (the low-speed video/audio transmitting mode (standby mode) and the high-speed video/audio transmitting mode) of the source apparatus is performed will be described.

For example, the following (B1) to (B3) may be used as triggers for switching between communication modes of the source apparatus.

(B1) Switching Using Source Apparatus (for example, active switching using a user operation using a source apparatus)

(B2) Switching Using Control Apparatus (for example, switching (remotely-operated switching) using a user operation using the control apparatus 740)

(B3) Switching Using Sink Apparatus (for example, switching using a user operation using the sink apparatus (or the display device 731 connected thereto)

In addition, a user operation (switching operation) in each apparatus, for example, is a user operation using an operation receiving unit (for example, an operation member or a touch panel) included in each apparatus or a user operation using a user information acquiring unit (for example, a detection unit detecting a gesture) included in each apparatus.

In (B1), for example, an operation input of an application built in the source apparatus in advance or an operation member may be used as a switching trigger. For example, when a switching operation is performed in the source apparatus, a command relating to switching between communication modes is transmitted to the sink apparatus (information processing apparatus 730). When this command is received, the sink apparatus (the information processing apparatus 730) performs control of increasing/decreasing the source apparatus that has transmitted the command while performing control including the other bands. In addition, the sink apparatus (the information processing apparatus 730) transmits information indicating the switching of the communication mode of the source apparatus that has transmitted the command to the control apparatus 740. In this case, the control apparatus 740 may be configured to output (display or audio output) notification information indicating the switching of the communication mode.

In (B2), for example, a user operation in the sink apparatus (the information processing apparatus 730) may be used as a switching trigger. For example, when a switching operation of the source apparatus is performed in the sink apparatus (the information processing apparatus 730), control of increasing/decreasing the band of the source apparatus, for which the switching operation has been performed, is performed while performing control including the other bands. In addition, the sink apparatus (the information processing apparatus 730) transmits information indicating the switching of the communication mode of the source apparatus for which the switching operation has been performed to the control apparatus 740. In this case, similar to the case of (B1), the control apparatus 740 may be configured to output notification information indicating the switching of the communication mode.

In (B3), for example, a user operation in the control apparatus 740 may be used as a switching trigger. For example, when a switching operation of the source apparatus is performed in the control apparatus 740, information (for example, terminal identification information) relating to the source apparatus for which the switching operation has been performed is transmitted to the sink apparatus (the information processing apparatus 730). In a case where the information is received, the sink apparatus (the information processing apparatus 730) performs control of increasing/decreasing the band of the source apparatus, for which the switching operation has been performed, while performing control including the other bands.

In addition, the control apparatus 740, as described above, manages each apparatus connected to the control apparatus 740. Then, the control apparatus 740 checks whether or not such each apparatus is withdrawn from the group and, in a case where the apparatus is withdrawn from the group, removes an image (for example, an icon) corresponding to the apparatus withdrawn from the management of the own apparatus from the input/output unit 743.

Here, a user operation performed in the control apparatus 740 will be described. For example, the control apparatus 740 displays images (for example, icons) corresponding to information processing apparatuses participating in the group on the input/output unit 743 such that arrangement according to places at which the information processing apparatuses are present is formed. In such a case, a case will be considered in which an information processing apparatus set in the low-speed video/audio transmitting mode is switched to the high-speed video/audio transmitting mode (peripheral channel). In such a case, an operation of moving an image corresponding to an information processing apparatus that is a switching target up to a first area (for example, a presentation area) is performed. For example, a drag&drop operation is performed. In this way, the information processing apparatus set in the low-speed video/audio transmitting mode can be switched to the high-speed video/audio transmitting mode (peripheral channel).

In addition, a case will be considered in which an information processing apparatus set in the high-speed video/audio transmitting mode (the center channel and the peripheral channel) is switched to the low-speed video/audio transmitting mode. In such a case, an operation of moving an image corresponding to an information processing apparatus that is a switching target up to a second area (for example, a standby area) is performed. For example, a drag&drop operation is performed. In this way, the information processing apparatus set in the high-speed video/audio transmitting mode (the center channel and the peripheral channel) can be switched to the low-speed video/audio transmitting mode.

In addition, similar to the cases of (B1) and (B2), the control apparatus 740 may be configured to output notification information indicating the switching of the communication mode.

In addition, the control apparatus 740 may set an image representing each information processing apparatus to be in a different display form according to the communication mode. For example, the contour of an image representing an information processing apparatus set in the high-speed video/audio transmitting mode (center channel) is set to a thick line, and the contour of an image representing an information processing apparatus set in the high-speed video/audio transmitting mode (peripheral channel) is set to a thin line. In addition, the contour of an image representing an information processing apparatus set in the low-speed video/audio transmitting mode may be set to a dotted line. Furthermore, for example, the color of an image representing an information processing apparatus set in the high-speed video/audio transmitting mode (center channel) is set to red, and the color of an image representing an information processing apparatus set in the high-speed video/audio transmitting mode (peripheral channel) is set to blue. In addition, the color of an image representing an information processing apparatus set in the low-speed video/audio transmitting mode may be set to white.

In addition, in the second embodiment of the present technology, as described above, in the low-speed video/audio transmitting mode, a connection system indirectly connecting the source apparatus and the sink apparatus through the access point is employed. On the other hand, in the high-speed video/audio transmitting mode, a connection system directly connecting the source apparatus and the sink apparatus not through the access point is employed.

[Example of Connection Process]

Figure 18:
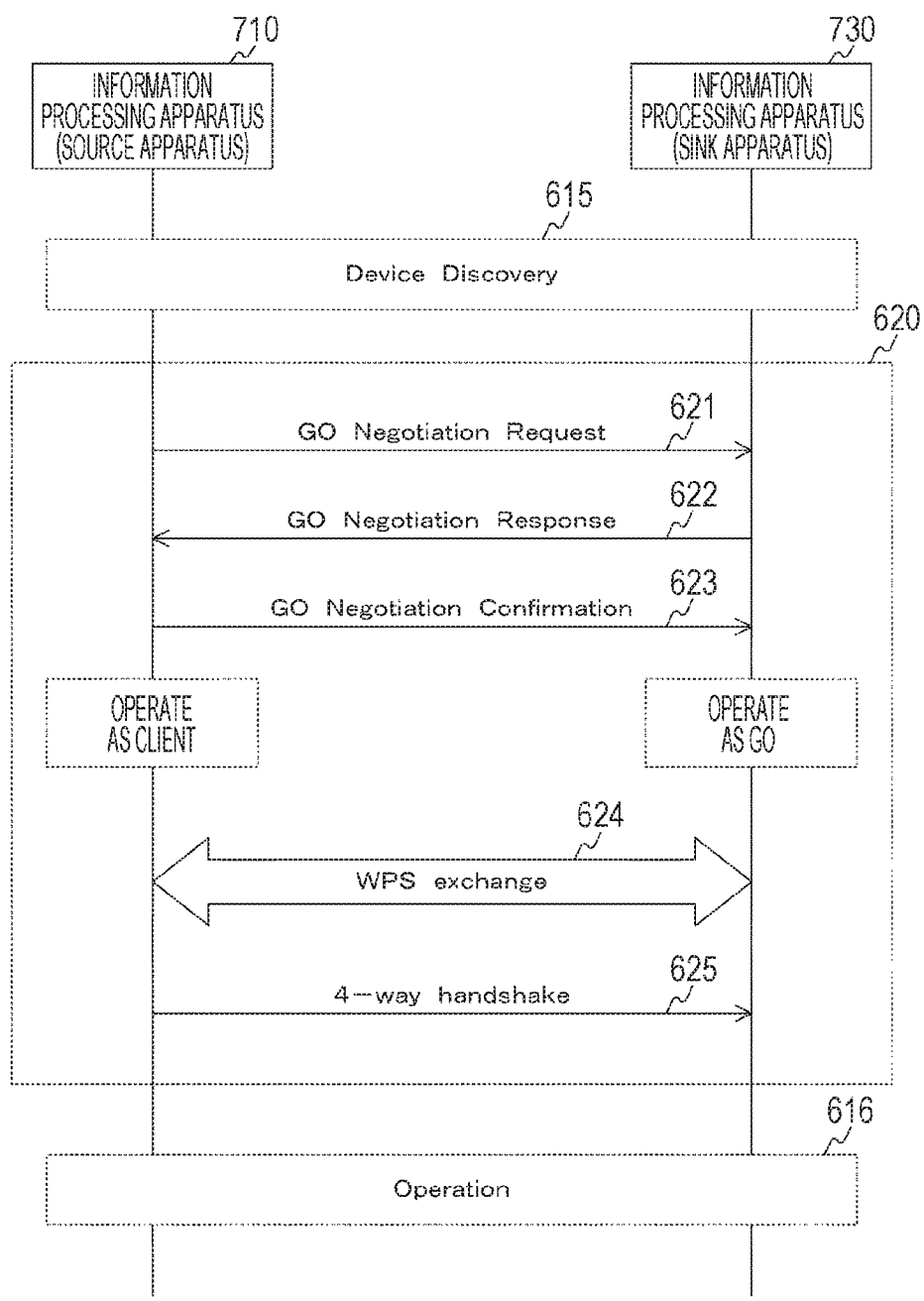
FIG. 18 is a sequence diagram that illustrates an example of a connection process performed between a source apparatus and a sink apparatus according to the second embodiment of the present technology.

FIG. 18 is a sequence diagram that illustrates an example of a connection process performed between a source apparatus and a sink apparatus according to the second embodiment of the present technology. In addition, in FIG. 18, an example of a connection process between the information processing apparatus (source apparatus) 710 and the information processing apparatus (sink apparatus) 730 is illustrated.

First, the information processing apparatus 710 performs a device discovery (615). When the information processing apparatus 730 is detected by this device discovery, the information processing apparatus 710 determines parentage with respect to the information processing apparatus 730 by using Formation and an authentication process (620). When such each process is completed, a connection between the information processing apparatus 710 and the information processing apparatus 730 is set up. Then, the information processing apparatus 710 performs direct communication (Operation) with the information processing apparatus 730 (616).

Here, the Formation (620) will be described.

First, GO_Negotiation is performed between the information processing apparatus 710 and the information processing apparatus 730. In this GO_Negotiation, the information processing apparatus 710 and the information processing apparatus 730 exchange priority levels for operating as a group owner (GO), and it is determined that an information processing apparatus having a higher priority level operates as the group owner (GO). In FIG. 18, an example is illustrated in which the priority level of the information processing apparatus 730 is high, and the information processing apparatus 730 is determined as the group owner (GO).

More specifically, the information processing apparatus 710 transmits GO_Negotiation_Request to the information processing apparatus 730 (621). When this GO_Negotiation_Request is received (621), the information processing apparatus 730 transmits GO_Negotiation_Response to the information processing apparatus 710 (622). When this GO_Negotiation_Response is received (622), the information processing apparatus 710 transmits GO_Negotiation_Confirmation to the information processing apparatus 730 (623).

According to such exchange (621 to 623), the information processing apparatus 730 is determined as the group owner (GO), and the information processing apparatus 710 is determined as a client.

Subsequently, the information processing apparatus 710 and the information processing apparatus 730 perform WPS (Wi-Fi Protected Access)_exchange (624). According to the execution of this WPS_exchange, the information processing apparatus 710 and the information processing apparatus 730 share a credential (for example, a service set identifier (SSID) or a Wi-Fi Protected Access 2) (WPS2)-PSK(Pre-Shared Key)).

Subsequently, the information processing apparatus 710 and the information processing apparatus 730 perform 4-way_handshake (625).

[Example of Communication]

Figure 19:
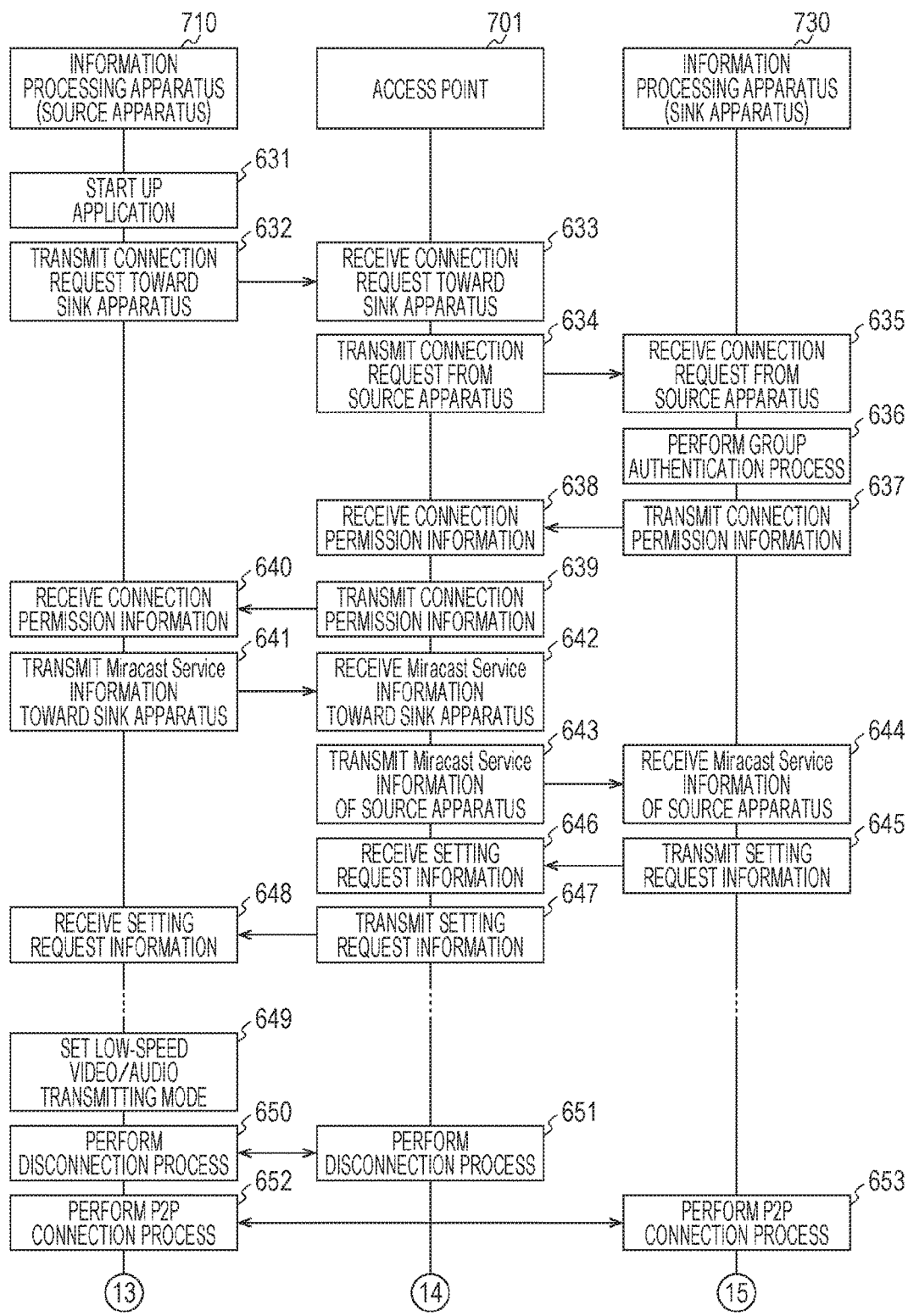
FIG. 19 is a sequence diagram that illustrates an example of a communication process between apparatuses configuring the communication system 700 according to the second embodiment of the present technology.
Figure 20:
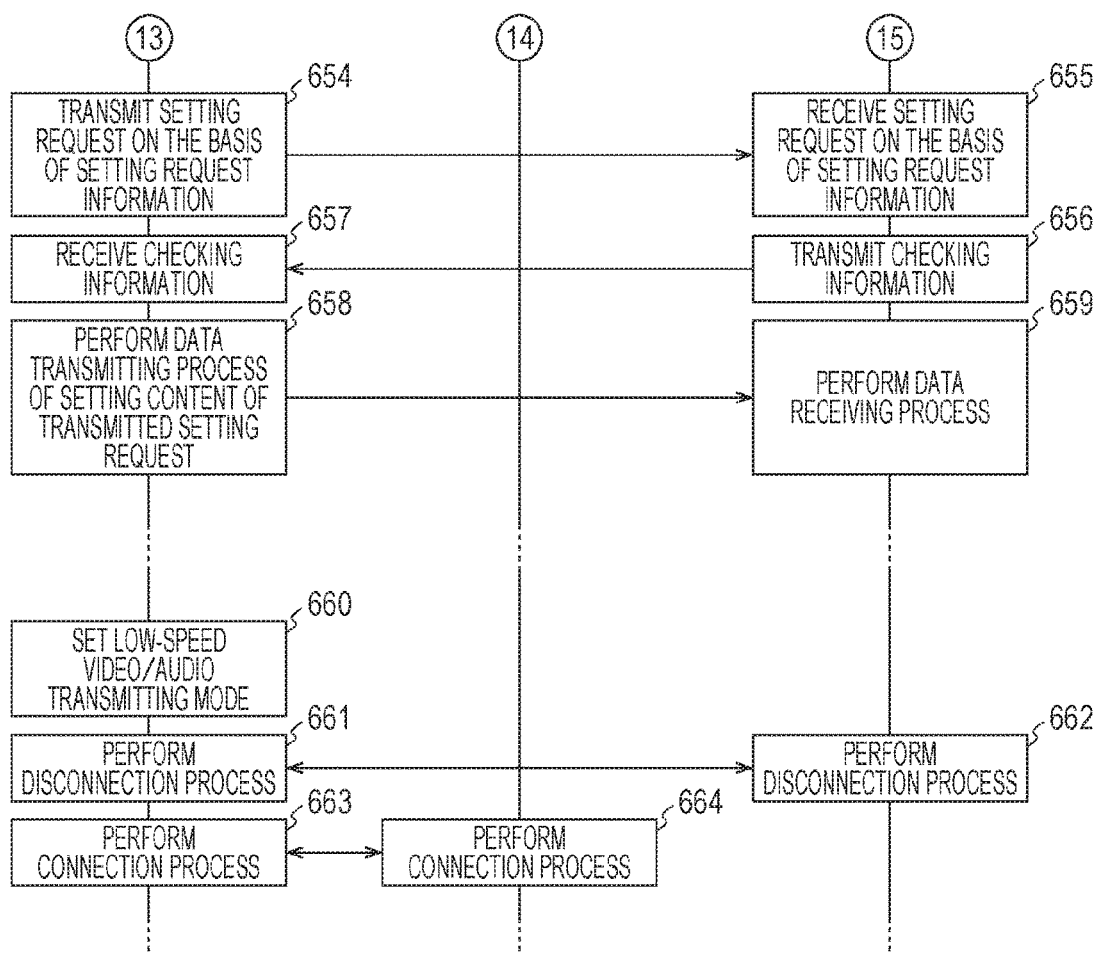
FIG. 20 is a sequence diagram that illustrates an example of a communication process between apparatuses configuring the communication system 700 according to the second embodiment of the present technology.

FIGS. 19 and 20 are sequence diagrams that illustrate an example of a communication process between apparatuses configuring the communication system 700 according to the second embodiment of the present technology. In addition, in FIGS. 19 and 20, an example of a communication process among the information processing apparatus (source apparatus) 710, the information processing apparatus (sink apparatus) 730, and the access point 701.

In addition, in FIGS. 19 and 20, an example is illustrated in which the information processing apparatus (sink apparatus) 730 functions as a group authentication server. In other words, the information processing apparatus (sink apparatus) 730 is configured to have a group authentication function.

FIGS. 49 to 53 are diagrams that illustrate an example of a WFD IE format exchanged between apparatuses configuring the communication system 700 according to the second embodiment of the present technology.

FIG. 54 is a diagram that illustrates an example of a new message used for an application service platform (ASP) exchanged between apparatuses configuring the communication system 700 according to the second embodiment of the present technology.

First, an application (an application that is installed to the information processing apparatus 710 in advance) used for communicating with the information processing apparatus 730 in the information processing apparatus 710 is started up (631). The starting-up of this application, for example, is performed according to a user operation (for example, an operation of pressing an application button).

Here, in FIGS. 19 and 20, an example is illustrated in which each process is started after the source apparatus is directly connected to the access point as a default. In other words, the information processing apparatus 710 performs a connection request for the sink apparatus (the information processing apparatus 730) through a specific access point (the access point 701) by starting up the application that is installed in advance.

More specifically, after connected to the access point 701, the information processing apparatus 710 performs a device discovery (corresponding to the Device Discovery (615) illustrated in FIG. 18) and displays connectable sink apparatuses on the display unit 711.

Here, as a method of discovering devices, for example, a method may be used in which the protocol of Wi-Fi Direct can be executed through the access point 701, a message such as a Probe Request is received, and a device is discovered. In addition, for example, a method may be used in which, between stations connected to the access point 701, Device Service Type represented by Universal Plug and Play (UPnP) is exchanged, and a device is discovered.

Here, an example of the control method of Device Descovery or Service Descovery will be described.

The information processing apparatus 710 (source apparatus) transmits a Probe Request to the information processing apparatus 730 (sink apparatus) through the access point 701 and searches for a device that is connectable through P2P.

For example, in a case where the information processing apparatus 730 (sink apparatus) is an apparatus that is connectable through P2P, by receiving a Probe Response through the access point 701, a frequency channel used for a P2P connection can be detected. Here, the information processing apparatus 730 (sink apparatus) is assumed to be an apparatus that is connectable through P2P, and description will be presented on a premise that a Probe Response is received.

According to the process described above, the information processing apparatus 710 (source apparatus) acquires a frequency channel used for a P2P connection with the information processing apparatus 730 (sink apparatus) and sets up a P2P connection.

After the P2P connection is set up, the information processing apparatus 710 (source apparatus), after setting up a link of a TCP connection or an RTSP connection with the information processing apparatus 730 (sink apparatus), exchanges one or more of the following (C1) to (C4).

(C1) P2P IE (Information Element)

(C2) WFD IE (Information Element)

(C3) ASP (Application Service Platform) (for example, new format using a format command of ASP)

(C4) Protocol in UPnP Standard

For example, an exchange method will be described in which a WFD IE is encapsulated in a payload part of the Probe Request or the Probe Response.

An example of a format using (C2) WFD IE described above is illustrated in FIGS. 49 to 53. FIGS. 49 to 51 illustrate formats assigned by Miracast Release 1 in advance. Here, a new bit is allocated to a Subelement ID (11) illustrated in FIG. 51. More specifically, new fields corresponding to this Subelement ID (11) are illustrated in FIGS. 52 and 53.

In FIG. 51, [5:0] of New Device Information Field is information used for the information processing apparatus 730 (sink apparatus) to determine an optimal frequency channel in a P2P connection.

In the sequence process using any one of (C1) to (C3) described above, the information processing apparatus 710 (source apparatus) can determine an optimal frequency channel in a P2P connection with the information processing apparatus 730 (sink apparatus) by acquiring each information. For example, frequency information (a field of [23:14] illustrated in FIG. 53) associated between the access point 701 and the information processing apparatus 730 (sink apparatus) can be used. In addition, for example, concurrent (common agenda) information (a field of [5:2] illustrated in FIG. 53) of a radio circuit of the information processing apparatus 730 (sink apparatus) can be used. This concurrent (common agenda) information, for example, is information (a field of [5:2] illustrated in FIG. 53) representing whether connection forms such as a time divisional connection of a same frequency channel, a time divisional connection of different frequency channels, a simultaneous connection of a same frequency channel, and a simultaneous connection of different frequency channels can be made. In addition, for example, a terminal capability (a field of [13:8] illustrated in FIG. 53) as a radio function can be used.

In addition, there are also cases where a wired connection or a connector connection such as a simplified Ethernet cable or a USB cable connector is formed between the access point 701 and the information processing apparatus 730 (sink apparatus). In such cases, the information processing apparatus 730 (sink apparatus) notifies the information processing apparatus 710 (source apparatus) that a connection with the access point 701 is a wired connection ([1:0] illustrated in FIG. 53) and whether or not a radio channel for a P2P connection is included. In this way, the information processing apparatus 710 (source apparatus) can determine an optimal frequency channel. For example, in a case where the information processing apparatus 730 (sink apparatus) supports only a wire circuit, a transition to the P2P connection is not made, and a connection with the access point 701 is directly made. On the other hand, in a case where the information processing apparatus 730 (sink apparatus) supports also a radio circuit, a connection can be made by selecting one of supported frequency channels.

While an example has been illustrated as above in which a WFD IE is encapsulated in the part of the payload of the Probe Request or the Probe Response, the present technology is not limited thereto.

For example, in a case where the Display Service of Wi-Fi Direct Services is used, Service Capability Information can be exchanged between devices through a message that is compliant with the ASP. More specifically, a hexadecimal number formed as a text string that is acquired by dividing information included in the WFD IE for every four bits is transmitted and received. In addition, the information included in the WFD IE is not limited to the specification of the current time point. For example, the Service Capability Information illustrated in FIG. 54 may be included in the payload.

In addition, a negotiation of the associated frequency information and the concurrent (common agenda) information of devices may be performed as a part of the process of the Device Discovery or the Service Discovery. Furthermore, the negotiation of the associated frequency information and the concurrent (common agenda) information of devices may be re-negotiated when a frequency channel change is necessary in the middle of transmission. In addition, it may be configured such that, at the time of starting a negotiation, a negotiation between the information processing apparatus 710 (source apparatus) and the information processing apparatus 730 (sink apparatus) is made regarding (C1) to (C4) that can be exchanged, and a method of exchanging the information is selected.

In addition, in each process described above, an example has been illustrated in which the information processing apparatus 710 (source apparatus), after receiving a Probe Response, performs (C1) to (C4) after setting up a TCP connection or an RTSP connection of a P2P connection link. However, before setting up the P2P connection link, by using a TCP connection or an RTSP connection through which the information processing apparatus 710 (source apparatus) and the information processing apparatus 730 (sink apparatus) are connected through the access point 701, a Probe Request and a Probe Response including a WFD IE may be exchanged. In addition, in this example, while an example has been illustrated in which the information processing apparatus 710 (source apparatus) leads the process, the information processing apparatus 730 (sink apparatus) may lead the process.

In addition, regardless of each process described above, it may be configured such that a frequency used for a P2P connection to the Probe Request described above is written, and a frequency channel in which the Probe Response is replied from the information processing apparatus 730 (sink apparatus) is not the frequency channel used by the Probe Request. In addition, the reception may be performed through the P2P connection.

In addition, in the embodiment of the present technology, while an example is illustrated in which a device discovery is performed immediately after starting the application, the present technology is not limited thereto. For example, a case may be considered in which at least one of the source apparatus and the sink apparatus has a tag function or Reader/Write function of the NFC. In such a case, any one of the apparatuses may be configured to start the method of the Device Descovery or the Service Descovery described above by using NFC at timing when a touch is made using the NFC. In addition, whether or not a connection toward the access point is started may be determined on the basis of the timing when a touch is made using the NFC. Furthermore, the criteria for the selection of (C1) to (C4) described above may be exchanged between the information processing apparatus 710 (source apparatus) and the information processing apparatus 730 (sink apparatus) through the NFC. For example, the touch timing of the NFC may be used for switching between the following (D1) and (D2).

(D1) Access Point Is Disconnected at Touched Timing, and Direct Connection Is Made (D2) Connection through TDLS at Touched Timing In addition, a case may be considered in which a plurality of sink apparatuses corresponding to the started application are discovered through the device discovery process. In such a case, by displaying a selection screen used for selecting a desired sink apparatus from the plurality of discovered sink apparatuses on the display unit of the source apparatus, the selection may be performed by a user operation on this selection screen. In addition, among the plurality of discovered sink apparatuses, an apparatus positioned closest to the source apparatus may be configured to be automatically selected and connected. In addition, in a case where the closest apparatus is automatically selected, for example, the positional information acquired from each apparatus may be used.

In this way, the application is started up in the information processing apparatus 710, and the sink apparatus is selected (631). FIGS. 19 and 20 illustrate an example of a case where the information processing apparatus 730 is selected.

When the sink apparatus (the information processing apparatus 730) is selected in this way (631), the control unit (corresponding to the control unit 240 illustrated in FIG. 2) of the information processing apparatus 710 makes a connection request toward the sink apparatus (the information processing apparatus 730) through the access point 701 (632 to 635). In this connection request, for example, identification information (for example, the terminal identification information 391 illustrated in FIG. 4) used for specifying the information processing apparatus 710 and identification information (application information) used for specifying the application to be started are included.

In a case where a connection request from the information processing apparatus 710 is received (635), the control unit (corresponding to the control unit 370 illustrated in FIG. 3) of the information processing apparatus 730 performs a group authentication process (636). In this group authentication process, it is determined whether or not the information processing apparatus 710 is allowed to be participated in a group operated by the application started up in the information processing apparatus 710 (636). In other words, the control unit of the information processing apparatus 730 performs a group authentication process for determining whether or not a connection for operating the application started up in the information processing apparatus 710 is permitted to the information processing apparatus 710 (636).

For example, in the group authentication process, it is determined whether or not a user operation for permitting the information processing apparatus 710 is performed by one of the source apparatus, the sink apparatus, and the control apparatus 740 that belong to the same group and are already in the connected state. Then, on the condition that a user operation for permitting the information processing apparatus 710 is performed in one of such apparatuses (the source apparatus, the sink apparatus, and the control apparatus 740), a determination permitting the information processing apparatus 710 to participate in the group can be performed.

For example, on the display unit of at least one of the apparatuses (the source apparatus, the sink apparatus, and the control apparatus 740), a display screen (for example, a pop-up) used for performing a user operation for permitting the information processing apparatus 710 is displayed. Then, on the display screen, in a case where a user operation for permitting the information processing apparatus 710 is performed, the control unit of the information processing apparatus 730 performs a determination permitting the information processing apparatus 710 to participate in the group (636).

In addition, for example, on the basis of whether or not an information processing apparatus is registered in the control apparatus 740, the group authentication process may be performed. For example, the control unit of the information processing apparatus 730 performs a determination permitting an information processing apparatus, of which the terminal identification information is stored in group management information maintained by the control apparatus 740, to participate in the group (636). However, in a case where a group participation time is stored in the group management information maintained by the control apparatus 740, the control unit of the information processing apparatus 730 performs a determination permitting the participation in the group only in a case where the time is within the group participation time (636).

In a case where the participation of the information processing apparatus 710 in the group is determined to be permitted in the group authentication process (636), the control unit of the information processing apparatus 730 transmits connection permission information to the information processing apparatus 710 through the access point 701 (637 to 640). Here, the connection permission information is information that represents an indication of permitting the information processing apparatus 710 to participate in the group operated by the application started up in the information processing apparatus 710.

On the other hand, in a case where no participation of the information processing apparatus 710 in the group is determined in the group authentication process (in a case where the authentication is no permission) (636), the control unit of the information processing apparatus 730 transmits connection no-permission information to the information processing apparatus 710 through the access point 701. Here, the connection no-permission information is information that represents an indication of not permitting the participation of the information processing apparatus 710 in the group operated by the application started up in the information processing apparatus 710. In a case where this connection no-permission information is received by the information processing apparatus 710, the operation of the data transmitting process is ended.

In a case where the connection permission information is received from the information processing apparatus 730 (640), the control unit of the information processing apparatus 710 transmits miracast service information relating to the information processing apparatus 710 to the information processing apparatus 730 (641 to 644). In this case, the control unit of the information processing apparatus 710 transmits the miracast service information relating to the information processing apparatus 710 to the information processing apparatus 730 through the access point 701 (641 to 644).

This miracast service information is miracast service information used for performing Wi-Fi certified miracast communication with the information processing apparatus 730. In addition, in this miracast service information, information used for performing a P2P direct connection for the information processing apparatus 730 with the connection to the access point 701 maintained is included. Furthermore, in this miracast service information, capability information relating to the information processing apparatus 710 is included.

In a case where the miracast service information is received from the information processing apparatus 710 (644), the control unit of the information processing apparatus 730 transmits setting request information to the information processing apparatus 710 through the access point 701 (645 to 648). This setting request information is information (miracast setting request information) requesting a setting for video/audio transmission in the Wi-Fi certified miracast specification.

Here, the information processing apparatus 730 performs band control and display screen control of each source apparatus connected to the information processing apparatus 730. For this reason, it is necessary to request the information processing apparatus 710, which is newly connected, to set parameters in consideration of group sharing on the basis of relations with the other source apparatus. Thus, after the participation of the information processing apparatus 710 in the group is permitted, the information processing apparatus 730 transmits setting request information relating to the information processing apparatus 710 on the basis of the information relating to each source apparatus connected to the information processing apparatus 730 (645 to 648).

In addition, as described above, on the basis of an instruction from the information processing apparatus 730, first, the low-speed video/audio transmitting mode is set in the information processing apparatus 710. In other words, in a case where setting request information is received from the information processing apparatus 730 (648), the low-speed video/audio transmitting mode is set in the information processing apparatus 710 as an initial state.

In addition, on the basis of an instruction from the information processing apparatus 730, the communication mode of the information processing apparatus 710 is switched. For example, in the case of automatic switching, the switching is sequentially performed in order of the low-speed video/audio transmitting mode→the high-speed video/audio transmitting mode (peripheral channel)→the high-speed video/audio transmitting mode (center channel)→the low-speed video/audio transmitting mode, . . . .

Here, a case will be considered in which the communication mode of the information processing apparatus 710 is switched using the switching method of one of (B1) to (B3) described above. Here, an example will be illustrated in which the communication mode of the information processing apparatus 710 is switched from the low-speed video/audio transmitting mode to the high-speed video/audio transmitting mode (peripheral channel).

In this way, in a case where the high-speed video/audio transmitting mode is set (649), the control unit of the information processing apparatus 710 disconnects the access to the information processing apparatus 730 through the access point 701 (650 and 651).

Subsequently, the control unit of the information processing apparatus 710 performs a P2P connection process for a direct connection with the information processing apparatus 730 (652 and 653). After this P2P connection process is completed (652 and 653), the control unit of the information processing apparatus 710 performs a connection request for the information processing apparatus 730 on the basis of the setting request information received from the information processing apparatus 730 (654 and 655). In other words, the control unit of the information processing apparatus 710 transmits a connection request to the information processing apparatus 730 on the basis of the setting request information received from the information processing apparatus 730 (654 and 655). This connection request is a connection request relating to a connection setting up to layer 3.

In a case where a connection request is received (655), the control unit of the information processing apparatus 730 transmits checking information representing an indication of permitting the reception of a video and an audio corresponding to the connection request to the information processing apparatus 710 (656 and 657). In a case where this checking information is received (657), the control unit of the information processing apparatus 710 starts a P2P direct connection with the information processing apparatus 730 (658 and 659).

In other words, the control unit of the information processing apparatus 710, on the basis of a connection request (miracast request information) corresponding to the received checking information, performs a negotiation of video parameters and audio parameters with the information processing apparatus 730 and performs transmission of video data (658 and 659).

Here, a case will be considered in which the communication mode of the information processing apparatus 710 is switched using a switching method of one of (B1) to (B3) described above. Here, an example will be illustrated in which the communication mode of the information processing apparatus 710 is switched from the high-speed video/audio transmitting mode (center channel) to the low-speed video/audio transmitting mode.

In this way, in a case where the low-speed video/audio transmitting mode is set (660), the control unit of the information processing apparatus 710 disconnects the direct connection with the information processing apparatus 730 (661 and 662).

Subsequently, the control unit of the information processing apparatus 710 performs a connection process for a connection with the information processing apparatus 730 through the access point 701 (663 and 664).

In addition, as described above, the connection system between the information processing apparatus 710 and access point 701 is different from that between the information processing apparatus 710 and information processing apparatus 730. For this reason, it is important to quickly perform the connection process and cause the user to feel a continuous connection. Thus, for example, in a case where switching between a direct connection and a connection made through the access point 701 is performed, it may be configured such that a connection time is acquired in advance, and an image displayed last on the display device 731 is maintained as it is by the sink apparatus (the information processing apparatus 730). Then, the sink apparatus (the information processing apparatus 730) performs connection switching during the process of changing the display position in the display device 731. In other words, the sink apparatus performs an interpolation process such that it is difficult for the user to notice disconnection. In this way, the switching can be performed without causing the user to feel a switching time that physically occurs.

[Example of Operation of Information Processing Apparatus (Source Apparatus)]

Figure 21:
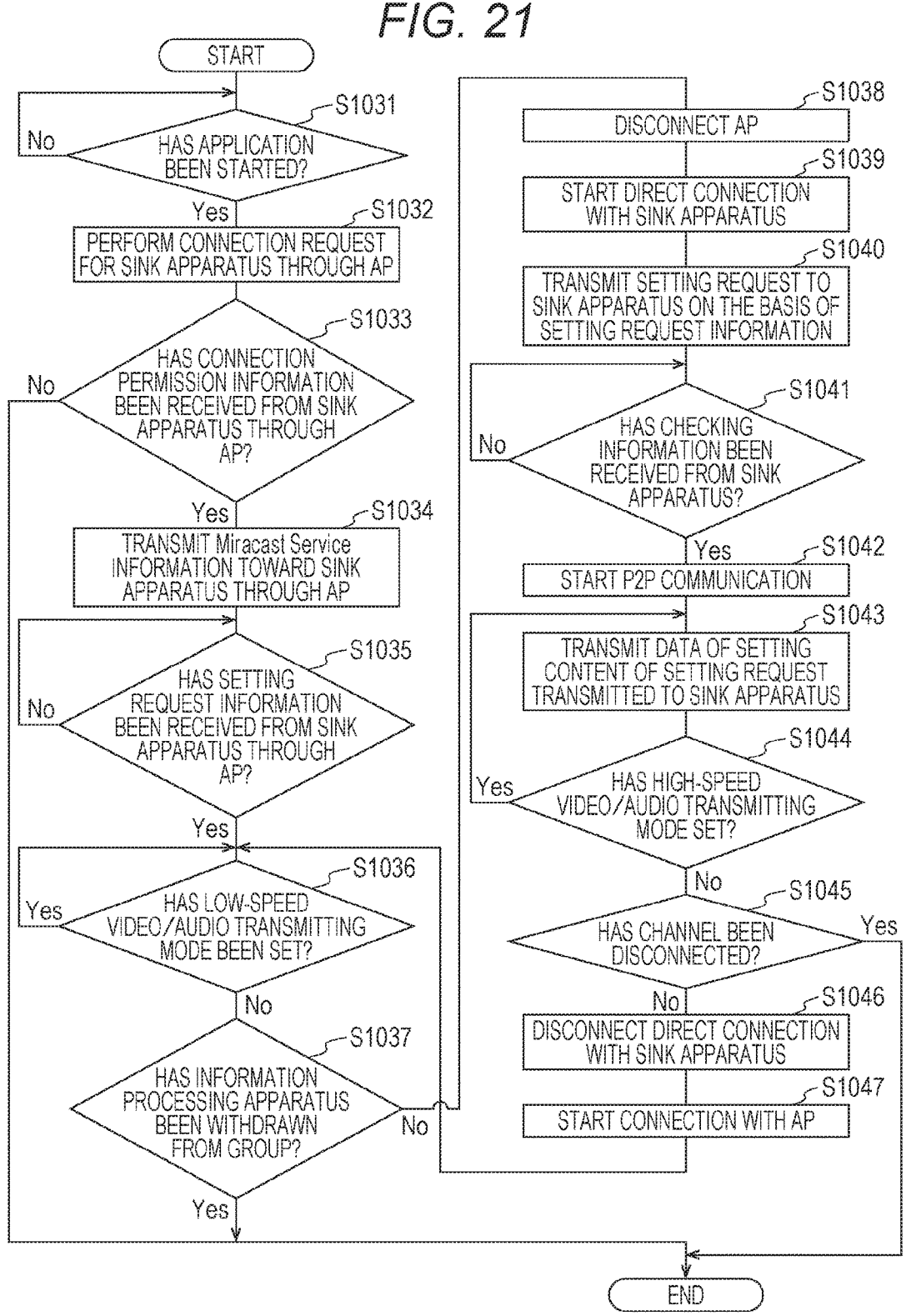
FIG. 21 is a flowchart that illustrates an example of the processing sequence of a data transmitting process performed by an information processing apparatus 710 according to the second embodiment of the present technology.

FIG. 21 is a flowchart that illustrates an example of the processing sequence of a data transmitting process performed by the information processing apparatus 710 according to the second embodiment of the present technology. In FIG. 21, an example is illustrated in which, as a default, after the source apparatus (information processing apparatus 710) is directly connected to the access point, each process is started. In other words, the information processing apparatus 710 starts up an application that is installed in advance and performs a connection request for the sink apparatus through a specific access point (the access point 701). In addition, in FIG. 21, an example is illustrated in which the information processing apparatus 710 is connected to the information processing apparatus 730 as a sink apparatus and is connected to the access point 701 as the specific access point.

First, an application for communicating with the sink apparatus (information processing apparatus 730) is started up in the information processing apparatus 710 (Step S1031). After this starting up, a sink apparatus (the information processing apparatus 730) that is a connection target is selected (Step S1031).

Subsequently, the control unit of the information processing apparatus 710 performs a connection request for a connection to the information processing apparatus 730 through the access point 701 (AP) (Step S1032). Subsequently, the control unit of the information processing apparatus 710 determines whether or not connection permission information has been received from the information processing apparatus 730 through the access point 701 (Step S1033). In a case where connection permission information has not been received from the information processing apparatus 730 (Step S1033), the operation of the data transmitting process is ended. In this case, the operation of the data transmitting process may be ended on a condition that connection permission information is not received within a predetermined time.

In a case where the connection permission information is received (Step S1033), the control unit of the information processing apparatus 710 transmits miracast service information of the information processing apparatus 710 to the information processing apparatus 730 through the access point 701 (Step S1034).

Subsequently, the control unit of the information processing apparatus 710 determines whether or not setting request information has been received from the information processing apparatus 730 through the access point 701 (Step S1035). In a case where the setting request information has not been received (Step S1035), monitoring is continuously performed.

On the other hand, in a case where the setting request information has been received (Step S1035), the low-speed video/audio transmitting mode is set in the information processing apparatus 710 as an initial state. Then, the control unit of the information processing apparatus 710 determines whether or not the low-speed video/audio transmitting mode is set (Step S1036). Then, in a case where the low-speed video/audio transmitting mode is set in the information processing apparatus 710 (Step S1036), the monitoring is continuously performed. In addition, the low-speed video/audio transmitting mode and the high-speed video/audio transmitting mode may be automatically selected according to a user's reading place.

On the other hand, in a case where the low-speed video/audio transmitting mode is not set (in a case where the high-speed video/audio transmitting mode is set) (Step S1036), the control unit of the information processing apparatus 710 determines whether or not the information processing apparatus 710 is withdrawn from the group (Step S1037). Here, as the case where the information processing apparatus 710 is withdrawn from the group, for example, as a case where the information processing apparatus 710 moves to a place at which radio waves of none of the access point and the sink apparatus do not arrive or a case where a user operation for being withdrawn from the group is performed is considered may be assumed. The user operation, for example, can be an operation of pressing a withdraw button (for example, an operation of pressing an operation member or an operation of pressing the touch panel). In addition, the user operation is performed in any one of the information processing apparatus 710, another source apparatus, the sink apparatus, and the control apparatus 740.

Then, in a case where the information processing apparatus 710 is withdrawn from the group (Step S1037), the operation of the data transmitting process ends. On the other hand, in a case where the information processing apparatus 710 has not been withdrawn from the group (Step S1037), the control unit of the information processing apparatus 710 disconnects the connection with the information processing apparatus 730 through the access point 701 (Step S1038).

Subsequently, the control unit of the information processing apparatus 710 performs a P2P connection process for performing a direct connection with the information processing apparatus 730 (Step S1039). After the completion of this P2P connection process (Step S1039), the control unit of the information processing apparatus 710 transmits a connection request to the information processing apparatus 730 on the basis of the setting request information received from the information processing apparatus 730 (Step S1040).

Subsequently, the control unit of the information processing apparatus 710 determines whether or not checking information representing an indication of permitting the reception of an image corresponding to the connection request has been transmitted from the information processing apparatus 730 (Step S1041). In a case where the checking information has not been transmitted from the information processing apparatus 730 (Step S1041), the monitoring is continuously performed.

On the other hand, in a case where the checking information has been transmitted from the information processing apparatus 730 (Step S1041), the control unit of the information processing apparatus 710 starts a P2P direct connection with the information processing apparatus 730 (Step S1042). Then, the control unit of the information processing apparatus 710 performs a negotiation of video parameters and audio parameters with the information processing apparatus 730 on the basis of the connection request corresponding to the received checking information and performs transmission of video data (Step S1043).

Subsequently, the control unit of the information processing apparatus 710 determines whether or not the high-speed video/audio transmitting mode is set (Step S1044). Then, in a case where the high-speed video/audio transmitting mode is set in the information processing apparatus 710 (Step S1044), the process is returned to Step S1043.

In a case where the high-speed video/audio transmitting mode is not set (in a case where the low-speed video/audio transmitting mode is set) (Step S1044), the control unit of the information processing apparatus 710 determines whether or not the transmission line is disconnected (Step S1045). For example, in a case where the information processing apparatus 710 is withdrawn from the group, a transmission line connected to the access point 701 or the information processing apparatus 730 is disconnected. Then, in a case where the transmission line is disconnected (Step S1045), the operation of the data transmitting process is ended.

On the other hand, in a case where the transmission line is disconnected (Step S1045), the control unit of the information processing apparatus 710 disconnects the direct connection with the information processing apparatus 730 (Step S1046). Subsequently, the control unit of the information processing apparatus 710 starts a connection with the access point 701 (Step S1047).

In addition, the control unit of the information processing apparatus 710, in a case where the connection state is switched, may perform control such that the connection process is performed using at least one of port information and IP information relating to the connection before the switching. In addition, the switching of the connection state is switching from a state of being connected to the information processing apparatus 730 through the access point 701 to a connection state connected to the information processing apparatus 730 through direct communication or reverse switching.

<3. Third Embodiment>

In a third embodiment of the present technology, an example is illustrated in which, in a case where a plurality of source apparatuses are present, the display form (the display form of a display unit) of an image transmitted from each source apparatus is determined on the basis of a positional relation between a user using the source apparatus and a display unit of the sink apparatus side.

[Example of Configuration of Communication System]

Figure 22:
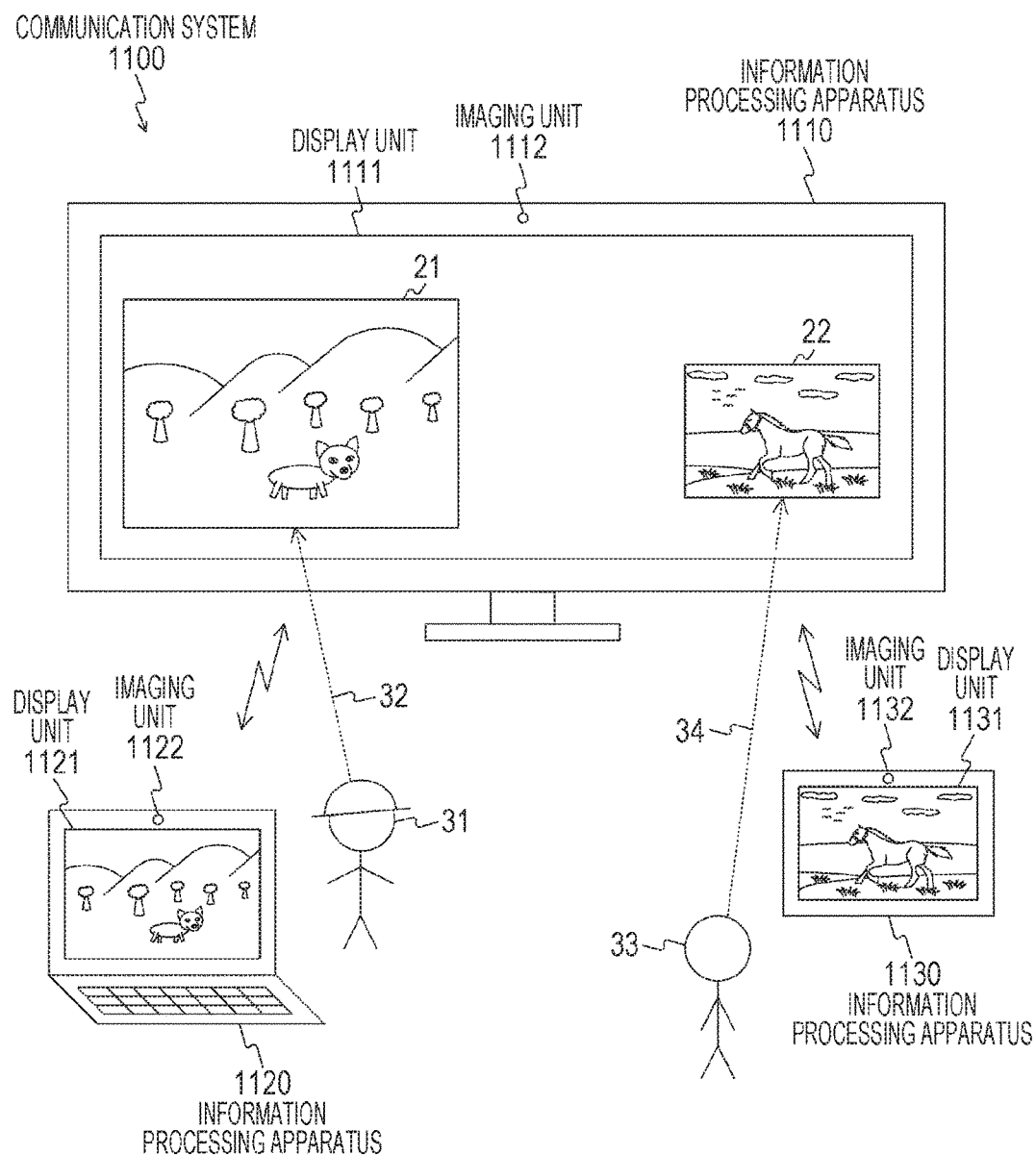
FIG. 22 is a diagram that illustrates an example of the system configuration of a communication system 1100 according to a third embodiment of the present technology.

FIGS. 22 and 23 are diagrams that illustrate an example of the system configuration of a communication system 1100 according to the third embodiment of the present technology.

The communication system 1100 includes: an information processing apparatus 1110; an information processing apparatus 1120; and an information processing apparatus 1130. In addition, each of the information processing apparatus 1110, the information processing apparatus 1120, and the information processing apparatus 1130 includes a user information acquiring unit (corresponding to the user information acquiring unit 360 illustrated in FIG. 3). This user information acquiring unit is an example of an acquisition unit described in the claims.

FIG. 22 illustrates a case where a user 31 possessing the information processing apparatus 1120 views a video 21 based on video data transmitted from the information processing apparatus 1120 (the sight line of the user 31 is denoted using a dotted line 32). In addition, in FIG. 22, a case is illustrated in which a user 33 possessing the information processing apparatus 1130 views a video 22 based on video data transmitted from the information processing apparatus 1130 (the sight line of the user 33 is denoted using a dotted line 34).

In addition, in FIG. 23, display examples of videos 23 and 24 after the user 31 and the user 33 move are illustrated. In addition, in FIG. 23, the sight line of the user 31 is denoted using a dotted line 36, and the sight line of the user 33 is denoted using a dotted line 35.

In addition, the information processing apparatus 1110 corresponds to the sink apparatus (for example, the information processing apparatus 300 illustrated in FIG. 1) illustrated in the first and second embodiments of the present technology. Furthermore, the information processing apparatus 1120 and the information processing apparatus 1130 correspond to the source apparatuses (for example, the information processing apparatuses 200 and 400 illustrated in FIG. 1) illustrated in the first and second embodiments of the present technology. For this reason, in the third embodiment of the present technology, points different from those of the first and second embodiments of the present technology will be focused in the description, and a part of description of common points will not be presented.

In this way, FIGS. 22 and 23 illustrate an example of the communication system 1100 in which a plurality of the users 31 and 33 are present, and a plurality of source apparatuses (the information processing apparatuses 1120 and 1130) are present. In this communication system 1100, an example is illustrated in which, in a case where images transmitted from the source apparatuses (the information processing apparatuses 1120 and 1130) are displayed by the sink apparatus (the information processing apparatus 1110), the display forms of the images are determined so as to be respectively easily seen by the users 31 and 33. In other words, also in a situation in which the physical positions of the source apparatuses and the image displays in the sink apparatus are different, displays that can be easily seen respectively by the users are performed, and, in a case where the users move, the images are also moved to display positions that can be easily seen by the users.

More specifically, a source apparatus corresponding to each user is determined and performs link between display areas (display windows) of a plurality of images displayed on the sink apparatus and users. Then, this link information is managed by being exchanged between the source apparatuses and the sink apparatus, and the display area of an image linked to each user is determined according to user's movement.

In addition, in FIGS. 22 and 23, while an example of a case where two or more users are present, and an apparatus (the information processing apparatus 1110) other than apparatuses possessed by the users is shared is illustrated, the present technology is not limited thereto. For example, the present technology can respond also to a case where a plurality of users share a display possessed by one user. In such a case, it is necessary to constantly identify each user linked to an image among a plurality of users. In addition, a user interface changing a user linking to the image in the middle may be also disposed.

[Example of User Recognition Capability Information]

FIG. 24 is a diagram that illustrates an example of a table of user recognition capability information exchanged between apparatuses configuring the communication system 1100 according to the third embodiment of the present technology. In addition, the table illustrated in FIG. 24 is an example, and the table is not limited thereto.

In FIG. 24, information exchanged between apparatuses performing processes of acquisition of user information, generation of personal information based on the user information, and associating (mapping) the personal information with a source apparatus is classified and illustrated.

For example, the sink apparatus can acquire an indication of a user's touch on the display screen and the position thereof as user information by using a user information acquiring unit (corresponding to the user information acquiring unit 360 illustrated in FIG. 3).

In addition, for example, the source apparatus and the sink apparatus can generate still image data or moving image data and acquire user information by using imaging units (the imaging units 1112, 1122, and 1132 illustrated in FIGS. 22 and 23). For example, still image data or moving image data including a user's face, a face direction, information of a sight destination, a bracelet/a ring/a collar/a watch/a necklace/a touch pen/clothing/a tag/a mark of a coin, a fingerprint, a vein, a height (an external shape of a body), a weight (an external shape of a body), and the like by using the imaging units. In addition, for example, in a case where a user wears a wearable device (for example, a bracelet/ring/necklace/watch) capable of performing near field radio communication, by acquiring information from the wearable device through the near field radio communication, and the acquired information can be used as the user information. For example, positional information (for example, positional information acquired from a GPS or positional information acquired from an acceleration sensor), user identification information, and the like are acquired from the wearable device, and the acquired information can be used as the user information.

In addition, for example, the source apparatus and the sink apparatus can acquire other user information on the basis of the user information acquired in that way. For example, by performing an image recognizing process for a face image included in the still image data or the moving image data, the face direction and a user's sight line can be detected (for example, see Japanese Patent Application Laid-Open No. 2013-239074 and Japanese Patent Application Laid-Open No. 2009-251303).

In addition, by performing an image recognizing process for the face image included in the still image data or the moving image data, the source apparatus and the sink apparatus can detect user's clothing, height, and weight. In addition, for example, the source apparatus and the sink apparatus can detect a user's moving distance (for example, a moving distance on an image) and a moving direction (for example, a moving direction on an image) on the basis of a change of the image on the time axis.

In addition, for example, the source apparatus and the sink apparatus can acquire user information by acquiring audio data by using an audio acquiring unit (for example, a microphone). For example, by using the audio data, a user can be identified by using a speech recognizing process. In addition, by using changes in the characteristic amount (for example, strength) of the audio data and the like, user's movement can be detected by using a speech recognizing process.

In addition, by using devices other than the source apparatus and the sink apparatus, the user information may be acquired. For example, a wearable device worn by the user possessing the source apparatus may be used. In addition, the wearable device, for example, is a device that is used with being worn by a part (for example, the eyes, the arm, the neck, the foot, or the trunk) of user's body. Then, user information acquired by various sensors (for example, an acceleration sensor, a GPS, and a small-size camera) included in the wearable device can be used. In addition, for example, the source apparatus can generate still image data by imaging tag information of the wearable device by using the imaging unit of the source apparatus and use this still image data as the user information.

In addition, in FIG. 24, while an example of the table recording the data extraction capability has been illustrated, the table is not limited thereto. For example, by separately recording flags of a data extraction capability and a collation capability in tables, and all or a part of such tables may be exchanged between the source apparatus and the sink apparatus.

[Content of Apparatus Information]

FIG. 25 is a diagram that schematically illustrates an example of a stored content of an apparatus information storing unit 1140 according to the third embodiment of the present technology. In addition, the apparatus information storing unit 1140 may be included in at least one of the source apparatus and the sink apparatus.

The apparatus information storing unit 1140 is a table that stores information (apparatus information) used for managing a relation between each source apparatus connected to the information processing apparatus 1110 by using radio communication and a display image based on data transmitted from the source apparatus.

For example, in the apparatus information storing unit 1140, terminal identification information 1141, a display position 1142, and a media access control address (MAC) 1143 are stored in association with each other. In addition, in a case where such each information is stored by the sink apparatus, the information may be stored in association with each information illustrated in FIG. 4.

In the terminal identification information 1141, identification information used for identifying a source apparatus connected to the information processing apparatus 1110 by using radio communication is stored.

In the display position 1142, information used for specifying a display position (a position on the display screen) of an image (an image based on data transmitted from each source apparatus) displayed in the source apparatus connected to the information processing apparatus 1110 by using radio communication is stored. For example, the coordinates of an image on the display screen (for example, the coordinates of one vertex (for example, a vertex disposed on the lower left side) of a rectangle corresponding to the image) and the size of the image on the display screen (for example, a horizontal length and a vertical length of the rectangle corresponding to the image) are stored.

In the MAC address 1143, a MAC address assigned to a source apparatus connected to the information processing apparatus 1110 by using radio communication is stored. In addition, instead of the MAC address, any other information (for example, an internet protocol (IP) address) identifying the source apparatus may be stored. Furthermore, any one of the terminal identification information 1141 and the MAC address 1143 may be stored.

For example, a case will be considered in which the sink apparatus functions as a dynamic host configuration protocol (DHCP) server. In such a case, the source apparatus can acquire an IP address from the sink apparatus (the DHCP server) (for example, Operation (616) illustrated in FIG. 18).

In addition, for example, the source apparatus can acquire a MAC address acquired through 4-way handshake (625) illustrated in FIG. 18.

In addition, it may be configured such that information relating to a wearable device worn by a user possessing the source apparatus is acquired by the sink apparatus, and the user is identified on the basis of the information relating to the wearable device. In such a case, identification information used for identifying the wearable device may be recorded in the apparatus information storing unit 1140.

[Content of User Information]

FIG. 26 is a diagram that schematically illustrates an example of a stored content of the user information storing unit 1150 according to the third embodiment of the present technology. In addition, the user information storing unit 1150 may be included in at least one of the source apparatus and the sink apparatus.

The user information storing unit 1150 is a table that stores information (user information) used for managing a user possessing each source apparatus connected to the information processing apparatus 1110 by using radio communication.

For example, in the user information storing unit 1150, user identification information 1151 and collation information 1152 are stored in association with each other.

In the user identification information 1151, identification information used for identifying a user possessing a source apparatus connected to the information processing apparatus 1110 by using radio communication is stored.

In the collation information 1152, collation information used at the time of recognizing a user stored in the user identification information 1151 is stored. For example, in a case where user's face image is used as the user information, as the collation information, face images used for matching up the user information (face image), characteristic amounts used for matching up the characteristic amount of the user information (face image), and the like are stored.

[Content of Link Information]

Figure 27:
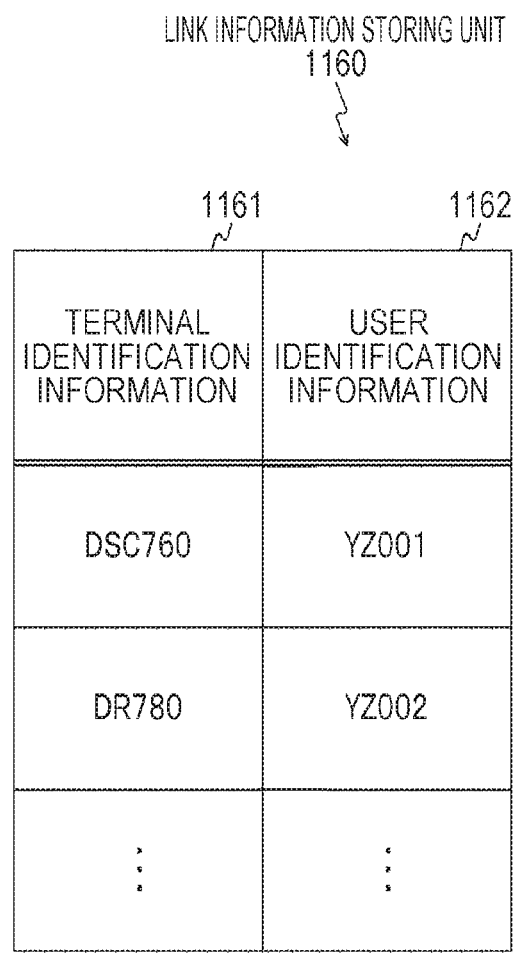
FIG. 27 is a diagram that schematically illustrates an example of a stored content of a link information storing unit 1160 according to the third embodiment of the present technology.

FIG. 27 is a diagram that schematically illustrates an example of a stored content of a link information storing unit 1160 according to the third embodiment of the present technology. In addition, the link information storing unit 1160 may be included in at least one of the source apparatus and the sink apparatus.

The link information storing unit 1160 is a table that stores information (link information) used for managing a relation between each source apparatus connected to the information processing apparatus 1110 by using radio communication and a user possessing the source apparatus.

For example, in the link information storing unit 1160, terminal identification information 1161 and user identification information 1162 are stored in association with each other. In addition, the terminal identification information 1161 corresponds to the terminal identification information 1141 illustrated in FIG. 25. In addition, the user identification information 1162 corresponds to the user identification information 1151 illustrated in FIG. 26.

[Example of Communication of Case where Link Between Source Apparatus and Display Position of Sink Apparatus is Performed]

Figure 28:
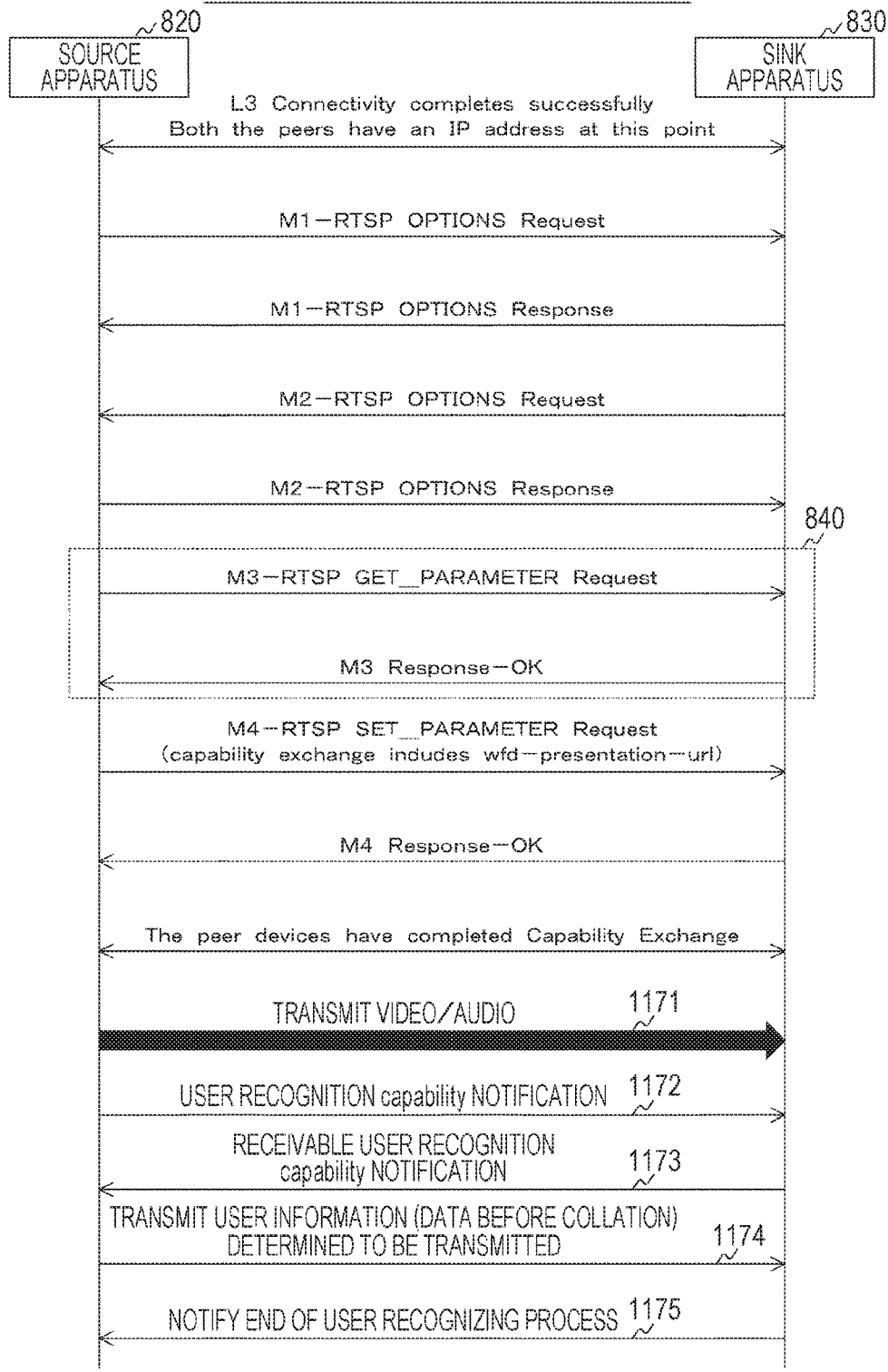
FIG. 28 is a sequence diagram that illustrates an example of a communication process between a source apparatus and a sink apparatus according to the third embodiment of the present technology.

FIG. 28 is a sequence diagram that illustrates an example of a communication process between a source apparatus and a sink apparatus according to the third embodiment of the present technology. In FIG. 28, an example of communication of a case where a link between the source apparatus and the display position of the sink apparatus is performed. In addition, FIG. 28 is a modified example of the communication illustrated in FIG. 14, and each process until the completion of the capability exchange is common to that illustrated in FIG. 14. For this reason, here, points different from those illustrated in FIG. 14 will be focused in the description. In addition, a source apparatus 820 corresponds to the information processing apparatuses 1120 and 1130, and a sink apparatus 830 corresponds to the information processing apparatus 1110.

For example, by completing the capability exchange, the transmission of video data and audio data from the source apparatus 820 to the sink apparatus 830 is started (1171). After this transmission is started, a process for linking a user possessing the source apparatus 820 and a display area (display window) displayed on the display unit of the sink apparatus 830 with each other is started (1172 to 1175).

First, a user recognition capability notification is made (1172). In other words, a message used for notifying the user recognition capability included in the source apparatus 820 is transmitted from the source apparatus 820 to the sink apparatus 830 (1172). For example, all or a part of the table of capabilities illustrated in FIG. 24 is exchanged (1172).

Subsequently, a receivable user recognition capability notification is made (1173). In other words, a message notifying a user recognition capability included the sink apparatus 830 from the sink apparatus 830 to the source apparatus 820 is transmitted (1173). For example, a table of capabilities illustrated in FIG. 24 is exchanged (1172). In such a case, for example, a table validating capabilities among the user recognition capabilities included in the sink apparatus 830 that are common to the user recognition capabilities transmitted from the source apparatus 820 to the sink apparatus 830 is preferably transmitted. In other words, it is preferable to notify the table validating only functions that can be supported by both the source apparatus 820 and the sink apparatus 830 from the sink apparatus 830 to the source apparatus 820. However, the configuration is not limited thereto. For example, it may be configured such that a table validating all the user recognition capabilities included in the sink apparatus 830 is transmitted, and functions that can be supported by both the source apparatus 820 and the sink apparatus 830 are determined on the source apparatus 820 side.

Here, an example is illustrated in which, from the user recognition capability information that can be received by the sink apparatus 830, the source apparatus 820 acquires the user information and transmits the acquired user information to the sink apparatus.

Subsequently, user recognition data (user information) determined to be transmitted is transmitted (1174). In other words, by receiving the table of receivable user recognition capabilities, the source apparatus 820 acquires user information corresponding to user recognition capabilities that can be received by the sink apparatus 830. Then, the source apparatus 820 transmits the user information to the sink apparatus 830 as user recognition data (data before collation).

For example, the source apparatus 820 can generate still image data by imaging the tag information of a wearable device by using an imaging unit and transmit this still image data to the sink apparatus 830 as user recognition data (data before collation).

Subsequently, a user recognizing process end notification is made (1175). In other words, the sink apparatus 830, after receiving the user information (for example, a still image) from the source apparatus 820, performs collation of the still image with collation information (collation information 1152 illustrated in FIG. 26) for user recognition that is stored by the sink apparatus 830 and generates personal information. As a face identifying method, for example, a method may be used in which a degree of similarity of characteristic amounts is calculated by comparing characteristic amounts extracted from a face image with characteristic amounts relating to a face of each registered person, and, in a case where the degree of similarity exceeds a threshold, a face included in the face image is determined to be the face of the registered person. In addition, as the face identifying method, for example, an identifying method in which an identifying process is performed using a characteristic vector as the characteristic amounts may be used (for example, see Japanese Patent Application Laid-Open No. 2008-129830).

Subsequently, the sink apparatus 830, on the basis of the generated personal information, displays a user ID (the user information 1151 illustrated in FIG. 26) on the display screen of a display unit (for example, the display unit 1111 illustrated in FIG. 22). In addition, the sink apparatus 830 displays a message for allowing the read image to be touched by the user together with the user ID.

For example, in the example illustrated in FIG. 22, a message allowing the video 21 viewed by the user 31 to be touched by the user 31 out of the videos 21 and 22 displayed on the display unit 1111 is displayed on the display unit 1111. Then, in a case where the user 31 performs an operation of touching the video 21, an indication of touching of the video 21 and information relating to the position on the display screen of the display unit 1111 are acquired by the control unit of the information processing apparatus 1110. For this reason, the control unit of the information processing apparatus 1110 can acquire the video 21 to be associated with the user 31.

Then, when user's touch operation is checked, the sink apparatus 830 associates the user and the display area (display window), stores a result thereof in the link information storing unit 1160 (illustrated in FIG. 27), and ends the link process. Subsequently, the sink apparatus 830 transmits a user recognizing process end notification to the source apparatus 820.

In addition, in FIG. 28, while an example is illustrated in which, after the transmission of video/audio using the protocol of the Wi-Fi certified miracast, the user and the display screen are linked together, the link operation is not limited thereto. For example, such processes may be interchanged.

Figure 41:
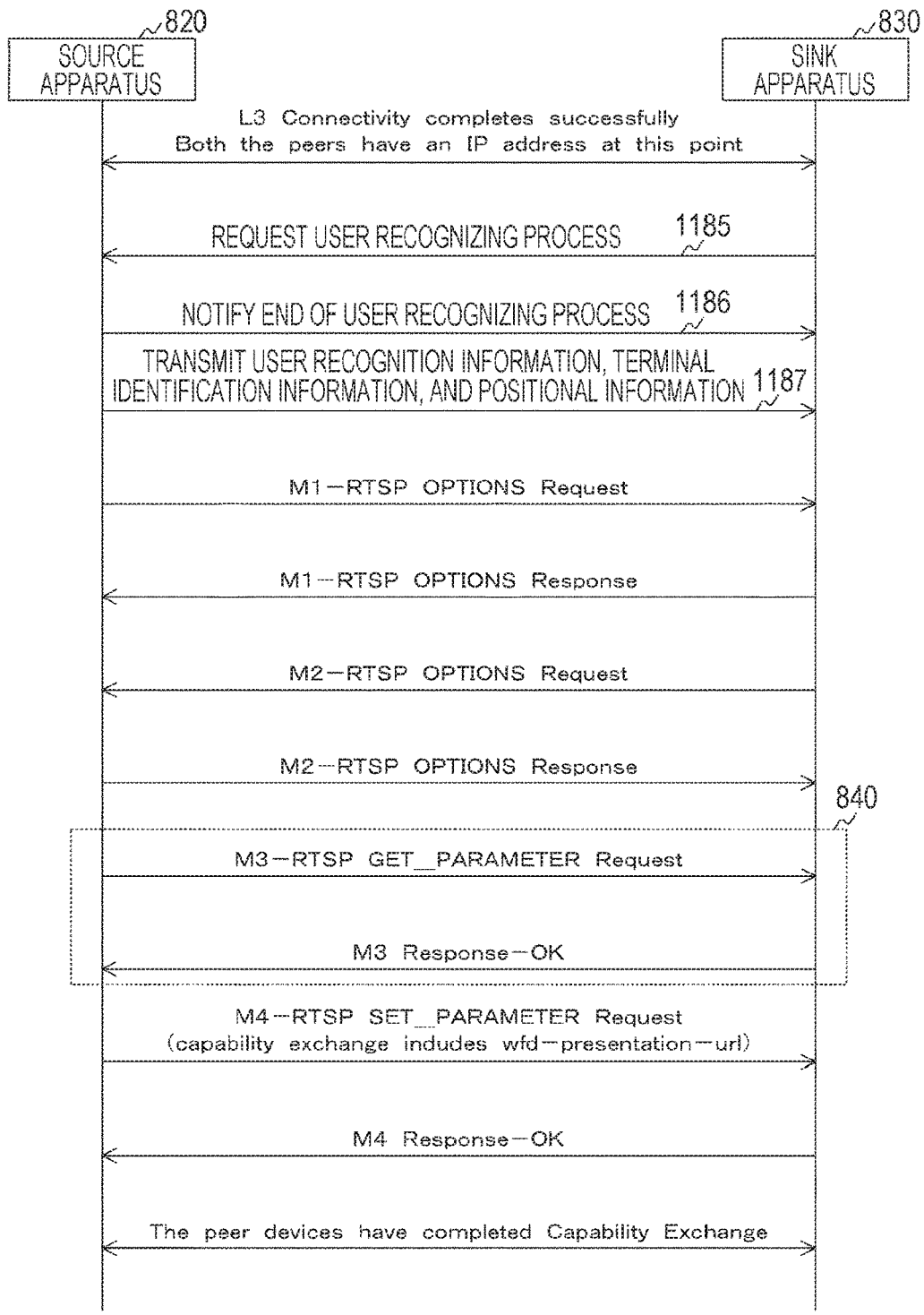
FIG. 41 is a sequence diagram that illustrates an example of a communication process between a source apparatus and a sink apparatus according to the third embodiment of the present technology.

For example, after the end of L3 connectivity, the source apparatus 820 and the sink apparatus 830 may be configured to perform the link process (1172 to 1175) described above. In addition, another example for associating a user possessing the source apparatus 820 with a display area (display window) is illustrated in FIG. 41.

In addition, in FIG. 28, an example is illustrated in which the source apparatus 820 transmits the user identification capability information, and the sink apparatus 830 receives the user identification capability information. However, the present technology is not limited thereto. For example, it may be configured such that the sink apparatus requests the source apparatus for the user identification capability information, and the source apparatus transmits the user identification capability information of the source apparatus in correspondence with the request information.

In addition, it may be configured such that the source apparatus requests the sink apparatus for processible user information/ positional information/ a display screen and a link method and acquires the capabilities of the sink apparatus side. Then, after the reception of the capabilities of the sink apparatus side, the source apparatus sets the user identification capability information of the source apparatus that can be received by the sink apparatus. In such a case, a request packet may be a packet that is similar to the Get_Pameter Request command in the miracast system. In addition, a response packet may be a packet that is similar to the Get_Pameter Response command in the miracast system. Such examples are illustrated in FIGS. 29a and 29b to 33a, 33b and 33c.

[Example of Communication of Case Where Source Apparatus and Display Position of Sink Apparatus Are Linked Together]

FIGS. 29a and 29b to 33a, 33b and 33c are sequence diagrams that illustrate an example of a communication process between a source apparatus and a sink apparatus according to the third embodiment of the present technology. FIGS. 29a and 29b to 33a, 33b and 33c illustrate a modification of a part of the example of the communication illustrated in FIG. 28. For this reason, only corresponding parts (1171 to 1175) of the example of the communication illustrated in FIG. 28 are illustrated, and the other parts are not illustrated.

Figure 29A:
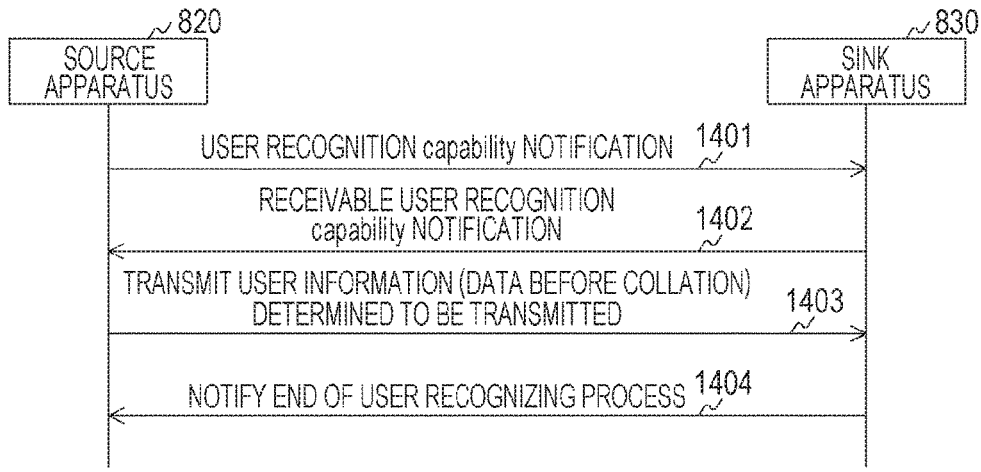
FIGS. 29a and 29b are sequence diagrams that illustrate an example of a communication process between a source apparatus and a sink apparatus according to the third embodiment of the present technology.
Figure 29B:
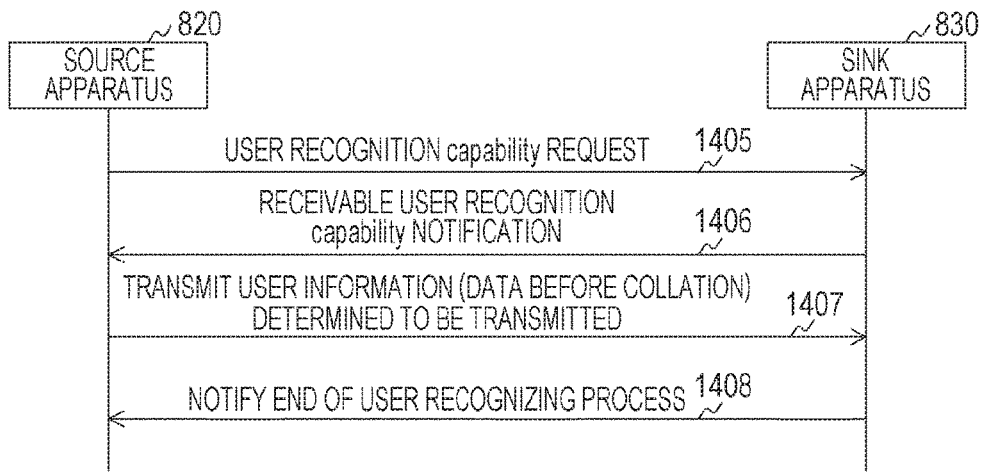

FIGS. 29a and 29b illustrate an example in which the source apparatus acquires the user information.

In FIG. 29a, an example of communication (1401 to 1404) that is the same as that illustrated in FIG. 28 is illustrated. For example, in a case where the sink apparatus selects a common user recognizing process, it is preferable to apply the example of the communication illustrated in FIG. 29a.

In FIG. 29b, an example of communication (1405 to 1408) of a case where capabilities are requested from the source apparatus is illustrated. For example, in a case where the source apparatus selects a user recognizing process included in the own apparatus, it is preferable to apply the example of the communication illustrated in FIG. 29b.

Figure 30A:
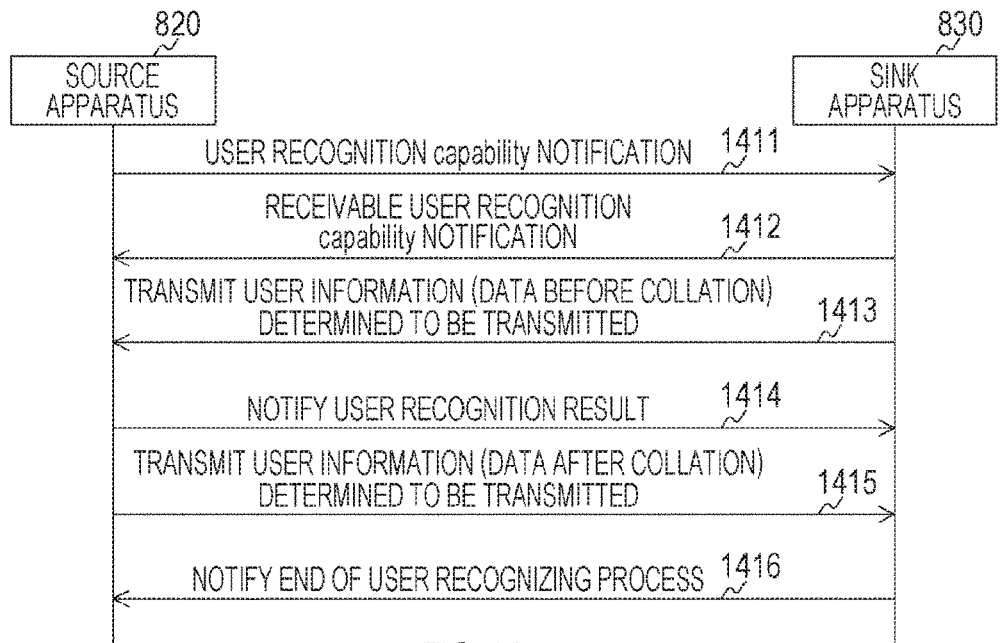
FIGS. 30a and 30b are sequence diagrams that illustrate an example of a communication process between a source apparatus and a sink apparatus according to the third embodiment of the present technology.
Figure 30B:
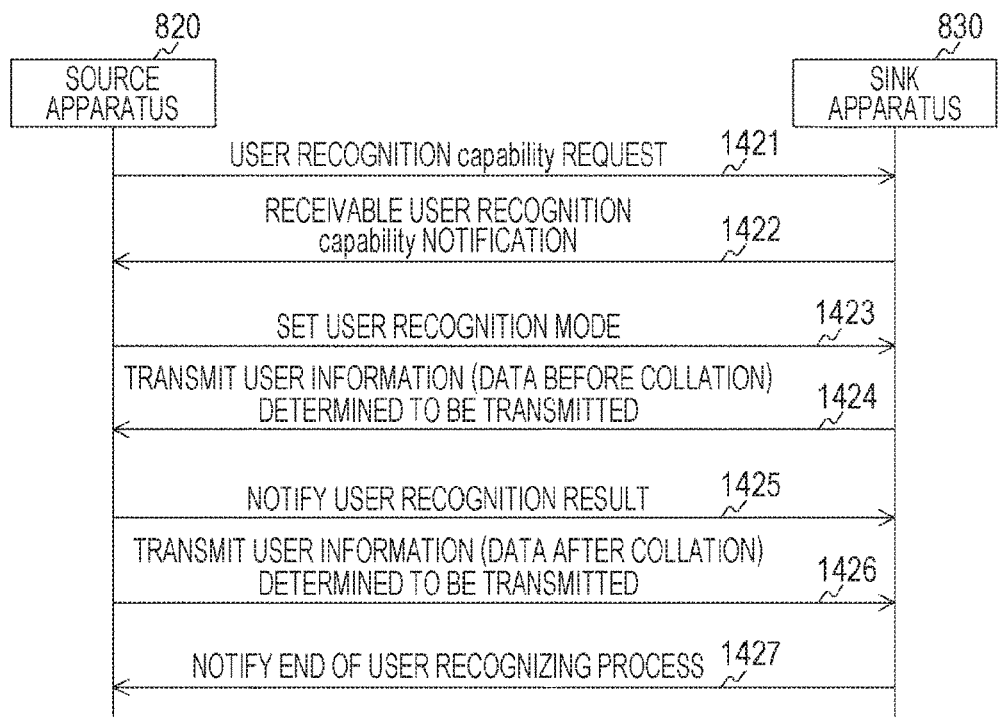

FIGS. 30a and 30b illustrate an example in which the sink apparatus acquires the user information.

In FIG. 30a, an example of communication (1411 to 1416) of a case where capabilities are notified from the source apparatus is illustrated. For example, in a case where the source apparatus can perceive that the sink apparatus can perform a user recognizing process, and, the user recognizing process is performed by the sink apparatus, it is preferable to apply the example of the communication illustrated in FIG. 30a. In addition, in a case where personal information such as collation information is managed by the source apparatus side, it is preferable to apply the example of the communication illustrated in FIG. 30a.

In FIG. 30b, an example of communication (1421 to 1427) of a case where capabilities are requested from the source apparatus is illustrated. For example, in a case where the process of the sink apparatus is distributed (for example, in a case where the capabilities of the source apparatuses are different, the user recognizing process is requested to be performed by the source apparatus), it is preferable to apply the example of the communication illustrated in FIG. 30b. For example, in a case where the source apparatus can perceive that the sink apparatus can performed the user recognizing process, and the user recognizing process is performed by the sink apparatus, it is preferable to apply the example of the communication illustrated in FIG. 30b.

FIGS. 31a, 31b and 31c illustrates an example in which the source apparatus acquires the user information.

In a of FIG. 31a, an example of communication (1431 to 1434) of a case where capabilities are notified from the source apparatus is illustrated. For example, in a case where the sink apparatus selects a common user recognizing process, it is preferable to apply the example of the communication illustrated in FIG. 31a.

In FIG. 31b, an example of communication (1435 to 1438) of a case where capabilities are requested from the source apparatus is illustrated. For example, in a case where the source apparatus selects the user recognizing process included in the own apparatus, it is preferable to apply the example of the communication illustrated in FIG. 31b.

In FIG. 31c, an example of communication (1441 to 1444) of a case where capabilities or a result of collation is requested from the sink apparatus is illustrated. For example, in a case where the sink apparatus leads the control of the source apparatus, it is preferable to apply the example of the communication illustrated in FIG. 31c.

Figure 32A:
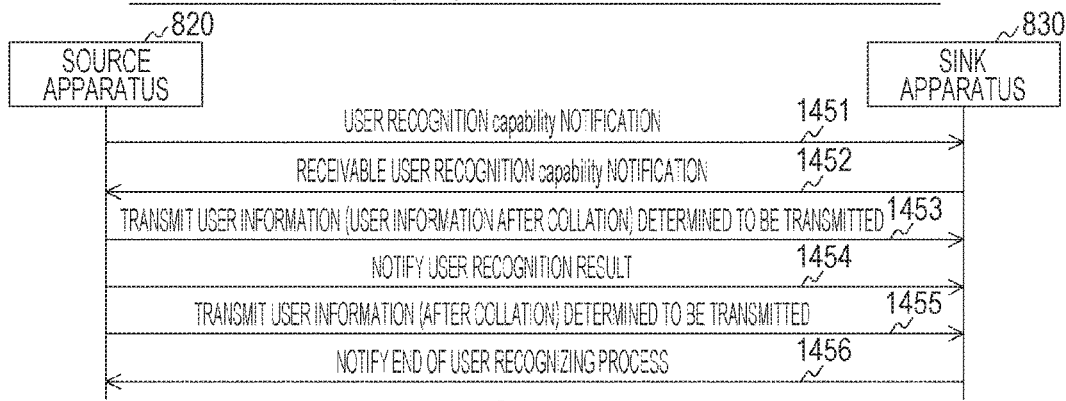
FIGS. 32a, 32b and 32c are sequence diagrams that illustrate an example of a communication process between a source apparatus and a sink apparatus according to the third embodiment of the present technology.
Figure 32B:
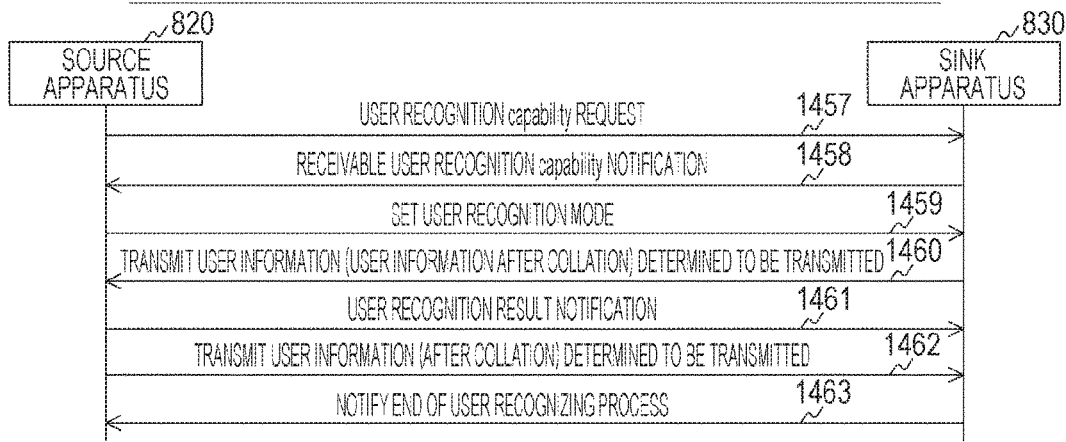
Figure 32C:
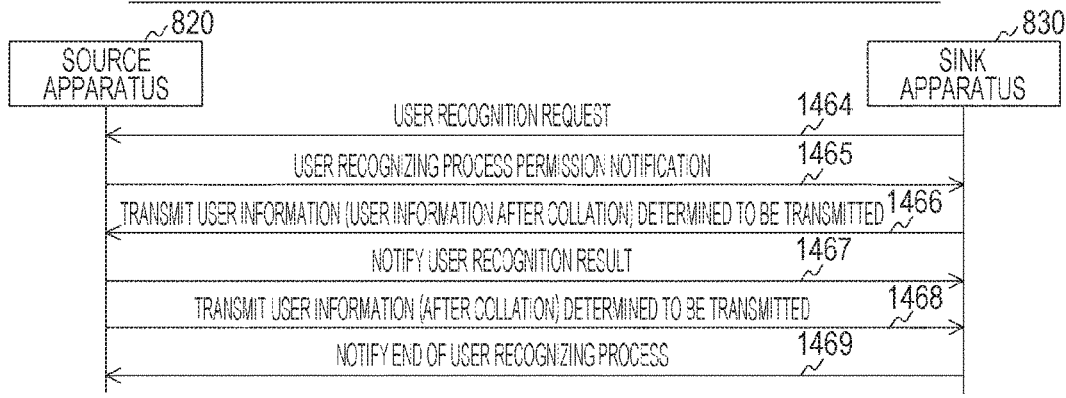

FIGS. 32a, 32b and 32c illustrates an example in which the sink apparatus acquires the user information.

In FIG. 32a, an example of communication (1451 to 1456) of a case where capabilities are notified from the source apparatus is illustrated. For example, in a case where the source apparatus can perceive that the sink apparatus can perform a user recognizing process, and, the user recognizing process is performed by the sink apparatus, it is preferable to apply the example of the communication illustrated in FIG. 32a. In addition, in a case where personal information such as collation information is managed by the source apparatus side, it is preferable to apply the example of the communication illustrated in FIG. 30a.

In FIG. 32b, an example of communication (1457 to 1463) of a case where capabilities are requested from the source apparatus is illustrated. For example, in a case where the process of the sink apparatus is distributed (for example, in a case where the capabilities of the source apparatuses are different, the user recognizing process is requested to be performed by the source apparatus), it is preferable to apply the example of the communication illustrated in FIG. 32b. For example, in a case where information after the collation is notified to the user, and association is performed after user's checking, it is preferable to apply the example of the communication illustrated in FIG. 32b.

In FIG. 32c, an example of communication (1464 to 1469) of a case where capabilities or a result of collation is requested from the sink apparatus is illustrated. For example, in a case where the sink apparatus leads user checking and then performs association, it is preferable to apply the example of the communication illustrated in FIG. 32c.

Figure 33A:
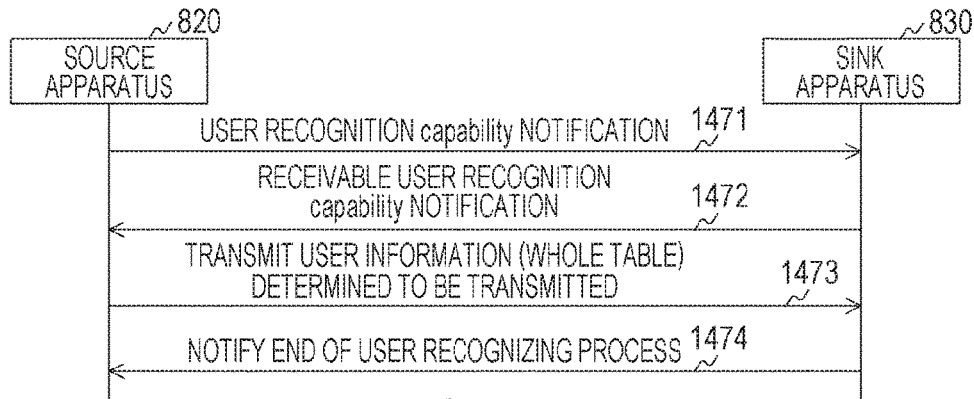
FIGS. 33a, 33b and 33c are sequence diagrams that illustrate an example of a communication process between a source apparatus and a sink apparatus according to the third embodiment of the present technology.
Figure 33B:
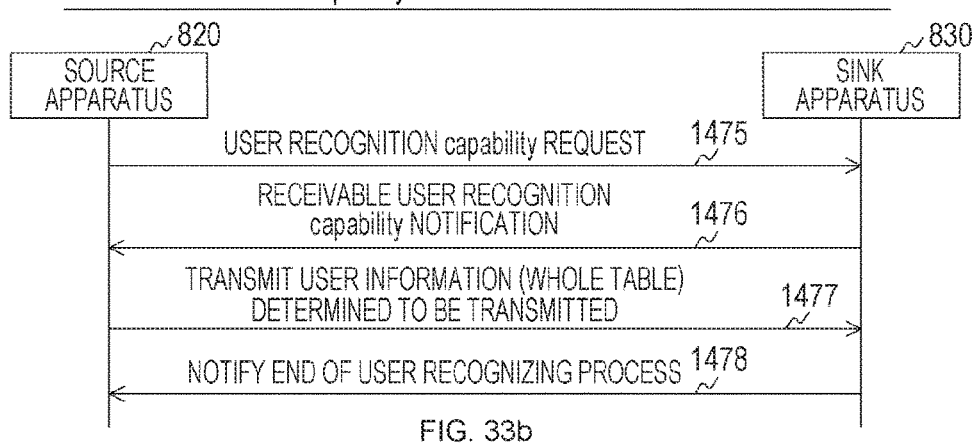
Figure 33C:
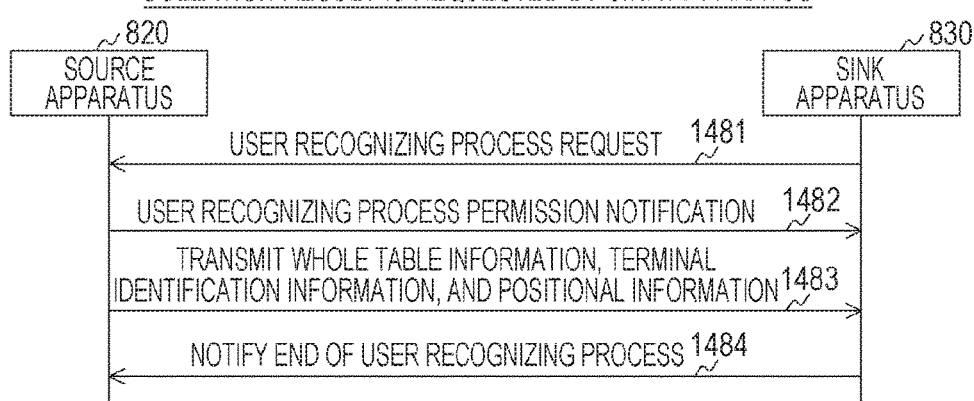

FIGS. 33a, 33b and 33c illustrate an example in which the source apparatus acquires the user information.

In a of FIG. 33a, an example of communication (1471 to 1474) of a case where capabilities are notified from the source apparatus is illustrated. For example, in a case where the sink apparatus selects a common user recognizing process, it is preferable to apply the example of the communication illustrated in FIG. 33a.

In FIG. 33b, an example of communication (1475 to 1478) of a case where capabilities are requested from the source apparatus is illustrated. For example, in a case where the source apparatus selects the user recognizing process included in the own apparatus, it is preferable to apply the example of the communication illustrated in FIG. 33b.

In FIG. 33c, an example of communication (1481 to 1484) of a case where capabilities or a result of collation is requested from the sink apparatus is illustrated. For example, in a case where the sink apparatus leads the control of the source apparatus, it is preferable to apply the example of the communication illustrated in FIG. 33c.

[Example of Operation of Information Processing Apparatus (Source Apparatus)]

Figure 34:
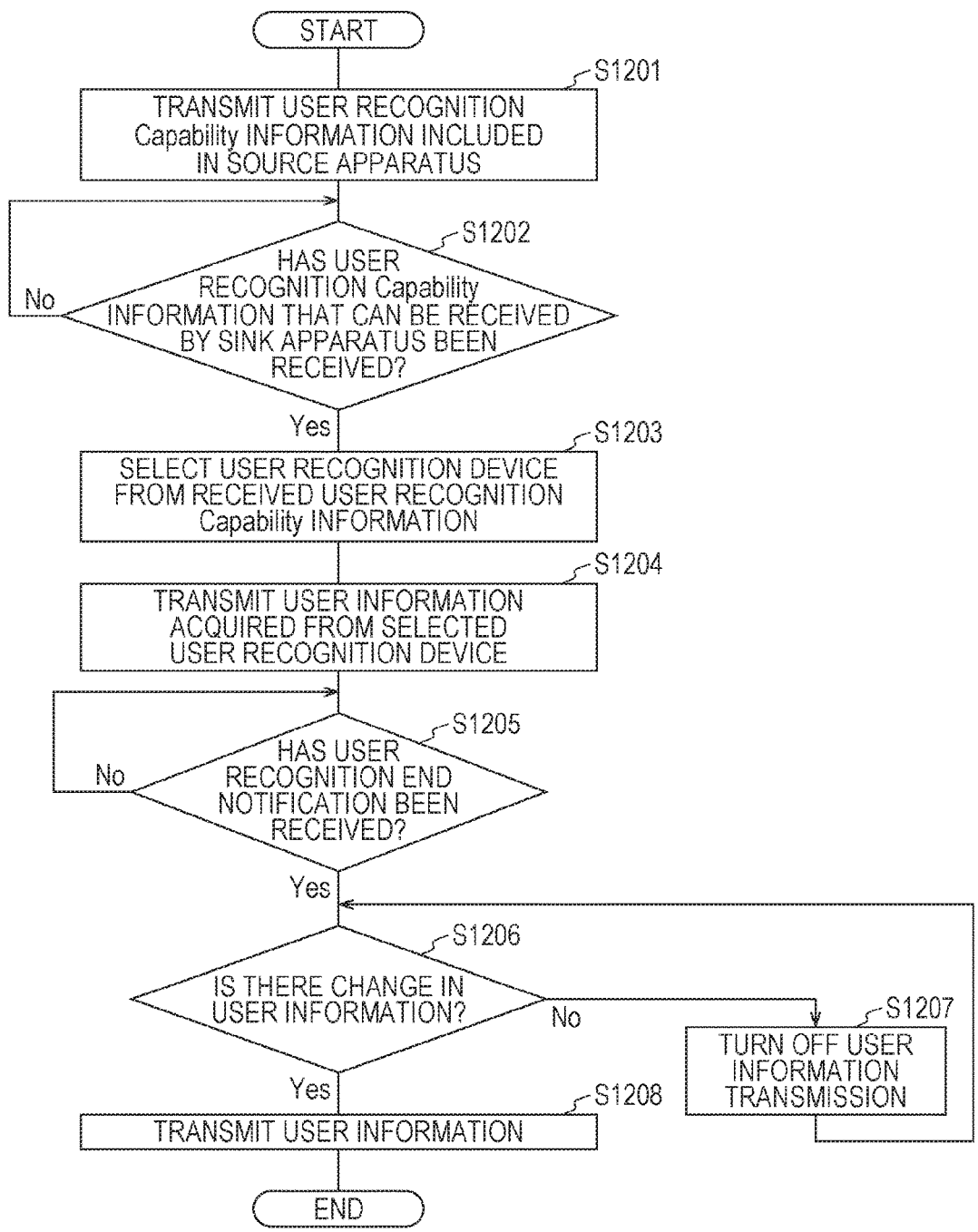
FIG. 34 is a flowchart that illustrates an example of the processing sequence of a user information transmitting process performed by an information processing apparatus 1120 according to the third embodiment of the present technology.

FIG. 34 is a flowchart that illustrates an example of the processing sequence of a user information transmitting process performed by the information processing apparatus 1120 according to the third embodiment of the present technology. In FIG. 34, an example is illustrated in which a source apparatus (the information processing apparatus 1120) performs acquisition (extraction) and transmission of the user information, and the sink apparatus (the information processing apparatus 1110) performs generation of personal information and association between the personal information and the source apparatus.

First, the control unit (corresponding to the control unit 240 illustrated in FIG. 2) of the information processing apparatus 1120 transmits user recognition capability information included in the own apparatus to the information processing apparatus 1110 (Step S1201). Subsequently, the control unit of the information processing apparatus 1120 determines whether or not the user recognition capability information that can be received by the information processing apparatus 1110 has been received (Step S1202). Then, in a case where the information has not been received (Step S1202), the monitoring is continuously performed.

By adding such information (user recognition capability information) to each information exchanged between the source apparatus and the sink apparatus, the information can be exchanged between the source apparatus and the sink apparatus.

For example, the user identification capability information can be stored in the information element (IE) at the time of performing Probe Request. In addition, an area of the IE in which the user identification capability information is stored is not limited. Furthermore, the user identification capability information may be stored in any one of a Wi-Fi Simple Config (WSC) IE, a P2P IE, and a Wi-Fi Direct (WFD) IE (for example, see Wi-Fi P2P Technical Specification v1.1 (Wi-Fi Direct)).

In addition, it may be configured such that, after a connection with a TCP is made, a control link corresponding (control of the sink apparatus from the source apparatus) to an opposite method of a UIBC is prepared, and the user identification capability information is exchanged using this control link.

Furthermore, by using an RTSP protocol illustrated in FIG. 14, the user identification capability information may be configured to be exchanged.

In addition, in a case where a still image, a moving image, and the like are exchanged between the source apparatus and the sink apparatus, not only the TCP or the RTSP but also an RTP or a UDP may be used.

In a case where user recognition capability information that can be received by the information processing apparatus 1110 is received (Step S1202), the control unit of the information processing apparatus 1120 selects a type of user information that is a transmission target from such user recognition capability information (Step S1203). For example, a device (for example, a wearable device worn by the user or a device (user identifying device) installed to the information processing apparatus 1120) to acquire the user information that is a transmission target is selected.

Subsequently, the control unit of the information processing apparatus 1120 transmits user information acquired by the selected user recognizing device to the information processing apparatus 1110 (Step S1204).

For example, in a case where the user information that is the transmission target is moving image data, the imaging unit 1122 of the information processing apparatus 1120 images a subject regularly or irregularly (for example, timing at which an imaging direction is present), thereby generating moving image data. In such a case, the control unit of the information processing apparatus 1120 transmits the moving image data generated by the imaging unit 1122 to the information processing apparatus 1110 as user information (Step S1204).

Subsequently, the control unit of the information processing apparatus 1120 determines whether or not a notification (user recognizing process end notification) indicating the end of a user recognizing process has been received from the information processing apparatus 1110 (Step S1205). Then, in a case where such a notification has not been received (Step S1205), the monitoring is continuously performed.

On the other hand, in a case where the user recognizing process end notification has been received (Step S1205), the control unit of the information processing apparatus 1120 determines whether or not there is a change in the user information acquired by the selected user recognizing device (Step S1206). In other words, the control unit of the information processing apparatus 1120 determines whether or not there is a change in the user (Step S1206).

For example, in a case where image data (still image data or moving image data) is used as the user information, it can be determined whether or not there is a change in the user information by using whether or not a sum value of luminance differences of pixels configuring an image that is a comparison target exceeds a threshold as a criterion.

Here, in a case where there is a change in the user information (Step S1206), the user is estimated to move. Thus, in a case where there is a change in the user information (Step S1206), the control unit of the information processing apparatus 1120 transmits latest user information to the information processing apparatus 1110 (Step S1208). In addition, in a case where positional information of the user can be acquired together with the user information, the user information and the positional information or only the positional information may be transmitted from the information processing apparatus 1110 (Step S1208). For example, by detecting the direction and the degree of movement of a target object included the video data, positional information (information representing the direction and the degree of movement) can be generated.

In addition, the control unit of the information processing apparatus 1120, after there is a change in the user information, may transmit the user information (or the positional information) for every predetermined time. In such a case, the length of the predetermined time may be configured to be changed by a user operation or be automatically changed. For example, in a case where the source apparatus is an apparatus of which the power consumption needs to be cared, the predetermined time may be set to be long. In addition, on the basis of the control of the sink apparatus, the predetermined time may be changed. For example, in a case where the number of source apparatuses connected to the sink apparatus is increased to be over a threshold, a process of increasing the predetermined time in accordance with the increased number or the like may be performed.

In addition, on the condition that a change request for changing the display form of an image in accordance with user's movement is received from the user, the source apparatus may transmit positional information based on the user information to the sink apparatus regularly or irregularly.

In addition, FIG. 34 illustrates an example in which, after the user information is transmitted (Step S1208), the user information transmitting process is ended. However, after the user information is transmitted (Step S1208), by causing the process to be returned to Step S1206, it may be continuously monitored whether or not there is a change in the user information.

On the other hand, in a case where there is no change in the user information (Step S1206), the control unit of the information processing apparatus 1120 turns off the user information transmitting process (Step S1207), and the process is returned to Step S1206. In this way, the power consumption relating to the transmission process can be reduced. In addition, after a predetermined time elapses after the user information transmitting process is turned off, the process may be returned to Step S1206.

Here, in a case where there is a change in the user information (Step S1206), operation information (for example, display of a message using a button or a pop-up) used for determining whether or not an image displayed in the sink apparatus is to follow the user's movement may be displayed. Then, on the basis of a user operation using the operation information, the control unit of the information processing apparatus 1120 may determine whether the user information is transmitted or not. For example, by using the operation information, in a case where an operation for causing the image to follow the user's movement is performed, the control unit of the information processing apparatus 1120 transmits the user information (Step S1208). On the other hand, for example, by using the operation information, in a case where an operation for causing the image not to follow the user's movement is performed, the control unit of the information processing apparatus 1120 turns off the transmitting process (Step S1207). In addition, such a setting content may be set by the user in advance.

In addition, a threshold of the user information may be arranged. In such a case, even in a case where there is a change in the user information (Step S1206), in a case where the change in the user information does not exceed the threshold, the process may be configured to proceed to Step S1207. For example, in a case where the control unit of the information processing apparatus 1110 can calculate user's moving distance on the basis of the user information, a threshold of the user's moving distance may be arranged. In such a case, the control unit of the information processing apparatus 1110 performs a determination that is based on whether or not a moving distance calculated on the basis of the user information exceeds the threshold (Step S1206).

[Example of Operation of Information Processing Apparatus (Sink Apparatus)]

Figure 35:
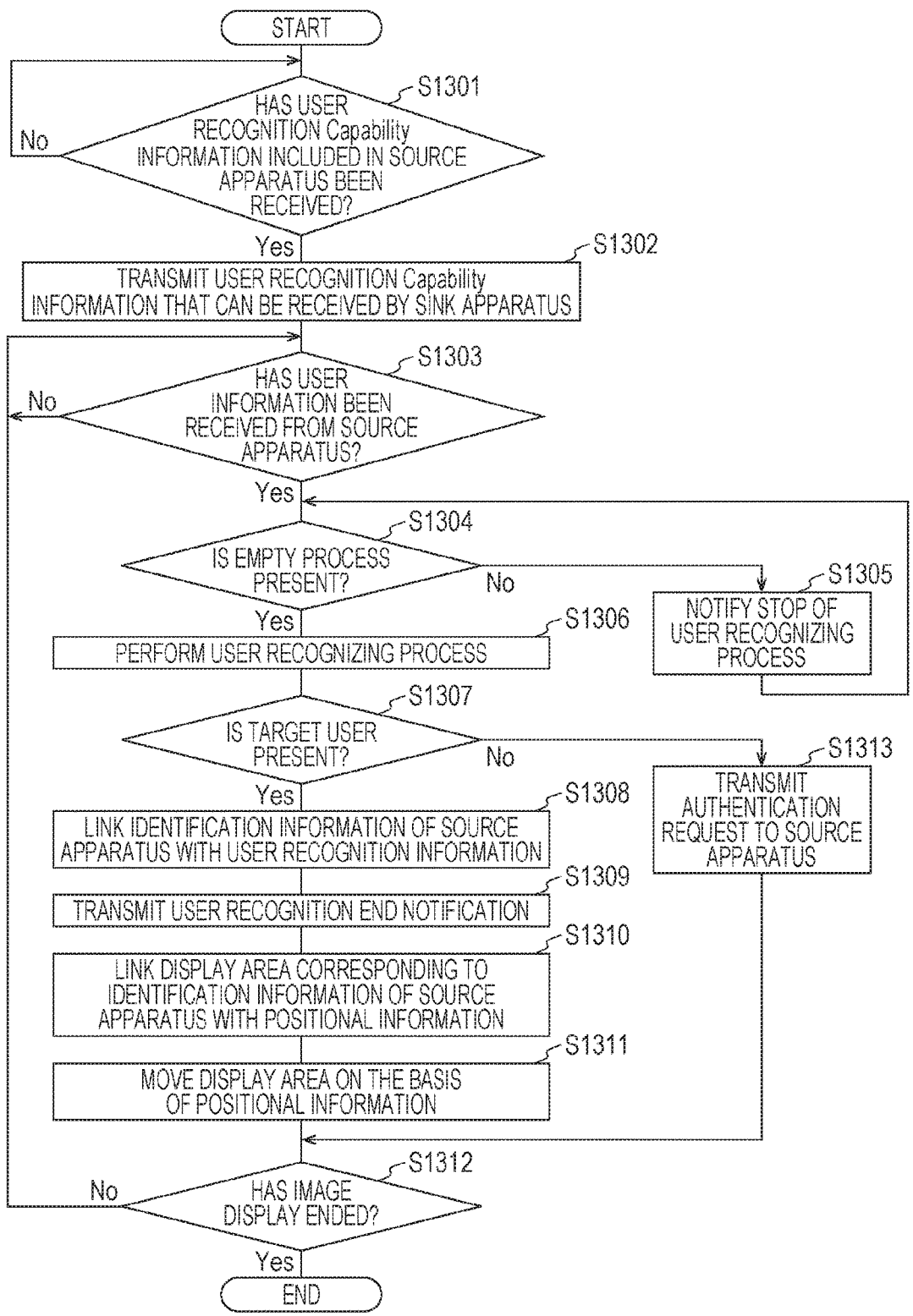
FIG. 35 is a flowchart that illustrates an example of the processing sequence of a display control process performed by an information processing apparatus 1110 according to the third embodiment of the present technology.

FIG. 35 is a flowchart that illustrates an example of the processing sequence of a display control process performed by the information processing apparatus 1110 according to the third embodiment of the present technology. In FIG. 35, an example is illustrated in which the source apparatus (the information processing apparatus 1120) performs the acquisition and transmission of the user information, and the sink apparatus (the information processing apparatus 1110) performs generation of personal information and association between the personal information and the source apparatus.

First, the control unit (corresponding to the control unit 370 illustrated in FIG. 3) of the information processing apparatus 1110 determines whether or not the user recognition capability information included in the information processing apparatus 1120 has been received from the information processing apparatus 1120 (Step S1301). Then, in a case where the information has not been received (Step S1301), the monitoring is continuously performed.

On the other hand, in a case where the user recognition capability information has been received (Step S1301), the control unit of the information processing apparatus 1110 transmits user recognition capability information that can be received by the information processing apparatus 1110 to the information processing apparatus 1120 (Step S1302).

Subsequently, the control unit of the information processing apparatus 1110 determines whether or not the user information (or the positional information) has been received from the information processing apparatus 1120 (Step S1303). Then, in a case where the information has not been received (Step S1303), the monitoring is continuously performed.

On the other hand, in a case where the user information (or the positional information) has been received (Step S1303), the control unit of the information processing apparatus 1110 determines whether or not there is an empty process capable of performing the user recognizing process in the information processing apparatus 1110 (Step S1304). In a case where there is no empty process capable of performing the user recognizing process (Step S1304), the control unit of the information processing apparatus 1110 stops the user recognizing process and stands by and notifies of the user that the user recognizing process is temporarily stopped (Step S1305). For example, an indication thereof may be notified to the user by displaying the display screen of the display unit 1111 to be thin or displaying an icon of "in-the-middle of the process".

In addition, here, an example is illustrated in which it is determined whether or not there is an empty process capable of performing the user recognizing process. However, instead of determining whether or not there is an empty process, it may be determined whether or not a user recognizing process having a heavy load of the information processing apparatus 1110 can be performed (Step S1304).

In addition, in a case where there is an empty process capable of performing the user recognizing process (Step S1304), the control unit of the information processing apparatus 1110 performs the user recognizing process (Step S1306).

Subsequently, the control unit of the information processing apparatus 1110 determines whether or not collation information 1152 matching the received user information is present in the user information storing unit 1150 (illustrated in FIG. 26) (Step S1307). In a case where the collation information 1152 matching the received user information is present, the control unit of the information processing apparatus 1110 stores the terminal identification information of the information processing apparatus 1120 and the received user information in the link information storing unit 1160 in association with each other (Step S1308).

Subsequently, the control unit of the information processing apparatus 1110 transmits a notification (user recognition end notification) indicating the end of the user recognizing process to the information processing apparatus 1120 (Step S1309).

Subsequently, the control unit of the information processing apparatus 1110 associates a display area corresponding to a source apparatus associated with the received user information with the received user information (Step S1310). For example, each information is stored in the apparatus information storing unit 1140 illustrated in FIG. 25.

Subsequently, the control unit of the information processing apparatus 1110, on the basis of the received user information, moves the display area corresponding to the source apparatus associated with this user information (Step S1311).

For example, in a case where the user moves in the horizontal direction (in a long-side direction) with respect to the display unit 1111, the image associated with the user may be moved in the horizontal direction of the display unit 1111.

In addition, for example, in a case where the user moves in the forward/backward direction with respect to the display unit 1111, the image associated with the user may be moved in the vertical direction of the display unit 1111. In such a case, for example, the control unit of the information processing apparatus 1110 may estimate user's moving distance and the direction on the basis of the received user information (or the positional information) and move the display area of the image on the basis of a result of the estimation.

Here, for example, during the middle of the movement of the display area, in a case where a plurality of display areas overlap each other, a display area that is fixed may have a priority. For example, the image of the display area that is in the middle of movement may be displayed to be thin, or an image of a display area that is fixed may be displayed on the front side.

On the other hand, in a case where collation information 1152 matching the received user information is not present (Step S1307), the control unit of the information processing apparatus 1110 transmits an authentication request to the information processing apparatus 1120 (Step S1313).

Here, as a transmission method for transmitting the authentication request (request packet), an authentication request may be stored in an information element (IE) at the time of performing Probe Response. In addition, an area of the IE in which the authentication request is stored is not limited. In addition, the authentication request may be stored any one of the WSC IE, the P2P IE, and the WFD IE.

In addition, it may be configured such that, after a connection with a TCP is made, a control link corresponding (control of the sink apparatus from the source apparatus) to an opposite method of a UIBC is prepared, and the authentication request is exchanged using this control link.

Furthermore, by using an RTSP protocol illustrated in FIG. 14, the authentication request may be configured to be exchanged.

Here, a process performed after the transmission of the authentication request will be described. For example, the control unit of the information processing apparatus 1110 may notify an indication of no registration of the transmitted user information to the user using the information processing apparatus 1120. For example, on the display unit 1121 of the information processing apparatus 1120, a message of the indication and a message urging the user to image his face by using the imaging unit 1122 may be displayed. After this display, for example, in a case where the user images high face by using the imaging unit 1122, the control unit of the information processing apparatus 1120 transmits video data (including the user's face) generated by the imaging process to the information processing apparatus 1110. In a case where the video data is received, the control unit of the information processing apparatus 1110 recognizes the face included in the video data as the user using the information processing apparatus 1120. Then, the control unit of the information processing apparatus 1110 stores the video data (information from which the face can be recognized) in the collation information 1152 of the user information storing unit 1150.

In addition, such each process may be performed as a part of a connection process for a connection to the display unit 1111 of the information processing apparatus 1110.

In this way, the control unit of the information processing apparatus 1110 performs control of displaying an image, which is based on the image information transmitted from a plurality of source apparatuses by using radio communication, in one area of the display unit 1111 for each source apparatus. In addition, the control unit of the information processing apparatus 1110, on the basis of the positional relation between a user associated with the source apparatus and the display unit 1111, performs control of determining the display form of the image corresponding to the source apparatus in the display unit 1111.

For example, the control unit of the information processing apparatus 1110, in a case where the user moves, may move the display area of an image corresponding to a source apparatus associated with the user on the display unit 1111 on the basis of the movement.

For example, the control unit of the information processing apparatus 1110 performs a user recognizing process on the basis of registration user information (collation information) that is registered and the user information transmitted from the source apparatus. Then, the control unit of the information processing apparatus 1110, on the basis of a result of the user recognizing process, performs association between the registration user information for the user and an image displayed on the display unit 1111. In addition, the control unit of the information processing apparatus 1110 determines the display form of the image on the basis of a change in the user information.

For example, the control unit of the information processing apparatus 1110, in a case where registration user information corresponding to the user information transmitted from the source apparatus is not present as the result of the user recognizing process, transmits request information used for requesting registration user information relating to the user information to the source apparatus.

Figure 36:
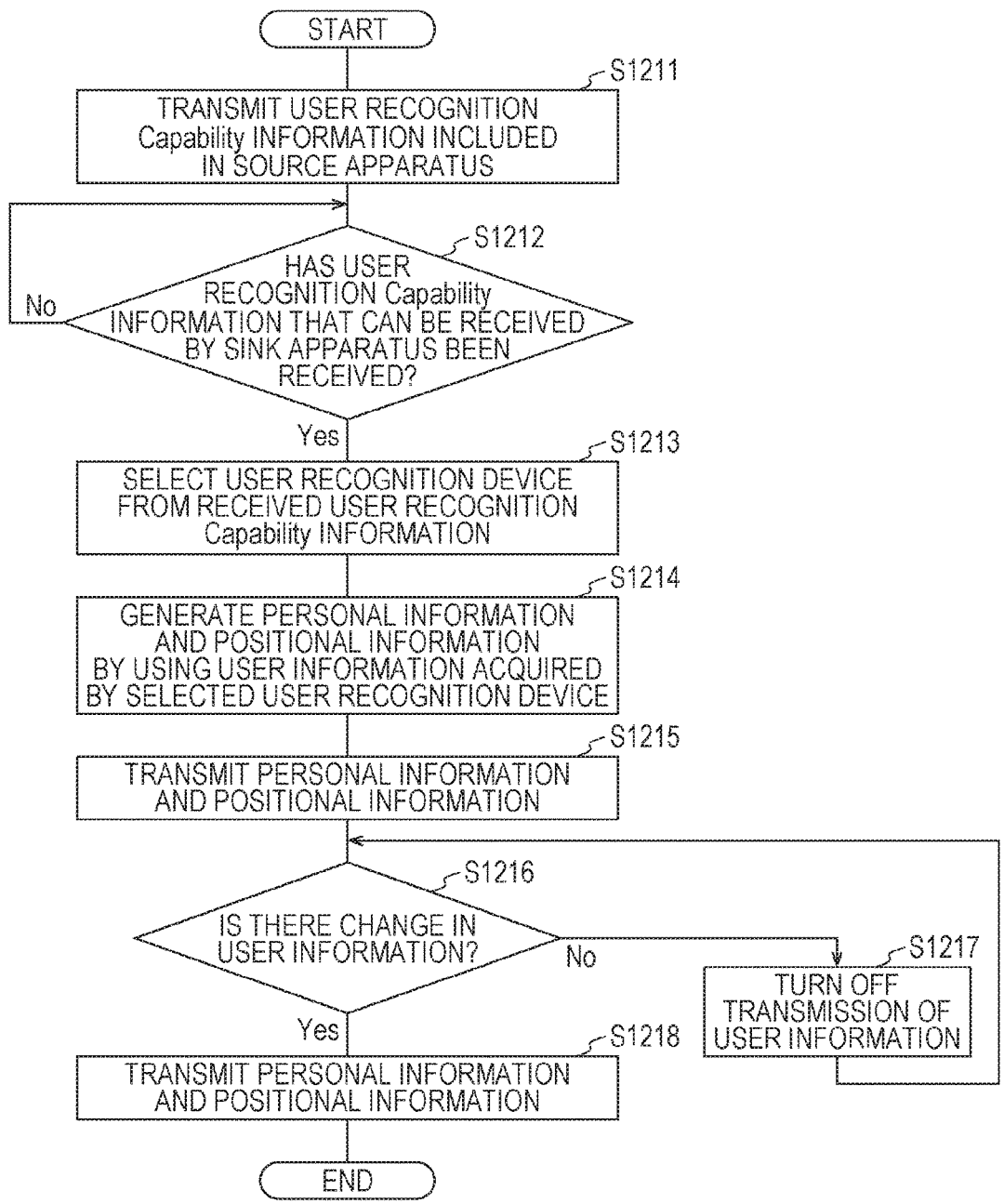
FIG. 36 is a flowchart that illustrates an example of the processing sequence of a user information transmitting process performed by the information processing apparatus 1120 according to the third embodiment of the present technology.
Figure 37:
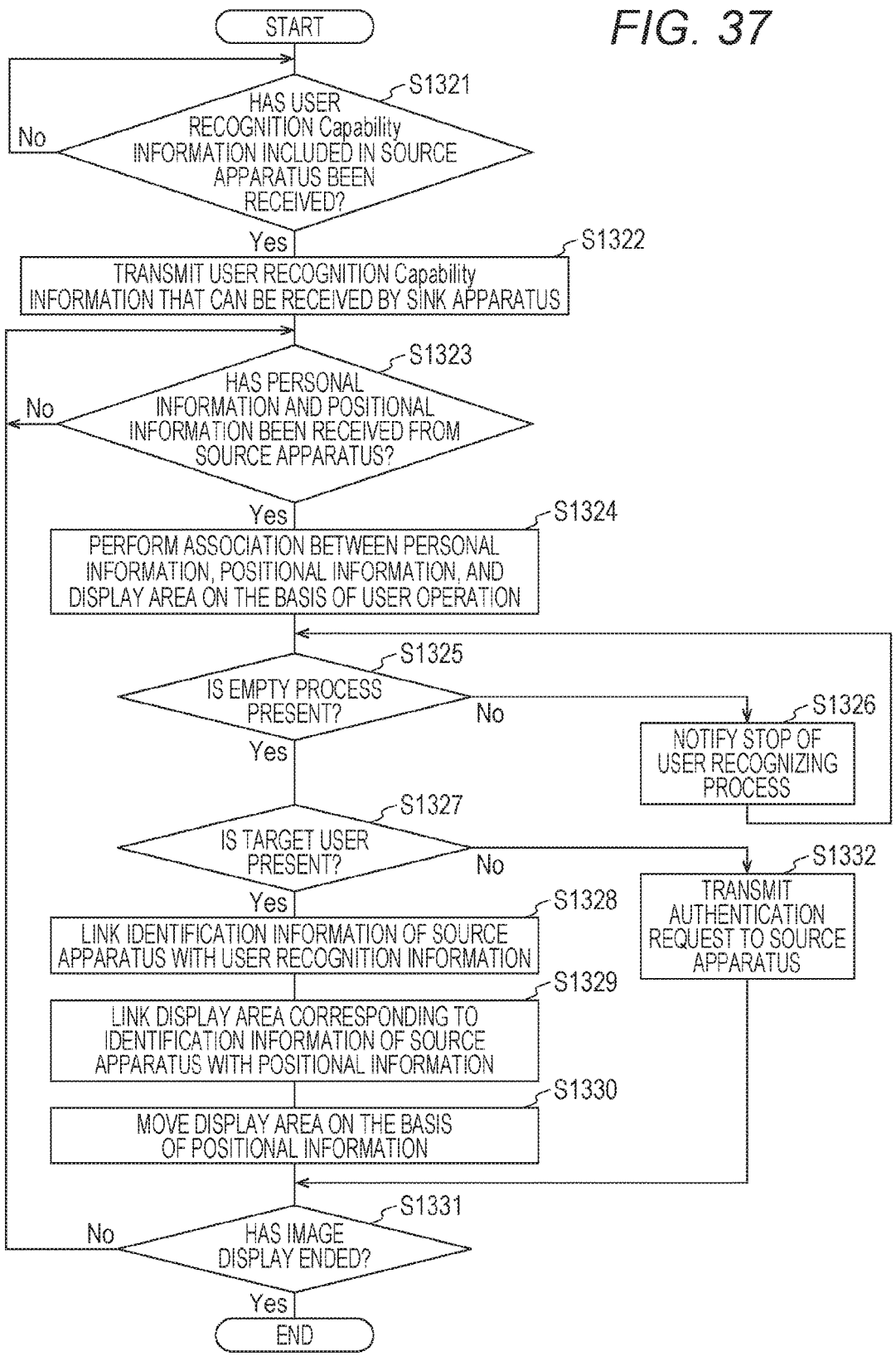
FIG. 37 is a flowchart that illustrates an example of the processing sequence of the display control process performed by the information processing apparatus 1110 according to the third embodiment of the present technology.

Next, an example is illustrated in FIGS. 36 and 37 in which the source apparatus (information processing apparatus 1120) performs acquisition (extraction) of user information, generation of personal information, and transmission thereof, and the sink apparatus (information processing apparatus 1110) performs association between the personal information and the source apparatus.

[Example of Operation of Information Processing Apparatus (Source Apparatus)]

FIG. 36 is a flowchart that illustrates an example of the processing sequence the user information transmitting process performed by the information processing apparatus 1120 according to the third embodiment of the present technology. In addition, since FIG. 36 illustrates a modified example of FIG. 34, a part of description of parts common to those illustrated in FIG. 34 will not be presented. More specifically, Steps S1211 to S1213 and S1217 correspond to Steps S1201 to S1203 and S1207 illustrated in FIG. 34.

The control unit of the information processing apparatus 1120 generates personal information and positional information on the basis of the user information acquired by the selected user recognizing device (Step S1214). Subsequently, the control unit of the information processing apparatus 1120 transmits the personal information and the positional information that are generated to the information processing apparatus 1110 (Step S1215).

Subsequently, the control unit of the information processing apparatus 1120 determines whether or not there is a change in the user information acquired by the selected user recognizing device (Step S1216).

In a case where there is a change in the user information (Step S1216), the control unit of the information processing apparatus 1120 transmits latest personal information and positional information to the information processing apparatus 1110 (Step S1218).

[Example of Operation of Information Processing Apparatus (Sink Apparatus)]

FIG. 37 is a flowchart that illustrates an example of the processing sequence of the display control process performed by the information processing apparatus 1110 according to the third embodiment of the present technology. In addition, since FIG. 37 illustrates a modified example of FIG. 35, a part of description of parts common to those illustrated in FIG. 35 will not be presented. More specifically, Steps S1321, S1322, S1325, S1326 and S1327 to S1332 correspond to Steps S1301, S1302, S1304, S1305, S1307, S1308 and S1310 to S1313 illustrated in FIG. 35.

The control unit of the information processing apparatus 1110 determines whether or not the personal information and the positional information have been received from the information processing apparatus 1120 (Step S1323). Then, in a case where the personal information and the positional information have not been received (Step S1323), the monitoring is continuously performed.

On the other hand, in a case where the personal information and the positional information have been received (Step S1323), the control unit of the information processing apparatus 1110 associates the personal information, the positional information, and a display area with each other on the basis of a user operation (for example, a touch operation) (Step S1324).

Subsequently, the control unit of the information processing apparatus 1110 determines whether or not there is an empty process in the information processing apparatus 1110 (Step S1325). In a case where there is no empty process (Step S1325), the control unit of the information processing apparatus 1110 stops the user recognizing process and stands by and notifies an indication of temporary stop of the user recognizing process to the user (Step S1326).

On the other hand, in a case where there is an empty process (Step S1325), the control unit of the information processing apparatus 1110 determines whether or not user identification information matching the received personal information is present (Step S1327). In a case where user identification information matching the received personal information is present (Step S1327), the control unit of the information processing apparatus 1110 stores the terminal identification information of the information processing apparatus 1120 and the received personal information in the link information storing unit 1160 in association with each other (Step S1328).

Subsequently, the control unit of the information processing apparatus 1110 associates a display area corresponding to the source apparatus associated with the received user information with the received personal information (Step S1329).

Subsequently, the control unit of the information processing apparatus 1110, on the basis of the received positional information, moves a display area corresponding to the source apparatus associated with the received personal information (Step S1330).

In this way, the source apparatus can acquire user information relating to the user, performs the user recognizing process on the basis of the registration user information that is registered and the user information and transmit a result of the user recognizing process to the information processing apparatus 1110. In this case, the control unit of the information processing apparatus 1110, on the basis of the result of the user recognizing process transmitted from the source apparatus, performs association between the registration user information for the user and an image displayed on the display unit 1111. In addition, the control unit of the information processing apparatus 1110, on the basis of a change in the user information (or the positional information) can determine the display form of the image on the display unit 1111.

Next, an example is illustrated in FIGS. 38 to 41 in which the source apparatus (the information processing apparatus 1120) performs acquisition (extraction) of user information, generation of personal information, association between the personal information and the source apparatus, and the transmission thereof, and the sink apparatus (the information processing apparatus 1110) updates the information relating to each user.

[Example of Operation of Information Processing Apparatus (Source Apparatus)]

Figure 38:
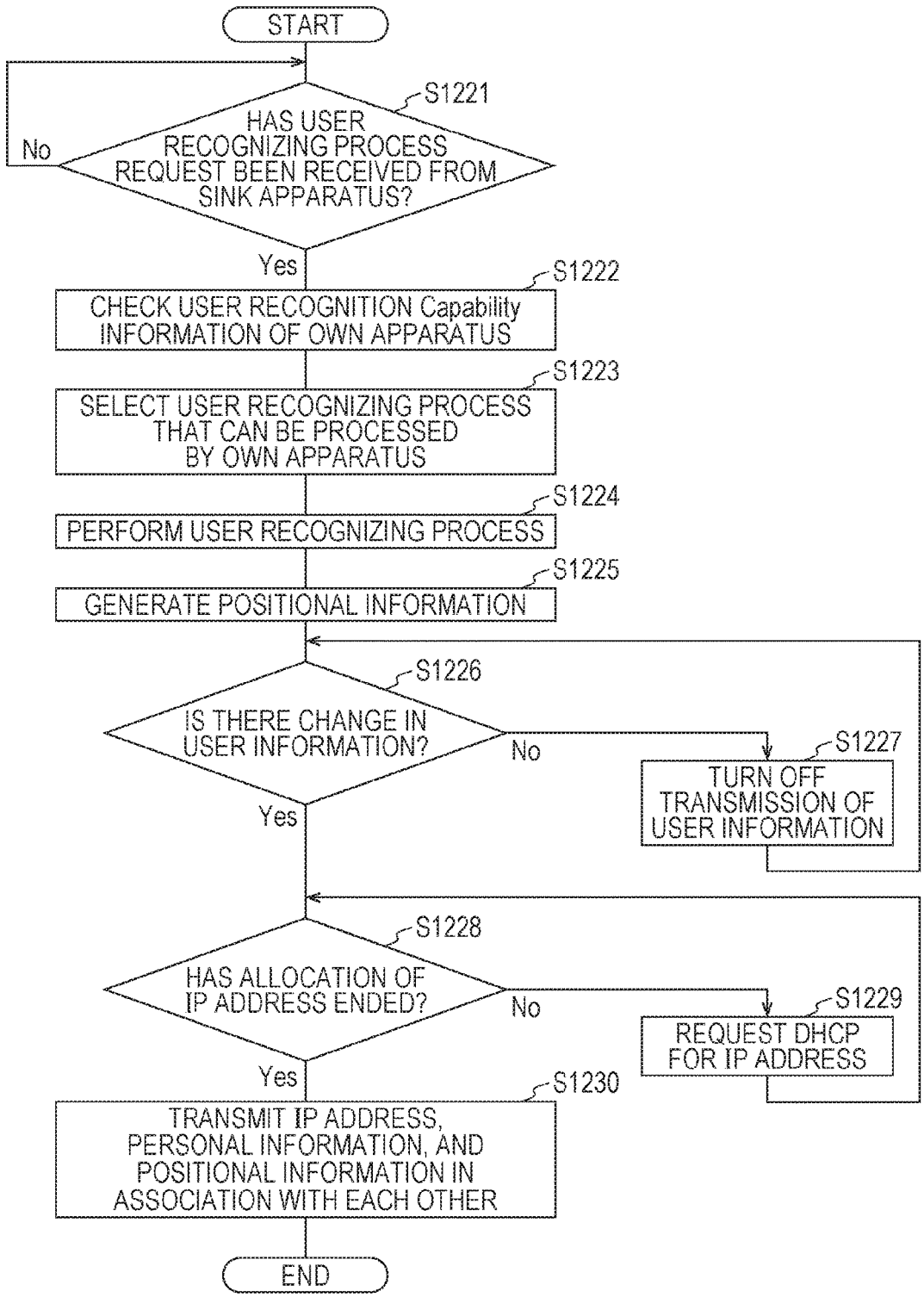
FIG. 38 is a flowchart that illustrates an example of the processing sequence of a user information transmitting process performed by the information processing apparatus 1120 according to the third embodiment of the present technology.

FIG. 38 is a flowchart that illustrates an example of the processing sequence the user information transmitting process performed by the information processing apparatus 1120 according to the third embodiment of the present technology. In addition, since FIG. 38 illustrates a modified example of FIG. 34, a part of description of parts common to those illustrated in FIG. 34 will not be presented.

First, the control unit of the information processing apparatus 1120 determines whether or not a user recognizing process request has been received (Step S1221). In a case where the user recognizing process request has not been received (Step S1221), the monitoring is continuously performed.

On the other hand, in a case where the user recognizing process request has been received (Step S1221), the control unit of the information processing apparatus 1120 checks the user recognition capability information of the own apparatus (Step S1222). Subsequently, the control unit of the information processing apparatus 1120 selects a user recognizing process that can be processed by the own apparatus (Step S1223).

Subsequently, the control unit of the information processing apparatus 1120 performs the user recognizing process (Step S1224). Subsequently, the control unit of the information processing apparatus 1120 generates positional information (Step S1225).

Subsequently, the control unit of the information processing apparatus 1120 determines whether or not there is a change in the user information (or the positional information) (Step S1226). In a case where there is a change in the user information (Step S1226), the control unit of the information processing apparatus 1120 determines whether or not the assignment of an IP address has ended (Step S1228). In a case where the assignment of the IP address has not ended (Step S1228), the control unit of the information processing apparatus 1120 requests a DHCP server for an IP address (Step S1229).

On the other hand, in a case where the assignment of the IP address has ended (Step S1228), the control unit of the information processing apparatus 1120 transmits the IP address, the personal information, and the positional information to the information processing apparatus 1110 (Step S1230). In addition, instead of the IP address, different terminal identification information may be used.

In this way, the control unit of the information processing apparatus 1120 acquires user information and performs a user recognizing process on the basis of the registration user information that is registered and the user information. Then, the control unit of the information processing apparatus 1120, on the basis of a result of the user recognizing process, associates the registration user information for the user with an image displayed on the display unit 1111. In addition, the control unit of the information processing apparatus 1120 transmits a result of the association and positional information based on the user information to the information processing apparatus 1110.

In this way, a user recognizing process that is different for each source can be selected. In addition, for example, by transmitting each information to the sink apparatus only in a case where the user moves, the processing load of the source apparatus can be reduced.

[Example of Operation of Information Processing Apparatus (Sink Apparatus)]

Figure 39:
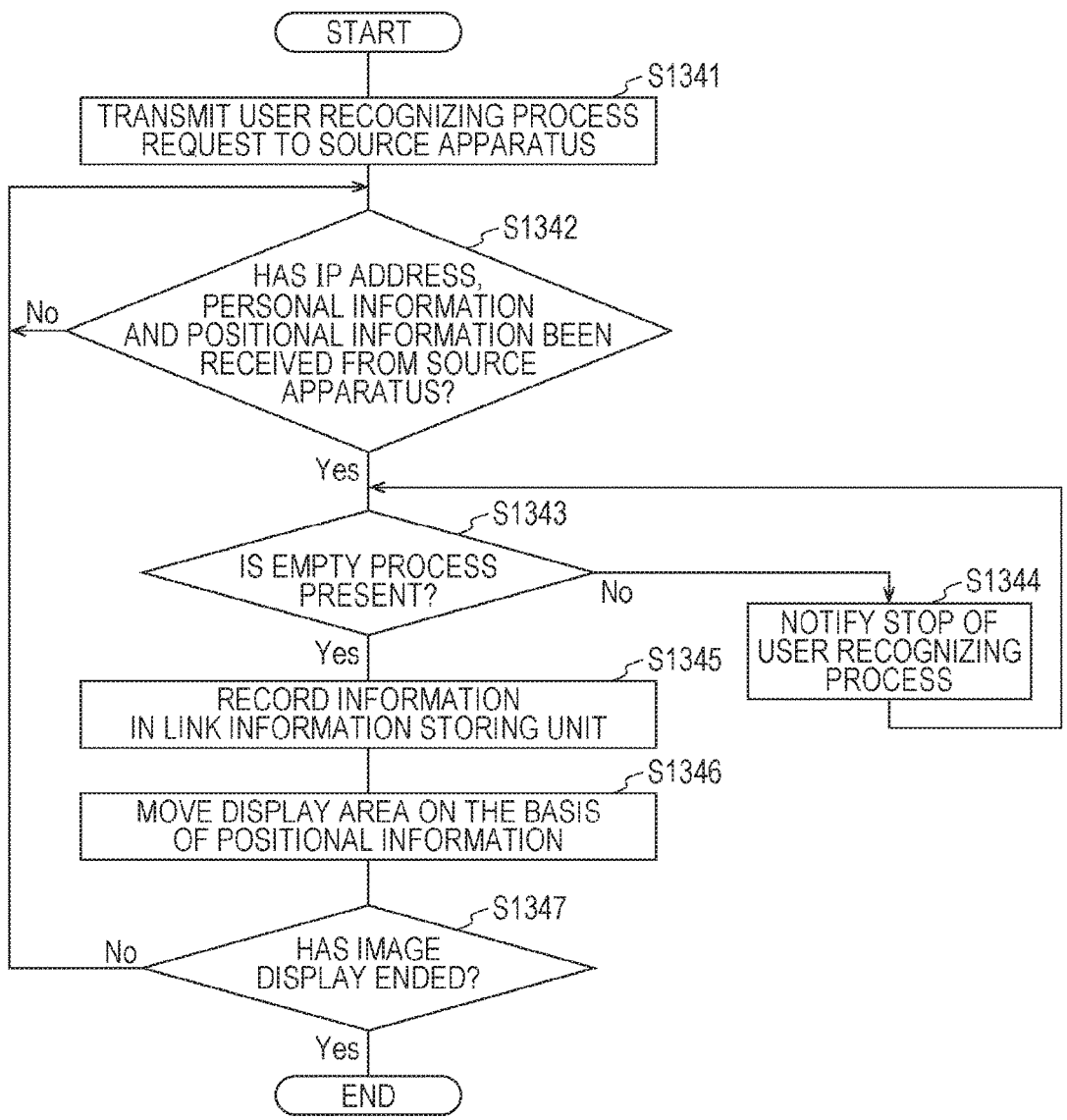
FIG. 39 is a flowchart that illustrates an example of the processing sequence of the display control process performed by the information processing apparatus 1110 according to the third embodiment of the present technology.

FIG. 39 is a flowchart that illustrates an example of the processing sequence of the display control process performed by the information processing apparatus 1110 according to the third embodiment of the present technology. In addition, since FIG. 39 illustrates a modified example of FIG. 35, a part of description of parts common to those illustrated in FIG. 35 will not be presented.

The control unit of the information processing apparatus 1110 transmits a user recognizing process request to the information processing apparatus 1120 (Step S1341).

Subsequently, the control unit of the information processing apparatus 1110 determines whether or not the IP address, the personal information, and the positional information have been received from the information processing apparatus 1120 (Step S1342). Then, in a case where such information has not been received (Step S1342), the monitoring is continuously performed.

On the other hand, in a case where the IP address, the personal information, and the positional information have been received (Step S1343), the control unit of the information processing apparatus 1110 determines whether or not there is an empty process in the information processing apparatus 1110 (Step S1343). In a case where there is no empty process (Step S1343), the control unit of the information processing apparatus 1110 stops the user recognizing process and stands by and notifies an indication of temporary stop of the user recognizing process to the user (Step S1344).

On the other hand, in a case where there is an empty process (Step S1343), the control unit of the information processing apparatus 1110 records each information as management information (Step S1345). Subsequently, the control unit of the information processing apparatus 1110, on the basis of the received positional information, moves a display area corresponding to a source apparatus associated with the received personal information (Step S1346).

In this way, the control unit of the information processing apparatus 1110 records a result (the IP address and the personal information) of the association transmitted from the source apparatus and determines the display form of an image on the display unit 1111 on the basis of the positional information transmitted from the source apparatus.

[Example of Communication of Case where Source Apparatus and Display Position of Sink Apparatus are Linked Together]

Figure 40:
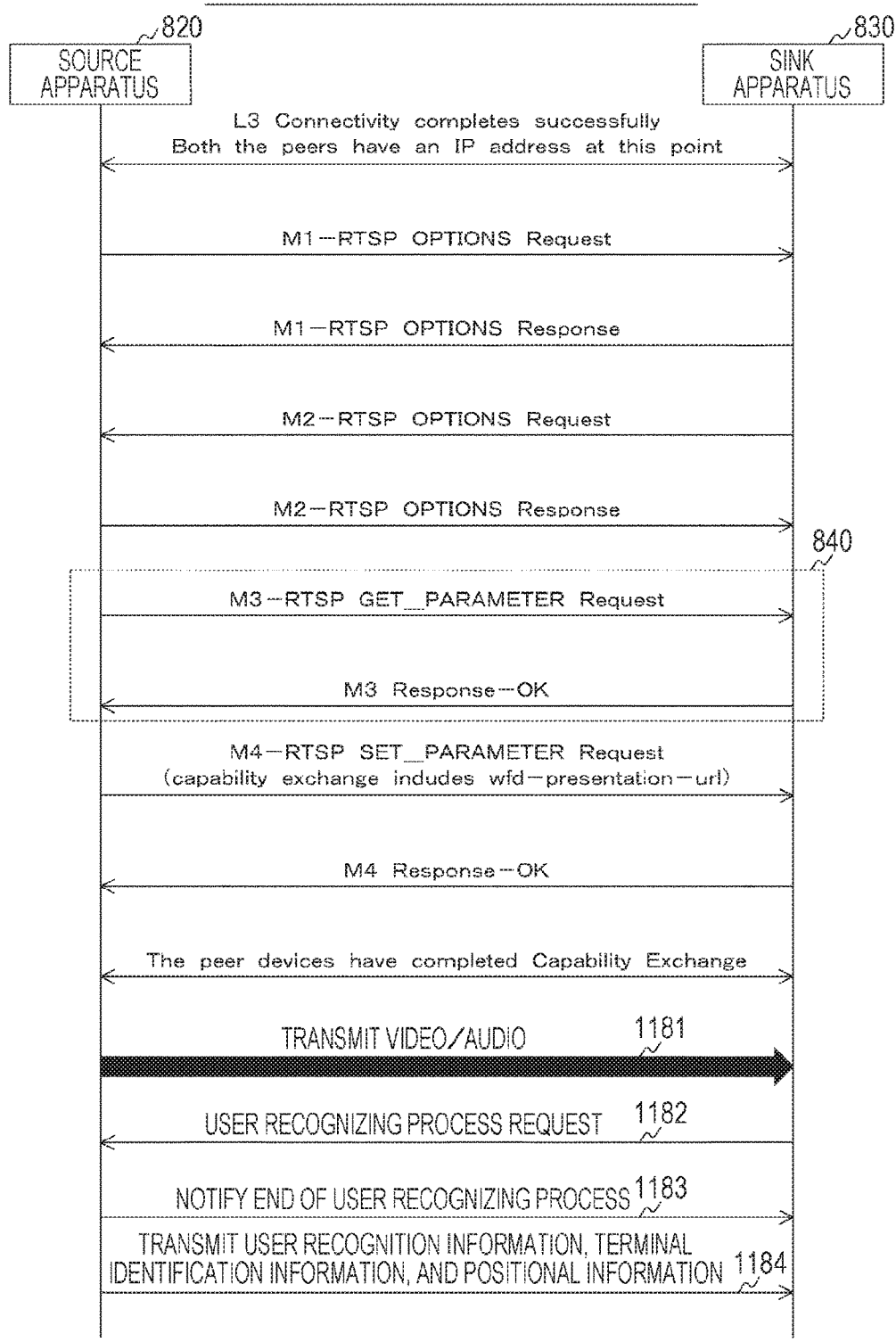
FIG. 40 is a sequence diagram that illustrates an example of a communication process between a source apparatus and a sink apparatus according to the third embodiment of the present technology.

FIGS. 40 and 41 are sequence diagrams that illustrate an example of a communication process between a source apparatus and a sink apparatus according to the third embodiment of the present technology. FIGS. 40 and 41 illustrate a modified example of FIG. 28, and a part thereof is common to that illustrated in FIG. 28. For this reason, here, points different from those illustrated in FIG. 28 will be focused in description.

For example, by completing the capability exchange, the transmission of video data and audio data from the source apparatus 820 to the sink apparatus 830 is started (1181). After this transmission is started, a process for linking a user possessing the source apparatus 820 and a display area (display window) displayed on the display unit of the sink apparatus 830 with each other is started (1182 to 1184).

First, a user recognizing process request is transmitted from the sink apparatus 830 to the source apparatus 820 (1182). Accordingly, the source apparatus 820 performs each process.

Subsequently, a user recognizing process end notification is transmitted from the source apparatus 820 to the sink apparatus 830 (1183). Subsequently, each information (the user recognition information (personal information), the terminal identification information (IP address), and the positional information) is transmitted from the source apparatus 820 to the sink apparatus 830 (1184).

In addition, in FIG. 40, while an example is illustrated in which, after the transmission of video/audio using the protocol of the Wi-Fi certified miracast, the user and the display screen are linked together, the link operation is not limited thereto. For example, such processes may be interchanged.

For example, after the end of L3 connectivity, the source apparatus 820 and the sink apparatus 830 may be configured to perform the link process (1182 to 1184) described above. This example (1185 to 1187) is illustrated in FIG. 41.

[Example of User Recognizing Process]

Here, it preferable to appropriately select a user recognizing process performed by the sink apparatus and the sink apparatus considering whether or not the source apparatus is a mobile apparatus, the number of source apparatuses connected to the sink apparatus, and the like. Thus, an example is illustrated in FIGS. 42 to 45 in which a user recognizing process is appropriately selected.

First, an example will be illustrated in which a user recognizing process is selected on the basis of whether or not the source apparatus is a mobile apparatus and the remaining capacity of the battery of the source apparatus.

[Example of Operation of Information Processing Apparatus (Source Apparatus)]

Figure 42:
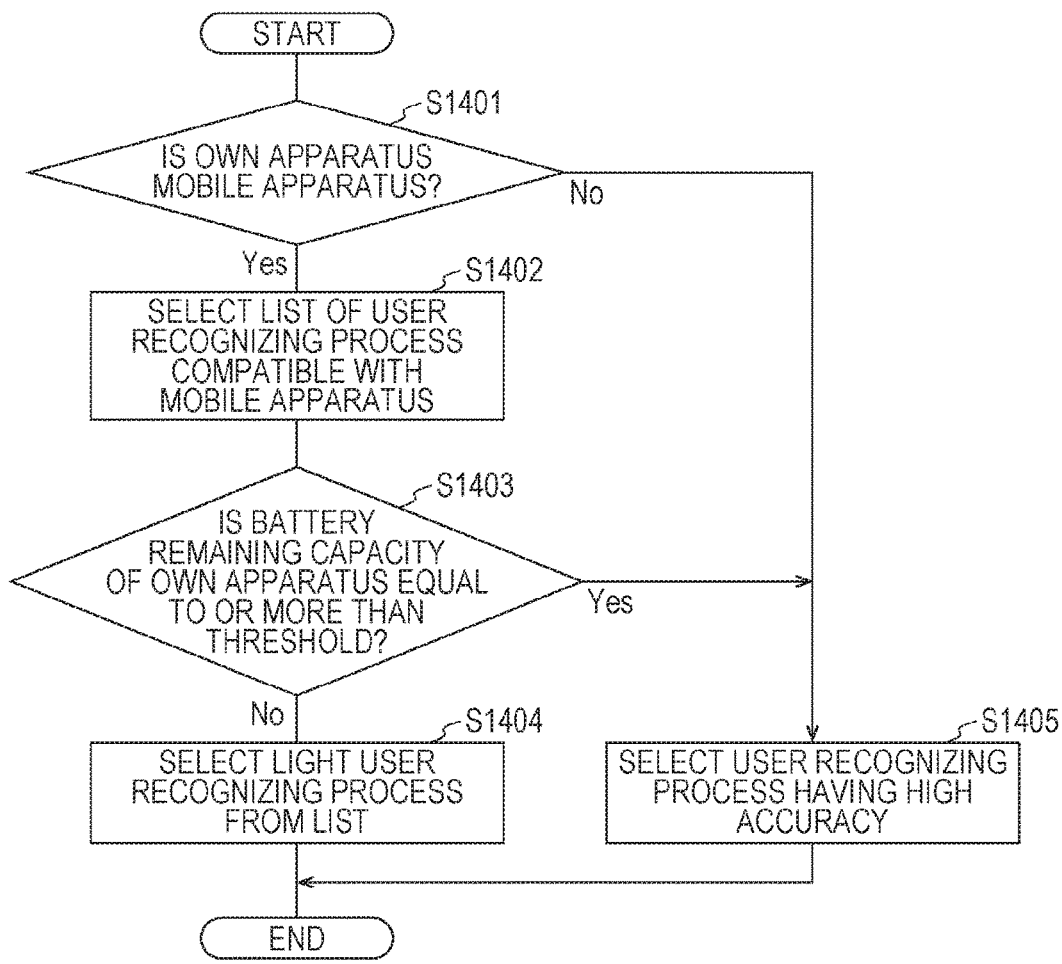
FIG. 42 is a flowchart that illustrates an example of the processing sequence of a user recognizing process selecting process performed by the information processing apparatus 1120 according to the third embodiment of the present technology.

FIG. 42 is a flowchart that illustrates an example of the processing sequence of a user recognizing process selecting process performed by the information processing apparatus 1120 according to the third embodiment of the present technology.

First, the control unit of the information processing apparatus 1120 determines whether or not the own apparatus is a mobile apparatus (Step S1401). In a case where the own apparatus is a mobile apparatus (Step S1401), the control unit of the information processing apparatus 1120 selects a list of user recognizing processes corresponding to a mobile apparatus (Step S1402). Here, the mobile apparatus is assumed to have a low processing capability. Thus, for example, a predetermined number of processes having relatively low processing loads can be listed as the user recognizing processes corresponding to a mobile apparatus.

Subsequently, the control unit of the information processing apparatus 1120 determines whether or not the remaining capacity of the battery of the own apparatus is equal to or more than a threshold (Step S1403). In a case where the remaining capacity of the battery of the own apparatus is less than the threshold (Step S1403), the control unit of the information processing apparatus 1120 selects a relatively light user recognizing process from the list of the user recognizing processes corresponding to a mobile apparatus (Step S1404). In such a case, the lightness of the process may be selected according to the remaining capacity of the battery of the own apparatus.

On the other hand, in a case where the own apparatus is not a mobile apparatus (Step S1401) or in a case where the remaining capacity of the battery of the own apparatus is equal to or more than the threshold (Step S1403), the control unit of the information processing apparatus 1120 selects a user recognizing process having high accuracy (Step S1405).

[Example of Operation of Information Processing Apparatus (Sink Apparatus)]

Figure 43:
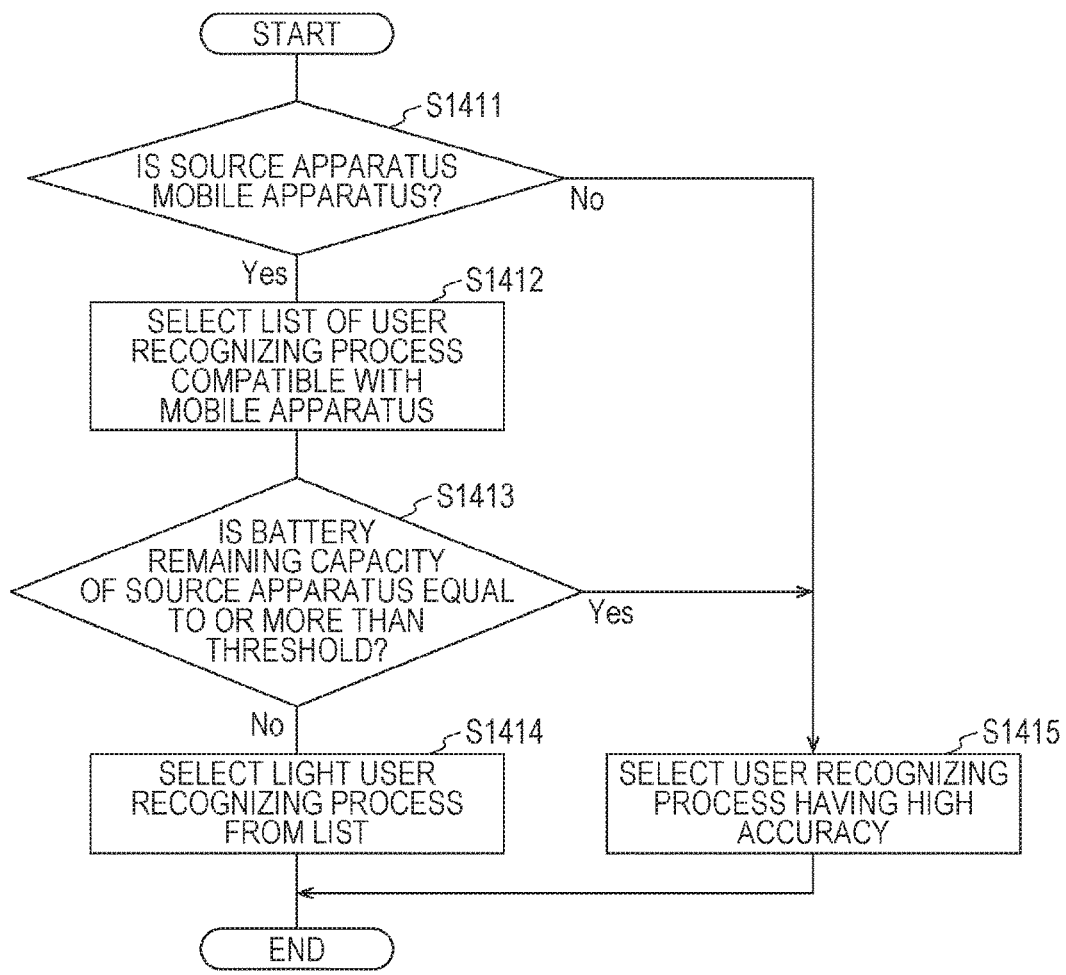
FIG. 43 is a flowchart that illustrates an example of the processing sequence of a user recognizing process selecting process performed by the information processing apparatus 1110 according to the third embodiment of the present technology.

FIG. 43 is a flowchart that illustrates an example of the processing sequence of the user recognizing process selecting process performed by the information processing apparatus 1110 according to the third embodiment of the present technology.

First, the control unit of the information processing apparatus 1110 determines whether or not the source apparatus that is a connection destination is a mobile apparatus (Step S1411). In a case where the source apparatus that is the connection destination is a mobile apparatus (Step S1411), the control unit of the information processing apparatus 1110 selects a list of user recognizing processes corresponding to a mobile apparatus (Step S1412).

Subsequently, the control unit of the information processing apparatus 1110 determines whether or not the remaining capacity of the battery of the source apparatus that is the connection destination is equal to or more than a threshold (Step S1413). For example, by acquiring information relating to the remaining capacity of the battery from the source apparatus regularly or irregularly, the determination can be performed.

In a case where the remaining capacity of the battery of the source apparatus that is the connection destination is less than the threshold (Step S1413), the control unit of the information processing apparatus 1110 selects a relatively light user recognizing process from the list of the user recognizing processes corresponding to a mobile apparatus (Step S1414).

On the other hand, in a case where the source apparatus is not a mobile apparatus (Step S1411) or in a case where the remaining capacity of the battery of the source apparatus is equal to or more than the threshold (Step S1413), the control unit of the information processing apparatus 1120 selects a user recognizing process having high accuracy (Step S1415).

Next, an example will be illustrated in which a user recognizing process is selected on the basis of the number of source apparatuses connected to the sink apparatus.

[Example of Operation of Information Processing Apparatus (Sink Apparatus)]

Figure 44:
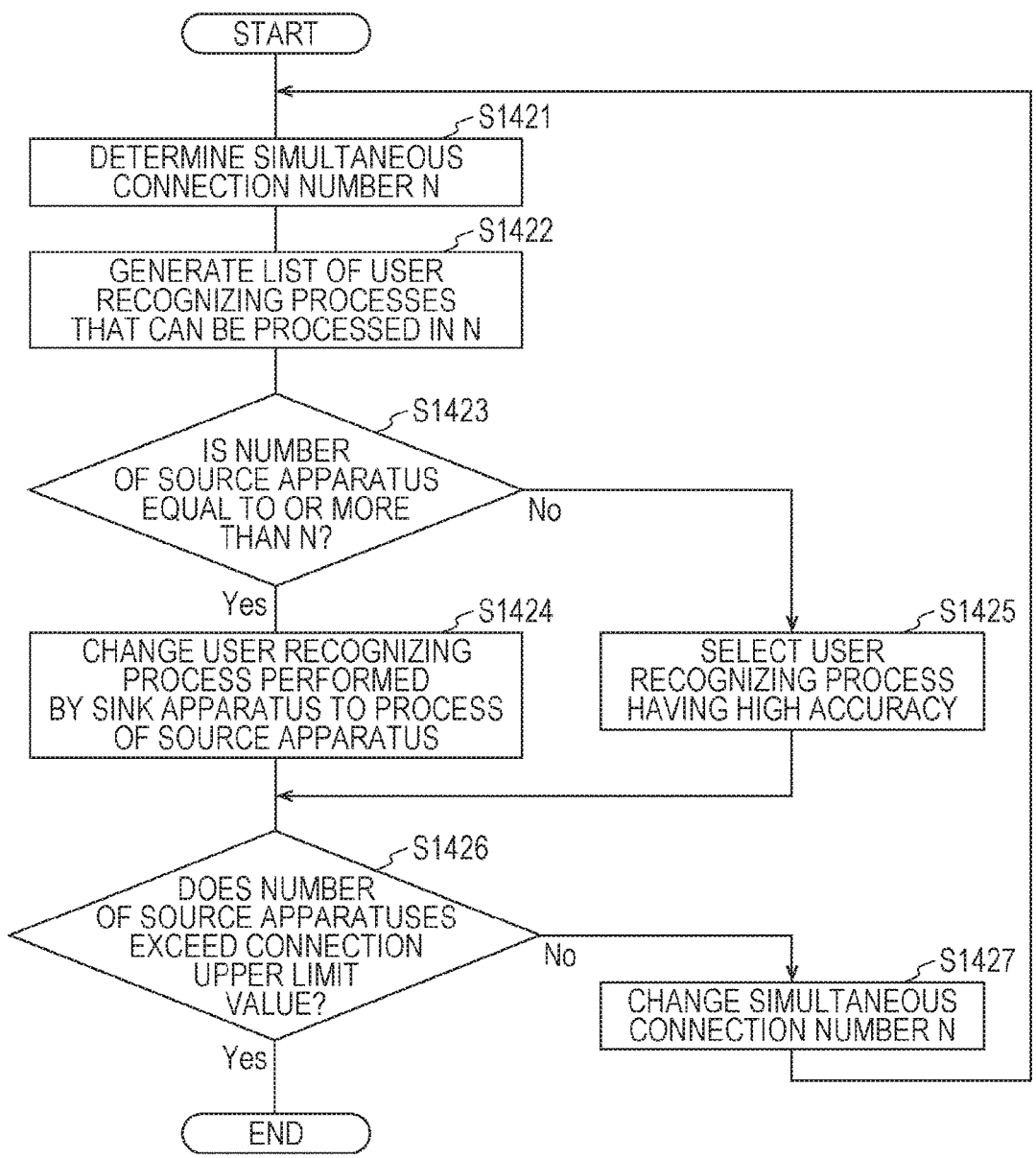
FIG. 44 is a flowchart that illustrates an example of the processing sequence of the user recognizing process selecting process performed by the information processing apparatus 1110 according to the third embodiment of the present technology.

FIG. 44 is a flowchart that illustrates an example of the processing sequence of the user recognizing process selecting process performed by the information processing apparatus 1110 according to the third embodiment of the present technology.

First, the control unit of the information processing apparatus 1110 determines a simultaneous connection number N (parameter N) (Step S1421). Subsequently, the control unit of the information processing apparatus 1110 generates a list of user recognizing processes capable of performing the process in a case where number of source apparatuses connected to the information processing apparatus 1110 is N (Step S1422).

Subsequently, the control unit of the information processing apparatus 1110 determines whether or not the number of source apparatuses connected to the information processing apparatus 1110 is N or more (Step S1423).

In a case where the number of source apparatuses connected to the information processing apparatus 1110 is N or more (Step S1423), the control unit of the information processing apparatus 1110 changes the user recognizing process performed by the information processing apparatus 1110 to a process to be performed by the source apparatus (Step S1424).

On the other hand, in a case where the number of source apparatuses connected to the information processing apparatus 1110 is less than N (Step S1423), the control unit of the information processing apparatus 1110 selects a user recognizing process having high accuracy (Step S1425).

Subsequently, the control unit of the information processing apparatus 1110 determines whether or not the number of source apparatuses connected to the information processing apparatus 1110 exceeds a connection upper limit value (Step S1426). In a case where the number of source apparatuses connected to the information processing apparatus 1110 exceeds the connection upper limit value (Step S1426), the operation of the user recognizing process selecting process ends.

On the other hand, in a case where the number of source apparatuses connected to the information processing apparatus 1110 does not exceed the connection upper limit value (Step S1426), the control unit of the information processing apparatus 1110 changes the simultaneous connection number N (parameter N) (Step S1427).

Figure 45:
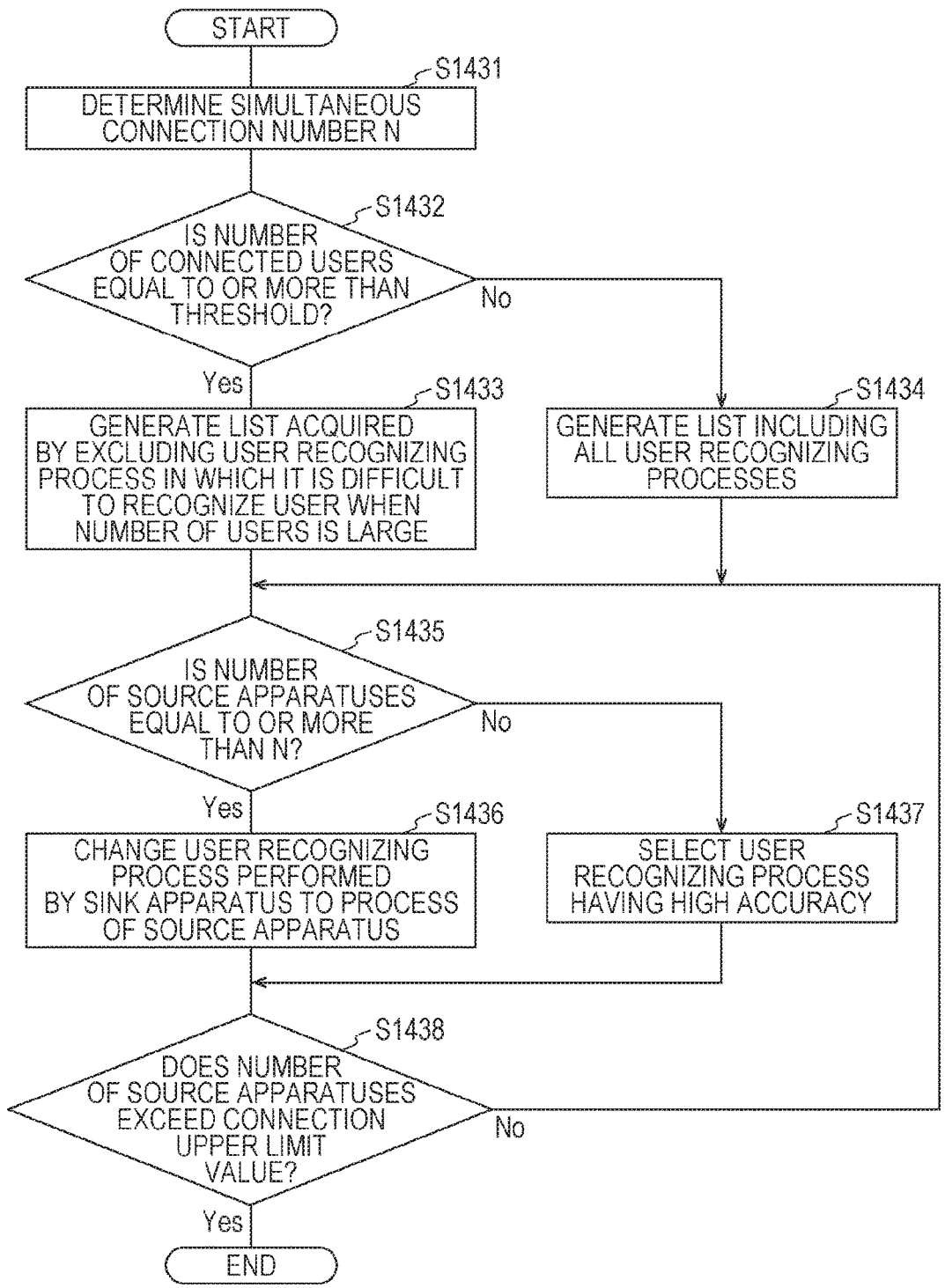
FIG. 45 is a flowchart that illustrates an example of the processing sequence of the user recognizing process selecting process performed by the information processing apparatus 1110 according to the third embodiment of the present technology.

FIG. 45 is a flowchart that illustrates an example of the processing sequence of the user recognizing process selecting process performed by the information processing apparatus 1110 according to the third embodiment of the present technology. In addition, FIG. 45 illustrates a modified example of FIG. 44. For this reason, a part of description for parts common to those illustrated in FIG. 44 will not be presented.

First, the control unit of the information processing apparatus 1110 determines a simultaneous connection number N (parameter N) (Step S1431). Subsequently, the control unit of the information processing apparatus 1110 determines whether or not the number of users using source apparatuses connected to the information processing apparatus 1110 is equal to or more than a threshold (Step S1432).

In a case where the number of users is equal to or more than the threshold (Step S1432), the control unit of the information processing apparatus 1110 generates a list acquired by excluding user recognizing processes that cannot easily recognize users in a case where the number of users is large (Step S1433).

On the other hand, in a case where the number of users is less than the threshold (Step S1432), the control unit of the information processing apparatus 1110 generates a list including all the user recognizing processes (Step S1434).

Subsequently, the control unit of the information processing apparatus 1110 determines whether or not the number of source apparatuses connected to the information processing apparatus 1110 is N or more (Step S1435).

In a case where the number of source apparatuses connected to the information processing apparatus 1110 is N or more (Step S1435), the control unit of the information processing apparatus 1110 changes the user recognizing process performed by the information processing apparatus 1110 to a process to be performed by a source apparatus (Step S1436).

On the other hand, in a case where the number of source apparatuses connected to the sink apparatus is less than N (Step S1435), the control unit of the information processing apparatus 1110 selects a user recognizing process having high accuracy (Step S1437).

Subsequently, the control unit of the information processing apparatus 1110 determines whether or not the number of source apparatuses connected to the information processing apparatus 1110 exceeds a connection upper limit value (Step S1438). In a case where the number of source apparatuses connected to the information processing apparatus 1110 exceeds the connection upper limit value (Step S1438), the operation of the user recognizing process selecting process ends.

On the other hand, in a case where the number of source apparatuses connected to the information processing apparatus 1110 does not exceed the connection upper limit value (Step S1438), the process is returned to Step S1435.

In addition, it may be configured such that, before a user recognizing process is performed, a screen for checking whether a connection to a source apparatus or a sink apparatus that is a target for the user recognizing process may be made is displayed, and the user recognizing process is performed on the condition that user's checking operation is performed. For example, in a case where the screen is displayed in the sink apparatus, near the display area of a corresponding video, identification information (a user ID or a user name) of the user may be displayed. In this way, useless processes can be reduced in the sink apparatus. In addition, in a case where the process is performed on the source side, the load of the sink apparatus is further decreased, and the load according to connections of a plurality of source apparatuses can be distributed.

[Example in which Display Area and Direction of Image are Determined]

As above, an example has been illustrated in which the display area of an image is determined according to user's position. Here, an example will be illustrated in which the display area and the direction of an image are determined according to user's position.

Figure 46:
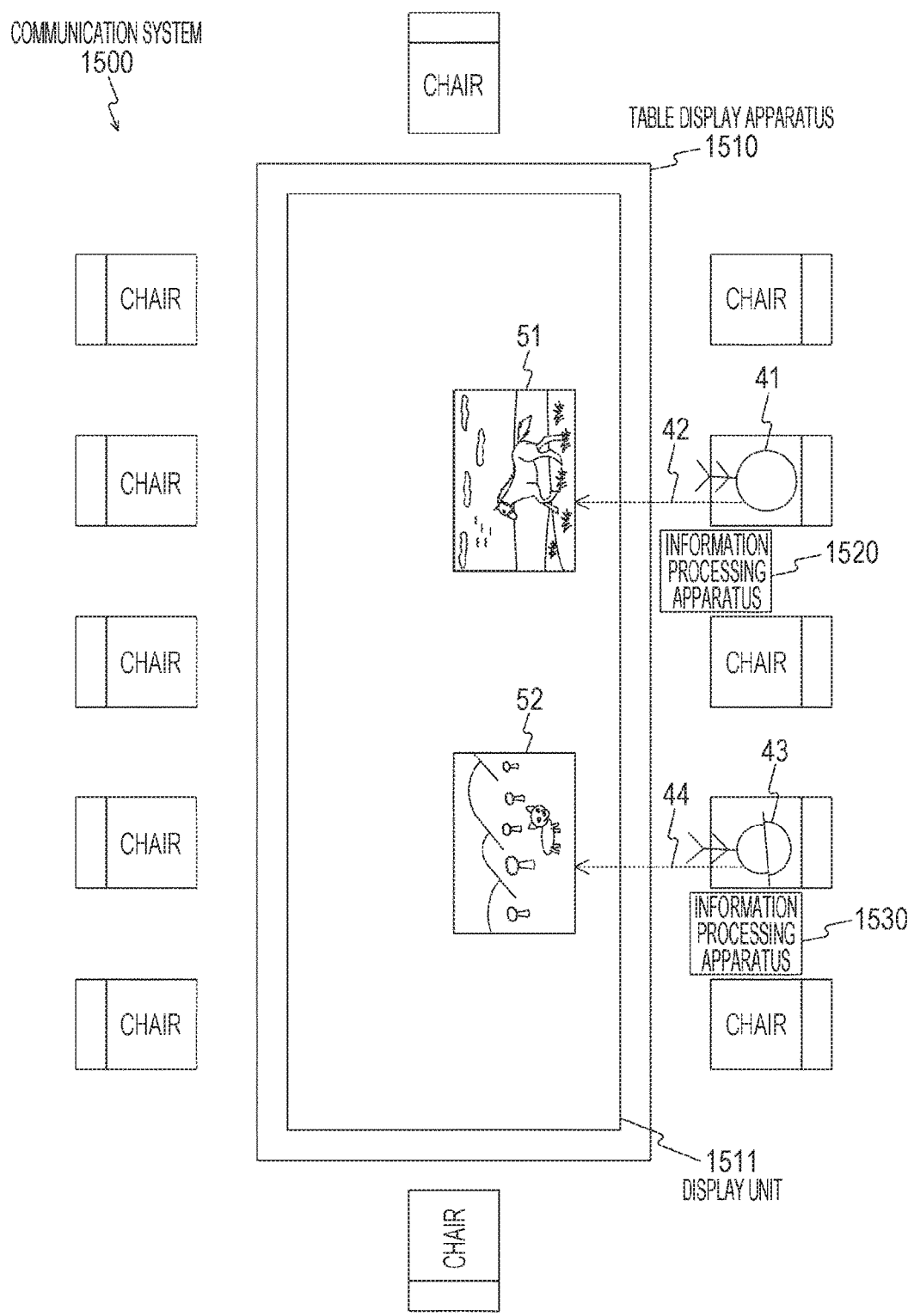
FIG. 46 is a diagram that illustrates an example of the system configuration of a communication system 1500 according to the third embodiment of the present technology.
Figure 47:
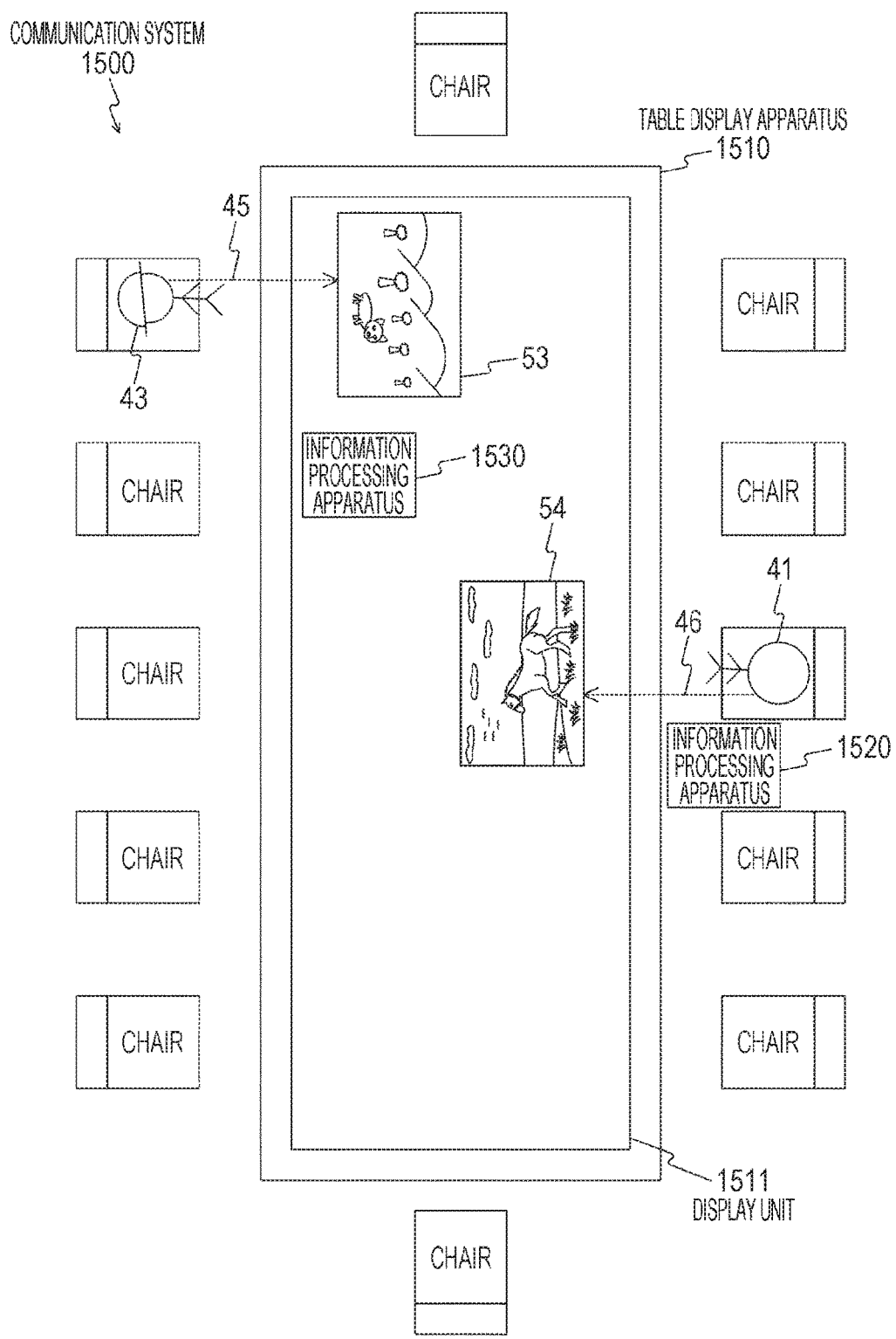
FIG. 47 is a diagram that illustrates an example of the system configuration of the communication system 1500 according to the third embodiment of the present technology.
Figure 48:
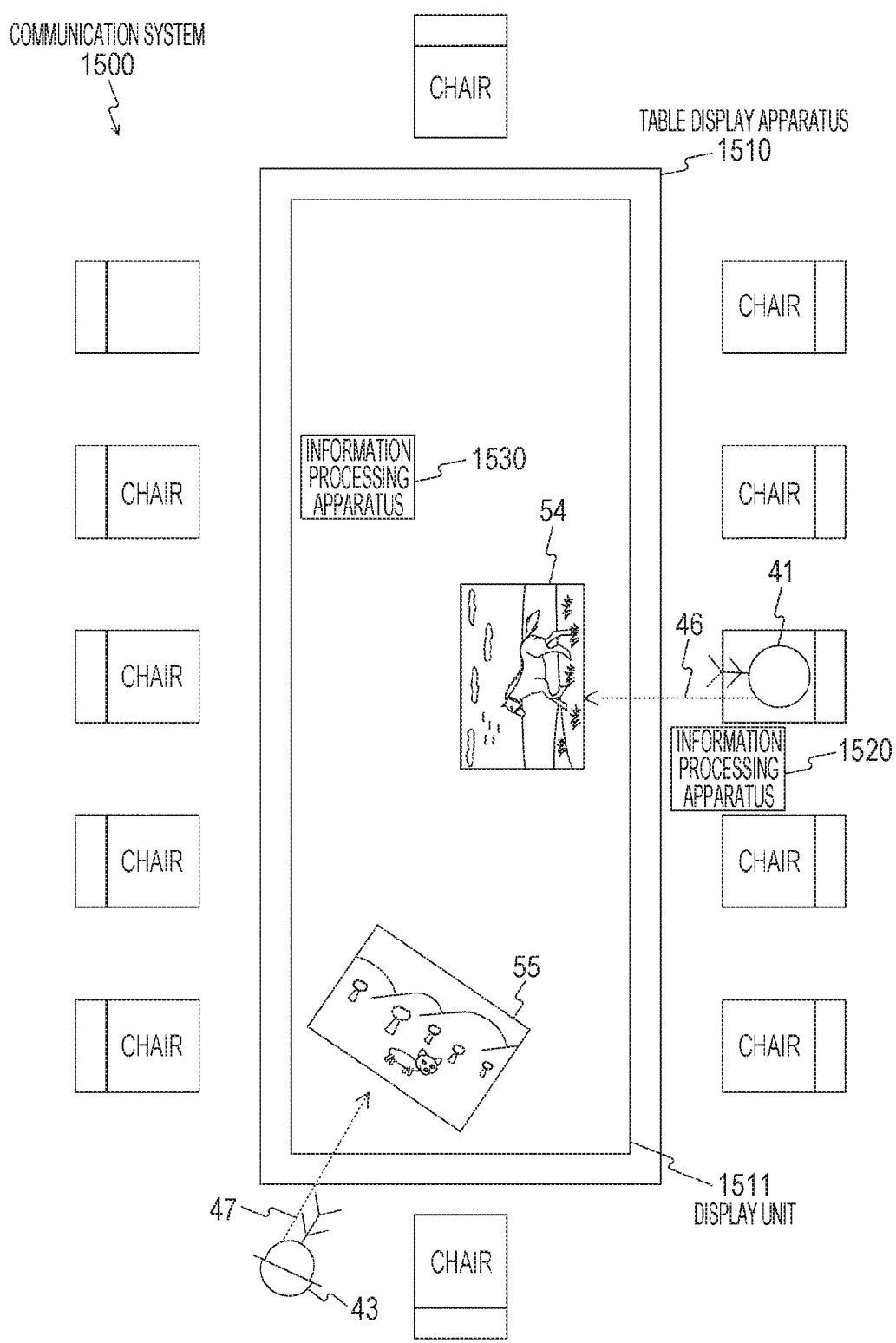
FIG. 48 is a diagram that illustrates an example of the system configuration of the communication system 1500 according to the third embodiment of the present technology.

FIGS. 46 to 48 are diagrams that illustrate an example of the system configuration of a communication system 1500 according to the third embodiment of the present technology. In FIGS. 46 to 48, top views of a space in which the communication system 1500 is installed are illustrated in a simplified manner.

The communication system 1500 includes: a table display apparatus 1510; an information processing apparatus 1520; and an information processing apparatus 1530. The table display apparatus 1510 is an information processing apparatus of a rectangular table type, and the whole or a part of the surface of the rectangular table is set as a display unit 1511.

FIG. 46 illustrates a case where a user 41 possessing the information processing apparatus 1520 sits on a chair and views a video 51 that is based on video data transmitted from the information processing apparatus 1520 (the sight line of a user 31 is denoted using a dotted line 42). In addition, FIG. 46 illustrates a case where a user 43 possessing the information processing apparatus 1530 views a video 52 that is based on video data transmitted from the information processing apparatus 1530 (the sight line of the user 43 is denoted using a dotted line 44).

In addition, FIG. 47 illustrates a display example of videos 53 and 54 after the users 41 and 43 move. Furthermore, in FIG. 47, the sight line of the user 41 is denoted using a dotted line 46, and the sight light of the user 43 is denoted using a dotted line 45.

In addition, FIG. 48 illustrates a display example of a video 55 after the user 43 moves. Furthermore, in FIG. 48, the sight line of the user 43 is denoted using a dotted line 47.

In addition, the table display apparatus 1510 corresponds to the information processing apparatus 1110 (or a display device connected thereto) illustrated in FIG. 22 and the like. Furthermore, the information processing apparatus 1520 and the information processing apparatus 1530 correspond to the information processing apparatuses 1120 and 1130 illustrated in FIG. 22 and the like.

For example, in a case where a user moves in a long-side direction of the rectangle of the display unit 1511, an image associated with the user can be moved in the long-side direction of the rectangle of the display unit 1511.

In addition, for example, in a case where a user moves in a short-side direction of the rectangle of the display unit 1511, an image associated with the user can be moved in the short-side direction of the rectangle of the display unit 1511. A moving distance and a moving direction in such a case, for example, can be acquired on the basis of the user information and the positional information.

Here, for example, in a case where a user moves in the short-side direction of the rectangle of the display unit 1511, a case may be also considered in which the user moves to the opposite side of the table (the table display apparatus 1510). Thus, in a case where a user moves in the short-side direction of the rectangle of the display unit 1511 by a threshold or more, the direction of an image associated with the user may be reversed (the vertical direction is reversed) in the display unit 1511.

For example, a case will be considered in which the users 41 and 43 move from positions illustrated in FIG. 46 to positions illustrated in FIG. 47. In such a case, as described above, the table display apparatus 1510, in accordance with the movements of the users 41 and 43, determines display areas of the videos 51 and 52 on the display unit 1511 and displays the videos 53 and 54. Here, while the user 41 moves on the long side of the rectangle of the display unit 1511, the user 43 moves toward a long side opposite to the long side of the rectangle of the display unit 1511. In such a case, as illustrated in FIG. 47, the direction of the video 53 viewed by the user 43 is determined, and the image is displayed.

For example, a side of the table near which the user is present is acquired as user information, and on the basis of this user information, the display area and the direction of an image are determined, and the image is displayed. For example, by installing a plurality of sensors (for example, a temperature sensor and a human detection sensor) near the table and chairs, user information may be acquired using such sensors and be used.

In addition, for example, in the communication system 1500, an imaging sensor or an imaging apparatus having the whole or a part of the table display apparatus 1510 and 12 chairs as imaging range may be installed. Here, the imaging sensor is a sensor that can recognize a positional relation including the front, rear, left, and right sides of the user. In addition, the imaging apparatus, for example, is a stationary digital still camera or a digital video camera.

In this way, in a case where the imaging sensor or the imaging apparatus is installed, the table display apparatus 1510 (or an information processing apparatus connected thereto) acquires video data generated by the apparatus (the imaging sensor or the imaging apparatus) and analyzes the video data. On the basis of a result of the analysis, the table display apparatus 1510 (or an information processing apparatus connected thereto) can detect a user included in the video data. In addition, the table display apparatus 1510 (or an information processing apparatus connected thereto), on the basis of the position of the user in the video data, can acquire a positional relation between the table display apparatus 1510 and the user. In this way, by acquiring the positional relation between the table display apparatus 1510 and the user, the table display apparatus 1510 can determine the display area and the direction of the image in accordance with a place at which the user is present. For example, in the display unit 1511 of the table display apparatus 1510, a display area positioned closest to the place at which the user is present is set as a display area of an image corresponding to a source apparatus associated with the user, and the direction of the place at which the user is present can be set to the lower side of the image.

For example, a case will be considered in which the user 43 moves from the position illustrated in FIG. 47 to a position illustrated in FIG. 48. In this case, as described above, the table display apparatus 1510, in accordance with the movement of the user 43, determines the display area of the video 53 in the display unit 1511 and displays the video 55. In addition, since the user 43 moves to a position corresponding to one of four vertexes of the rectangle of the display unit 1511, the sight line (dotted line 47) of the user 43 inclines with respect to the long-side direction of the rectangle of the display unit 1511. In such a case, as illustrated in FIG. 48, in accordance with the direction of the sight line (dotted line 47) of the user 43, the direction of the video 55 is determined, and the image is displayed.

In addition, when the user 43 moves from the position illustrated in FIG. 47 to the position illustrated in FIG. 48, the user moves without possessing the information processing apparatus 1530. Also in this case, regardless of the position of the information processing apparatus 1530, the display area and the direction of the video 55 can be determined using the position of the user 43 as the reference.

In addition, the table display apparatus 1510 (or an information processing apparatus connected thereto) may acquire positional information relating to the user from an external apparatus and, on the basis of this positional information, acquires a positional relation between the table display apparatus 1510 and the user. Also in this case, similarly, the table display apparatus 1510 can determine the display area and the direction of an image in accordance with a place at which the user is present. Here, the external apparatus, for example, is an apparatus (for example, a clock capable of acquiring the positional information) worn by the user.

In this way, the control unit of the table display apparatus 1510, on the basis of the movement of the user, can determine at least one of the movements of the display area of the image corresponding to the source apparatus associated with the user in the display unit 1511 and the direction of the image.

In addition, in FIGS. 46 to 48, while an example of a case where two or more users are present, and an apparatus (the table display apparatus 1510) other than the apparatus possessed by each user is shared is illustrated, the present technology is not limited thereto. For example, the present technology can respond also to a case where the display of one user is shared by a plurality of users. In such a case, it is necessary to constantly identify a user linking the image from among the plurality of users. In addition, a user interface that changes a user linking to the image in the middle of the process may be present.

In addition, in the third embodiment of the present technology, while an example in which the link information is mainly managed by the sink apparatus has been illustrated, the link information may be managed by the source apparatus.

For example, in an environment in which a plurality of source apparatuses are connected, the sink apparatus can acquire the capability information of all the source apparatus, and accordingly, it is preferable to manage the link information on the sink apparatus side. However, in an environment in which a plurality of sink apparatuses are connected, the source apparatus can acquire the capability information of all the sink apparatuses, the source apparatus can manage the link information on the basis of the control of the sink apparatus.

In addition, for example, in accordance with the topology, switching between the management methods of the source apparatus and the sink apparatus may be performed. For example, by transmitting the acquisition capability (extraction capability) of the user information and the collation capability as flags from the source apparatus to each sink apparatus, each sink apparatus can set the management method of each source apparatus. In this way, in accordance with the capability of each source apparatus, the user recognizing process and the management of the link information can be appropriately performed.

In addition, in the third embodiment of the present technology, while an example is illustrated in which the user information mainly acquired by the source apparatus is used, as illustrated in FIGS. 30 and 32, the user information acquired by the sink apparatus may be used.

For example, the control unit of the sink apparatus, on the basis of the positional information that is based on the user information acquired by the own apparatus, can determined the display form of an image on the display unit.

In addition, for example, the control unit of the source apparatus can perform the user recognizing process on the basis of the registration user information that is registered and the user information transmitted from the sink apparatus. Then, the control unit of the source apparatus, on the basis of a result of the user recognizing process, can perform association between the registration user information for the user and the image displayed on the display unit of the sink apparatus side and transmit a result of the association to the sink apparatus.

In addition, for example, the control unit of the sink apparatus can perform the user recognizing process on the basis of the registration user information that is registered and the user information acquired by the own apparatus and transmit a result of this user recognizing process to the source apparatus. In such a case, the control unit of the source apparatus, on the basis of the result of the user recognizing process, performs association between the registration user information for the user and the image displayed on the display unit of the sink apparatus side and transmits a result of the association to the sink apparatus.

In addition, for example, the control unit of the sink apparatus performs the user recognizing process on the basis of the registration user information that is registered and the user information acquired by the own apparatus. Then, the control unit of the sink apparatus, on the basis of a result of the user recognizing process, performs association between the registration user information for the user and the image displayed on the display unit of the sink apparatus side. In addition, for example, the control unit of the sink apparatus can transmit checking information used for checking whether or not the display form of the image on the display unit is determined. In such a case, the control unit of the source apparatus, in a case where an approval for the checking information is made by a user operation, transmit approval information to the sink apparatus. Then, the control unit of the sink apparatus, in a case where the approval information is received, on the basis of the positional information that is based on the user information, determines the display form of the image on the display unit. In this way, only in a case where the user makes a movement request of the screen, an image viewed by the user may be moved to follow the user's movement.

In this way, in the third embodiment of the present technology, in a case where a plurality of users possessing source apparatus are present, and an image transmitted from each source apparatus is displayed on the display unit of the sink apparatus side, also in a case where the user moves, an image that is easily viewable for the user can be provided. For example, also in a case where the wall is formed as a display or a living table is formed as a display, an image that is easily viewable for the user can be provided. For example, also in a situation in which the physical position of the source apparatus and the display area of the sink apparatus are different from each other, an image that is easily viewable for each user can be provided.

In addition, on the basis of the control of the source apparatus, the processes can be shared between the source apparatus and the sink apparatus. For example, the source apparatus and the sink apparatus can easily acquire an apparatus capable of performing the user recognizing process. Then, on the basis of the control of the sink apparatus, an apparatus to perform the user recognizing process can be appropriately selected.

For example, in a case where the sink apparatus is caused to perform the user recognizing process, useless processes in the source apparatus are reduced, the process can be organized for the sink apparatus, and accordingly, the load of the source apparatus can be decreased.

In addition, for example, in a case where the source apparatus is caused to perform the user recognizing process, on the sink apparatus side, only the user may be perceived, and the load of the process can be decreased. In addition, for example, since a different algorithm can be used for each source apparatus, a same user identifying process does not need to be selected in all the source apparatuses.

In addition, for example, for a user that cannot be recognized on the sink apparatus side, an authentication request can be made for the source apparatus of the user. In this way, the display forms of images can be determined for all the users. Furthermore, it can be determined whether or not all the users end the authentication.

In addition, for example, in a case where the source apparatus is caused to perform the user recognizing process, personal information such as collation information can be maintained and managed on the source apparatus side. In addition, the load of the sink apparatus can be distributed. Furthermore, after the user information after the collation is transmitted to the user, and the user checks the user information, a link thereof can be made.

In addition, in the third embodiment of the present technology, an example of a case where the user using the source apparatus moves has been illustrated. However, a case where the sink apparatus (or a display device connected thereto) moves may be also considered. For example, in a case where the sink apparatus (for example, a large-size display) is installed to a mobile body (for example, a vehicle), there are cases where the sink apparatus moves. The third embodiment of the present technology can be also applied to a case where the sink apparatus (or a display device connected thereto) moves. In other words, the sink apparatus, on the basis of the positional relation (relative positional relation) between the user associated with the source apparatus and the display unit (the sink apparatus or a display device connected thereto), can perform control of determining the display form of an image corresponding to the source apparatus on the display unit.

<4. Application Examples>

The technology relating to the present disclosure is applicable to various kinds of products. For example, each of the information processing apparatuses 200, 300, 400, 703, 704, 710, 720, 730, 1110, 1120, 1130, 1510, 1520, and 1530 may be realized as a mobile terminal such as a smartphone, a tablet personal computer (PC), a notebook PC, a mobile game terminal or a digital camera, a stationary terminal such as a TV set, a printer, a digital scanner, or a network storage, or an in-vehicle terminal such as a car navigation device. In addition, each of the information processing apparatuses 200, 300, 400, 703, 704, 710, 720, 730, 1110, 1120, 1130, 1510, 1520, and 1530 may be realized as a terminal that performs machine-to-machine (M2M) communication such as a smart meter, a vending machine, a remote monitoring device, or a point of sale (POS) terminal (also referred to as a machine-type communication (MTC) terminal). Furthermore, each of the information processing apparatuses 200, 300, 400, 703, 704, 710, 720, 730, 1110, 1120, 1130, 1510, 1520, and 1530 may be a radio communication module (for example, an integrated circuit module configured in one die) mounted in such a terminal.

[4-1. First Application Example]

FIG. 55 is a block diagram that illustrates an example of the schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a radio communication interface 913, an antenna switch 914, an antenna 915, a bus 917, a battery 918, and an auxiliary controller 919.

The processor 901 may be, for example, a central processing unit (CPU) or a System on Chip (SoC) and controls functions of an application layer and other layers of the smartphone 900. The memory 902 includes a random access memory (RAM) and a read only memory (ROM) and stores a program that is executed by the processor 901 and data. The storage 903 may include a storage medium such as a semiconductor memory or a hard disk. The external connection interface 904 is an interface for connecting an externally-attached device such as a memory card or a universal serial bus (USB) device to the smartphone 900.

The camera 906 includes an imaging sensor such as a charge coupled device (CCD) or a complementary metal oxide semiconductor (CMOS) and generates a captured image. The sensor 907 may include a group of sensors such as a measurement sensor, a gyro sensor, a geomagnetic sensor, or an acceleration sensor. The microphone 908 converts sound that are input to the smartphone 900 into audio signals. The input device 909 includes, for example, a touch sensor configured to detect touch onto a screen of the display device 910, a keypad, a keyboard, a button, or a switch and receives an operation or an information input from a user. The display device 910 includes a screen of a liquid crystal display (LCD), an organic light-emitting diode (OLED) display, or the like and displays an output image of the smartphone 900. The speaker 911 converts audio signals that are output from the smartphone 900 into sounds.

The radio communication interface 913 supports one or more wireless LAN standards such as IEEE 802.11a, 11b, 11g, 11n, 11ac, and 11ad and performs radio communication. The radio communication interface 913 can communicate with other apparatuses through a wireless LAN access point in an infrastructure mode. In addition, the radio communication interface 913 can directly communicate with other apparatuses in a direct communication mode such as an adhoc mode or Wi-Fi Direct. In addition, in Wi-Fi direct, while one of two terminals operates as an access point, different from the adhoc mode, the communication is directly performed between the terminals. The radio communication interface 913, typically, may include a baseband processor, a radio frequency (RF) circuit, a power-up, and the like. The radio communication interface 913 may be a one-chip module in which a memory storing a communication control program, a processor executing the program and related circuits are integrated. The radio communication interface 913, in addition to the wireless LAN system, may support different types of radio communication systems such as a short-distance radio communication system, a near-field radio communication system, and a cellular communication system. The antenna switch 914 switches connection destinations of the antenna 915 for a plurality of circuits (for example, circuits used for other radio communication systems) included in the radio communication interface 913. The antenna 915 includes a single or a plurality of antenna elements (for example, a plurality of antenna elements configuring a MIMO antenna) and is used by the radio communication interface 913 for transmission and reception of radio signals. In addition, a radio communication interface function used for a connection to a public line of the IEEE 802.16, 3GPP specification (for example, W-CDMA, GSM, WiMAX, WiMAX2, LTE, or LTE-A) is included, and communication can be performed with a public line.

In addition, the configuration is not limited to the example illustrated in FIG. 55, but the smartphone 900 may include a plurality of antennas (for example, an antenna for a wireless LAN, an antenna for the near-field communication system, an antenna for public line communication, and the like). In such a case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 913, and the auxiliary controller 919 together. The battery 918 supplies power to blocks of the smartphone 900 illustrated in FIG. 55 through feeder lines that are partially illustrated using broken lines in the drawing. The auxiliary controller 919 operates a minimum necessary function of the smartphone 900, for example, in a sleep mode.

In the smartphone 900 illustrated in FIG. 55, the control unit 240 described with reference to FIG. 2 and the control unit 370 described with reference to FIG. 3 may be mounted in the radio communication interface 913. In addition, at least some of the functions may be mounted in the processor 901 or the auxiliary controller 919.

In addition, the smartphone 900 may operate as a radio access point (software AP) as the processor 901 executes an access point function in an application level. In addition, the radio communication interface 913 may have a radio access point function.

[4-2. Second Application Example]

Figure 56:
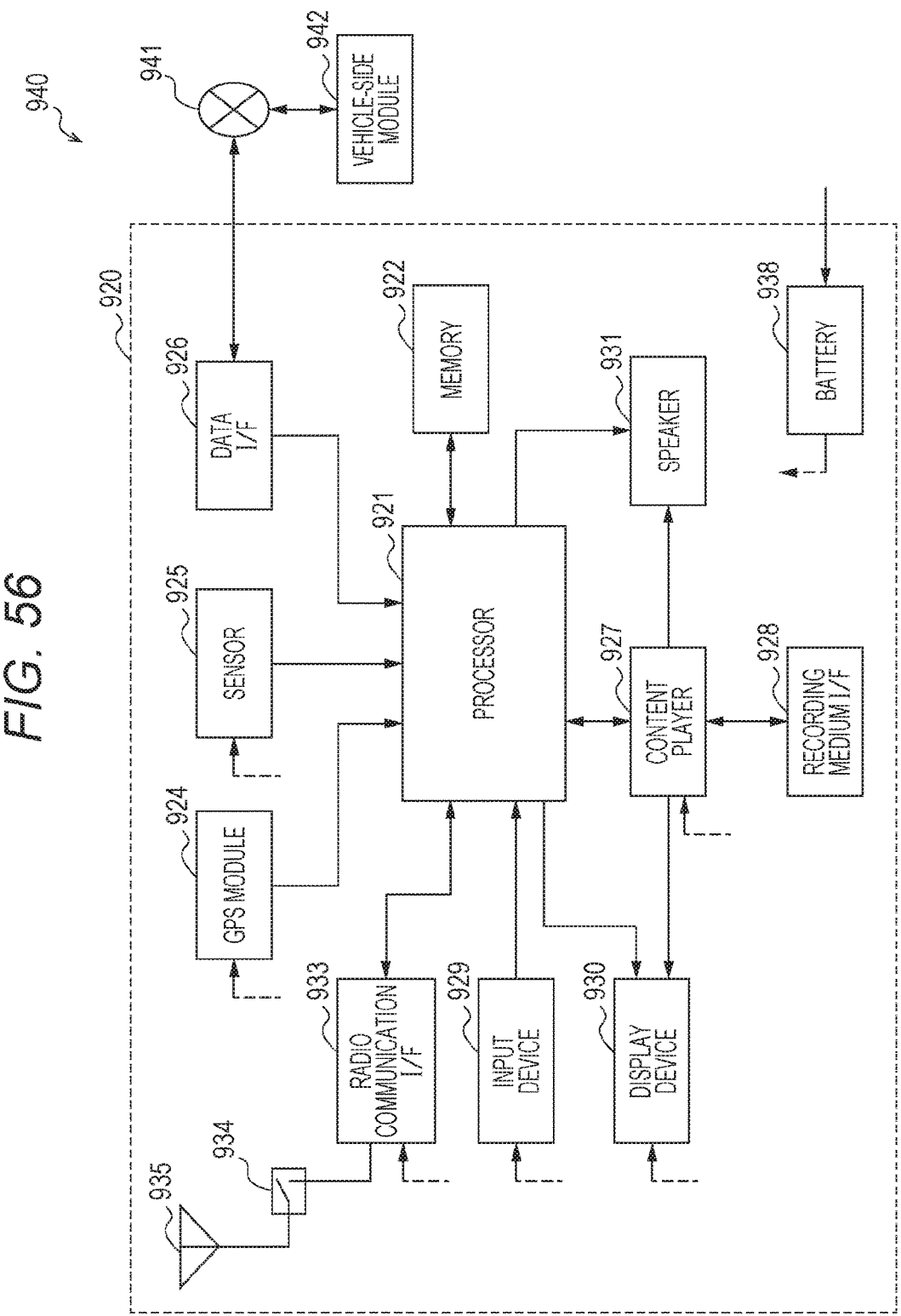
FIG. 56 is a block diagram that illustrates an example of the schematic configuration of a car navigation device.

FIG. 56 is a block diagram that illustrates an example of the schematic configuration of a car navigation device 920 to which the technology relating to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, an antenna switch 934, an antenna 935, and a battery 938.

The processor 921 may be, for example, a CPU or a SoC and controls a navigation function and other functions of the car navigation device 920. The memory 922 includes a RAM and a ROM and stores a program that is executed by the processor 921 and data.

The GPS module 924 measures a position (for example, latitude, longitude, and altitude) of the car navigation device 920 by using GPS signals received from GPS satellites. The sensor 925 may include a group of sensors such as a gyro sensor, a geomagnetic sensor, and an air pressure sensor. The data interface 926, for example, is connected to an in-vehicle network 941 through a terminal that is not illustrated in the drawing and acquires data such as vehicle speed data that is generated by the vehicle side.

The content player 927 reproduces contents stored in a storage medium (for example, a CD or a DVD) that is inserted into the storage medium interface 928. The input device 929 includes, for example, a touch sensor configured to detect touch onto a screen of the display device 930, a button, a switch, or the like and receives an operation or an information input from a user. The display device 930 includes a screen of a LCD, an OLED display, or the like and displays an image of the navigation function or a content that is reproduced. The speaker 931 outputs sounds of the navigation function or the content that is reproduced.

The radio communication interface 933 supports one or more wireless LAN standards such as IEEE 802.11a, 11b, 11g, 11n, 11ac, and 11ad and performs radio communication. The radio communication interface 933 can communicate with other apparatuses through a wireless LAN access point in an infrastructure mode. In addition, the radio communication interface 933 can directly communicate with other apparatuses in a direct communication mode such as an adhoc mode or Wi-Fi Direct. The radio communication interface 933, typically, may include a baseband processor, an RF circuit, a power-up, and the like. The radio communication interface 933 may be a one-chip module in which a memory storing a communication control program, a processor executing the program and related circuits are integrated. The radio communication interface 933, in addition to the wireless LAN system, may support different types of radio communication systems such as a short-distance radio communication system, a near-field radio communication system, and a cellular communication system. The antenna switch 934 switches connection destinations of the antenna 935 for a plurality of circuits included in the radio communication interface 933. The antenna 935 includes a single or a plurality of antenna elements and is used by the radio communication interface 933 for transmission and reception of radio signals.

In addition, the configuration is not limited to the example illustrated in FIG. 56, but the car navigation device 920 may include a plurality of antennas. In such a case, the antenna switch 934 may be omitted from the configuration of the car navigation device 920.

The battery 938 supplies power to blocks of the car navigation device 920 illustrated in FIG. 56 through feeder lines that are partially illustrated using broken lines in the drawing. In addition, the battery 938 accumulates power fed from the vehicle side.

In the car navigation device 920 illustrated in FIG. 56, the control unit 240 described with reference to FIG. 2 and the control unit 370 described with reference to FIG. 3 may be mounted in the radio communication interface 933. In addition, at least some of the functions may be mounted in the processor 921.

In addition, the technology relating to the present disclosure may be realized as an in-vehicle system (or a vehicle) 940 that includes one or more blocks of the car navigation device 920 described above, the in-vehicle network 941, and a vehicle-side module 942. The vehicle-side module 942 generates vehicle-side data such as a vehicle speed, an engine revolution number, or malfunction information and outputs the generated data to the in-vehicle network 941.

In addition, the embodiment described above represents an example for implementing the present technology, and an item of the embodiment and an invention-specifying item of the claim have a correspondence relation. Similarly, an invention-specifying item of the claim and an item of the embodiment of the present technology to which the same name is assigned have a correspondence relation. However, the present technology is not limited to the embodiment but may be embodied by applying various changes to the embodiment in a range not departing from the concept thereof.

In addition, the processing sequence described in the embodiment described above may be perceived as a method having such a series of sequences or may be perceived as a program for causing a computer to execute the series of sequences or a recording medium storing the program. As the recording medium, for example, a compact disc (CD), a Mini Disc (MD), a digital versatile disc (DVD), a memory card, a Blu-ray (registered trademark) disc, or the like may be used.

In addition, effects described in this specification are merely examples. Thus, effects are not limited thereto, but any other effect may be acquired.

In addition, the present technology may employ the following configurations.

(1)

An information processing apparatus including a control unit that performs control of displaying an image based on image information transmitted from at least one first information processing apparatus by using radio communication in one area of a display unit for each first information processing apparatus and determining a display form of the image corresponding to the first information processing apparatus in the display unit on the basis of a positional relation between a user associated with the first information processing apparatus and the display unit.

(2)

The information processing apparatus according to (1), wherein the control unit determines at least one of movement of the display area of the image corresponding to the first information processing apparatus associated with the user in the display unit and a direction of the image on the basis of movement of the user.

(3)

The information processing apparatus according to (2), wherein the first information processing apparatus acquires user information relating to the user and transmits the user information to the information processing apparatus, and the control unit performs a user recognizing process relating to the user on the basis of registration user information that is registered and the user information transmitted from the first information processing apparatus, performs association between the registration user information for the user and the image displayed on the display unit on the basis of a result of the user recognizing process, and determines the display form of the image on the basis of a change in the user information.

(4)

The information processing apparatus according to (2), wherein the first information processing apparatus acquires user information relating to the user, performs a user recognizing process relating to the user on the basis of registration user information that is registered and the user information, and transmits a result of the user recognizing process to the information processing apparatus, and the control unit performs association between the registration user information for the user and the image displayed on the display unit on the basis of the result of the user recognizing process transmitted from the first information processing apparatus and determines the display form of the image on the basis of a change in the user information.

(5)

The information processing apparatus according to (2), wherein the first information processing apparatus acquires user information relating to the user, performs a user recognizing process relating to the user on the basis of registration user information that is registered and the user information, performs association between the registration user information for the user and the image displayed on the display unit on the basis of a result of the user recognizing process, and transmits the result of the association and positional information based on the user information to the information processing apparatus, and the control unit records the result of the association transmitted from the first information processing apparatus and determines the display form of the image on the basis of the positional information transmitted from the first information processing apparatus.

(6)

The information processing apparatus according to any of (2) to (5), wherein, in a case where a determination request for determining the display form of the image in accordance with the movement of the user is received from the user, the first information processing apparatus transmits positional information based on the user information to the information processing apparatus regularly or irregularly.

(7)

The information processing apparatus according to (3) or (4), wherein, in a case where the registration user information corresponding to the user information transmitted from the first information processing apparatus is not present as the result of the user recognizing process, the control unit transmits request information for requesting the registration user information relating to the user information to the first information processing apparatus.

(8)

The information processing apparatus according to (2), further including an acquisition unit that acquires user information relating to the user, wherein the control unit transmits the user information to the first information processing apparatus, the first information processing apparatus performs a user recognizing process relating to the user on the basis of registration user information that is registered and the user information transmitted from the information processing apparatus, performs association between the registration user information for the user and the image displayed on the display unit on the basis of a result of the user recognizing process, and transmits a result of the association to the information processing apparatus, and the control unit determines the display form of the image on the basis of positional information based on the user information.

(9)

The information processing apparatus according to (2), further including an acquisition unit that acquires user information relating to the user, wherein the control unit performs a user recognizing process relating to the user on the basis of registration user information that is registered and the user information and transmits the result of the user recognizing process to the first information processing apparatus, the first information processing apparatus performs association between the registration user information for the user and the image displayed on the display unit on the basis of the result of the user recognizing process, and transmits a result of the association to the information processing apparatus, and the control unit determines the display form of the image on the basis of positional information based on the user information.

(10)

The information processing apparatus according to (2), further including an acquisition unit that acquires user information relating to the user, wherein the control unit performs a user recognizing process relating to the user on the basis of registration user information that is registered and the user information, performs association between the registration user information for the user and the image displayed on the display unit on the basis of a result of the user recognizing process, and transmits checking information for checking whether or not the display form of the image is determined to the first information processing apparatus, and the first information processing apparatus, in a case where an approval for the checking information is made by a user operation, transmits approval information to the information processing apparatus, and the control unit, in a case where the approval information is received, determines the display form of the image on the basis of positional information based on the user information.

(11)

The information processing apparatus according to any of (3) to (5) and (7) to (10), wherein the first information processing apparatus notifies capabilities used for performing the user recognizing process to the information processing apparatus and exchanges information used for performing the user recognizing process with the information processing apparatus.

(12)

The information processing apparatus according to any of (3) to (5) and (7) to (10), wherein the first information processing apparatus acquires capabilities of the information processing apparatus by transmitting a capability request used for performing the user recognizing process to the information processing apparatus and exchanges information used for performing the user recognizing process with the information processing apparatus.

(13)

The information processing apparatus according to any of (8) to (10), wherein the control unit acquires capabilities of the first information processing apparatus by transmitting a capability request used for performing the user recognizing process to the first information processing apparatus and exchanges information used for performing the user recognizing process with the first information processing apparatus.

(14)

The information processing apparatus according to any of (1) to (13), wherein the first information processing apparatus performs real-time image transmission/reception to/from the information processing apparatus in compliance with a wireless fidelity (Wi-Fi) certified miracast specification.

(15)

A communication system including:

at least one first information processing apparatus that transmits image information by using radio communication; and a second information processing apparatus that performs control of displaying an image based on the image information transmitted from the at least one first information processing apparatus in one area of a display unit for each first information processing apparatus, and determining a display form of the image corresponding to the first information processing apparatus in the display unit on the basis of a positional relation between a user associated with the first information processing apparatus and the display unit.

(16)

An information processing method including:

a first step of displaying an image based on image information transmitted from at least one first information processing apparatus by using radio communication in one area of a display unit for each first information processing apparatus; and a second step of determining a display form of the image corresponding to the first information processing apparatus in the display unit on the basis of a positional relation between a user associated with the first information processing apparatus and the display unit.

(17)

A program causing a computer to execute:

a first step of displaying an image based on image information transmitted from at least one first information processing apparatus by using radio communication in one area of a display unit for each first information processing apparatus; and a second step of determining a display form of the image corresponding to the first information processing apparatus in the display unit on the basis of a positional relation between a user associated with the first information processing apparatus and the display unit.

REFERENCE SIGNS LIST

100 Communication system
200 Information processing apparatus
210 Antenna
220 Radio communication unit
230 Control signal receiving unit
240 Control unit
250 Video/audio signal generating unit
260 Video/audio compressing unit
270 Stream transmitting unit
300 Information processing apparatus
310 Antenna
320 Radio communication unit
330 Stream receiving unit 340 Video/audio decompressing unit
350 Video/audio output unit
351 Display unit
352 Audio output unit
360 User information acquiring unit
370 Control unit
380 Control signal transmitting unit
390 Management information storing unit
400 Information processing apparatus
700 Communication system
701 Access point
702 Network
703 and 704 Information processing apparatus
710 Information processing apparatus
711 Display unit
720 Information processing apparatus
730 Information processing apparatus
731 Display device
732 Display unit
740 Control Apparatus
900 Smartphone
901 Processor
902 Memory
903 Storage
904 External connection interface
906 Camera
907 Sensor
908 Microphone
909 Input device
910 Display device
911 Speaker
913 Radio communication interface
914 Antenna switch
915 Antenna
917 Bus
918 Battery
919 Auxiliary controller
920 Car navigation device
921 Processor
922 Memory
924 GPS module
925 Sensor
926 Data interface
927 Content player
928 Storage medium interface
929 Input device
930 Display device
931 Speaker
933 Radio communication interface
934 Antenna switch
935 Antenna
938 Battery
941 In-vehicle network
942 Vehicle-side module
1100 Communication system
1110 Information processing apparatus
1111 Display unit
1112 Imaging unit
1120 Information processing apparatus
1121 Display unit
1122 Imaging unit
1130 Information processing apparatus
1131 Display unit
1132 Imaging unit
1500 Communication system
1510 Table display apparatus
1511 Display unit
1520 Information processing apparatus
1530 Information processing apparatus

The invention claimed is:

1. A first information processing apparatus, comprising:
a display screen; and
circuitry configured to:
receive, via radio communication, image information from at least one second information processing apparatus;
control, based on the image information, the display screen to display a first image in a first area of the display screen;
determine a display form of the first image based on a positional relation between the display screen and a user associated with the at least one second information processing apparatus,
wherein the first image is associated with the at least one second information processing apparatus;
control, based on a distance of movement of the user that is greater than a threshold distance, the display screen to move the first image; and
control the display screen to display a second image on a second area of the display screen, wherein
the second image overlaps the first image based on the movement of the first image, and
a priority of the second image is higher than a priority of the first image based on a fixed position of the second image at a time of the overlap.

2. The first information processing apparatus according to claim 1, wherein the circuitry is further configured to control the display screen to move the first image in a direction of the movement of the user.

3. The first information processing apparatus according to claim 2, wherein
the at least one second information processing apparatus:
acquires user information related to the user of the at least one second information processing apparatus, and
transmits the user information to the first information processing apparatus, and
the circuitry is further configured to:
receive the user information from the at least one second information processing apparatus;
execute a user recognizing process related to the user, based on registration user information and the user information;
associate the registration user information with the first image based on a result of the user recognizing process; and
determine the display form of the first image based on a change in the user information.

4. The first information processing apparatus according to claim 3, wherein
the circuitry is further configured to transmit request information to the at least one second information processing apparatus to request the registration user information associated with the user information,
the transmission of the request information is based on absence of the registration user information, and
the registration user information corresponds to the user information.

5. The first information processing apparatus according to claim 3, wherein
the circuitry is further configured to:
receive capability information from the at least one second information processing apparatus;

receive the user information based on the capability information; and execute the user recognizing process based on the user information, and the capability information indicates capabilities of the first information processing apparatus for the execution of the user recognizing process.

6. The first information processing apparatus according to claim 3, wherein the circuitry is further configured to:

receive a capability request from the at least one second information processing apparatus;

transmit capability information to the at least one second information processing apparatus based on the capability request;

receive the user information from the at least one second information processing apparatus based on the capability information; and execute the user recognizing process based on the user information, and the capability information indicates capabilities of the first information processing apparatus for the execution of the user recognizing process.

7. The first information processing apparatus according to claim 2, wherein the at least one second information processing apparatus:

acquires user information related to the user, executes a user recognizing process related to the user, based on registration user information and the user information, and transmits a result of the user recognizing process to the first information processing apparatus, and the circuitry is further configured to:

receive the result of the user recognizing process from the at least one second information processing apparatus;

associate the registration user information with the first image based on the result of the user recognizing process; and determine the display form of the first image based on a change in the user information.

8. The first information processing apparatus according to claim 2, wherein the at least one second information processing apparatus:

acquires user information related to the user, executes a user recognizing process related to the user, based on registration user information and the user information, associates the registration user information with the first image displayed based on a result of the user recognizing process, and transmits, based on the user information, positional information of the user and a result of the association of the registration user information with the first image to the first information processing apparatus, and the circuitry is further configured to:

receive the positional information of the user and the result of the association from the at least one second information processing apparatus;

store the result of the association; and determine the display form of the first image based on the positional information of the user.

9. The first information processing apparatus according to claim 2, wherein the at least one second information processing apparatus transmits positional information of the user one of regularly or irregularly to the first information processing apparatus, based on user information and a reception of a determination request associated with the determination of the display form of the first image, and the determination of the display form is based on the movement of the user.

10. The first information processing apparatus according to claim 2, wherein the circuitry is further configured to:

acquire user information related to the user;

transmit the user information to the at least one second information processing apparatus; and determine the display form of the first image based on positional information of the user and the user information, and the at least one second information processing apparatus:

executes a user recognizing process related to the user, based on registration user information and the user information, associates the registration user information with the first image based on a result of the user recognizing process, and transmits a result of the association to the first information processing apparatus.

11. The first information processing apparatus according to claim 10, wherein the circuitry is further configured to:

transmit a capability request to the at least one second information processing apparatus;

receive capability information from the at least one second information processing apparatus based on the capability request; and transmit the user information to the at least one second information processing apparatus based on the capability information, the at least one second information processing apparatus executes the user recognizing process based on the user information, and the capability information indicates capabilities of the at least one second information processing apparatus for the execution of the user recognizing process.

12. The first information processing apparatus according to claim 2, wherein the circuitry is further configured to:

acquire user information related to the user;

execute a user recognizing process related to the user, based on registration user information and the user information;

transmit a result of the user recognizing process to the at least one second information processing apparatus; and determine the display form of the first image based on positional information of the user and the user information, and wherein the at least one second information processing apparatus:

associates the registration user information with the first image based on the result of the user recognizing process, and transmits a result of the association to the first information processing apparatus.

13. The first information processing apparatus according to claim 2, wherein the at least one second information processing apparatus transmits approval information to the first information processing apparatus based on an operation of the user, the approval information indicates an approval of the user for checking information, and the circuitry is further configured to:
- acquire user information related to the user;
- execute a user recognizing process related to the user, based on registration user information and the user information;
- associate the registration user information with the first image based on a result of the user recognizing process; and
- transmit the checking information to the at least one second information processing apparatus to check the determination of the display form of the first image;
- receive the approval information from the at least one second information processing apparatus; and
- determine the display form of the first image based on the received approval information, positional information of the user, and the user information.

14. The first information processing apparatus according to claim 1, wherein the at least one second information processing apparatus executes one of a real-time image transmission to the first information processing apparatus in compliance with a wireless fidelity (Wi-Fi) certified miracast specification, or a real-time image reception from the first information processing apparatus in compliance with the Wi-Fi certified miracast specification.

15. A communication system, comprising:
at least one first information processing apparatus configured to transmit image information via radio communication; and
a second information processing apparatus, wherein the second information processing apparatus comprises:
a display screen, and
circuitry configured to:
- receive, via the radio communication, the image information from the at least one first information processing apparatus;
- control, based on the image information, the display screen to display a first image in a first area of the display screen;
- determine a display form of the first image based on a positional relation between the display screen and a user associated with the at least one first information processing apparatus,
  wherein the first image is associated with the at least one first information processing apparatus;
- control, based on a distance of movement of the user that is greater than a threshold distance, the display screen to move the first image; and
- control the display screen to display a second image on a second area of the display screen, wherein
  the second image overlaps the first image based on the movement of the first image, and
  a priority of the second image is higher than a priority of the first image based on a fixed position of the second image at a time of the overlap.

16. An information processing method, comprising:
receiving, via radio communication, image information from at least one information processing apparatus;
controlling, based on the image information, a display screen to display a first image in a first area of the display screen;
determining a display form of the first image based on a positional relation between the display screen and a user associated with the at least one information processing apparatus,
  wherein the first image is associated with the at least one information processing apparatus;
controlling, based on a distance of movement of the user that is greater than a threshold distance, the display screen to move the first image; and
controlling the display screen to display a second image on a second area of the display screen, wherein
  the second image overlaps the first image based on the movement of the first image, and
  a priority of the second image is higher than a priority of the first image based on a fixed position of the second image at a time of the overlap.

17. A non-transitory computer-readable medium having stored thereon computer-executable instructions that, when executed by a processor, cause the processor to execute operations, the operations comprising:
receiving, via radio communication, image information from at least one information processing apparatus;
controlling, based on the image information, a display screen to display a first image in a first area of the display screen;
determining a display form of the first image based on a positional relation between the display screen and a user associated with the at least one information processing apparatus,
  wherein the first image is associated with the at least one information processing apparatus;
controlling, based on a distance of movement of the user that is greater than a threshold distance, the display screen to move the first image; and
controlling the display screen to display a second image on a second area of the display screen, wherein
  the second image overlaps the first image based on the movement of the first image, and
  a priority of the second image is higher than a priority of the first image based on a fixed position of the second image at a time of the overlap.

* * * * *